US010387920B2

(12) United States Patent
Tinsman et al.

(10) Patent No.: US 10,387,920 B2
(45) Date of Patent: Aug. 20, 2019

(54) SYSTEM AND METHOD FOR OFFERING AND BILLING ADVERTISEMENT OPPORTUNITIES

(71) Applicant: Roku, Inc., Los Gatos, CA (US)

(72) Inventors: John Tinsman, Santa Cruz, CA (US); Thomas Huber, Arvada, CO (US); Thomas Lemmons, Evergreen, CO (US); Ian Zenoni, Highlands Ranch, CO (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 13/621,782

(22) Filed: Sep. 17, 2012

(65) Prior Publication Data

US 2013/0024293 A1 Jan. 24, 2013

Related U.S. Application Data

(63) Continuation-in-part of application No. 13/175,663, filed on Jul. 1, 2011, now Pat. No. 8,522,273, which is a continuation of application No. 10/745,899, filed on Dec. 23, 2003, now Pat. No. 7,979,877.

(51) Int. Cl.
*G06Q 30/00* (2012.01)
*G06Q 30/02* (2012.01)

(52) U.S. Cl.
CPC ................................ *G06Q 30/0275* (2013.01)

(58) Field of Classification Search
None
See application file for complete search history.

(56) References Cited

U.S. PATENT DOCUMENTS

| | | | |
|---|---|---|---|
| 4,153,895 | A | 5/1979 | Weisbrod et al. |
| 5,774,170 | A | 6/1998 | Hite et al. |
| 5,794,210 | A | 8/1998 | Goldhaber et al. |
| 5,794,398 | A | 8/1998 | Kaehler |
| 5,929,849 | A | 7/1999 | Kikinis |

(Continued)

FOREIGN PATENT DOCUMENTS

| | | | |
|---|---|---|---|
| CN | 1610405 | A | 4/2005 |
| CN | 101461235 | A | 6/2009 |

(Continued)

OTHER PUBLICATIONS

Microsoft Computer Dictionary, Fifth Edition, 2002, Microsoft Press, p. 23.*

(Continued)

*Primary Examiner* — Matthew T Sittner
*Assistant Examiner* — Michael I Ezewoko
(74) *Attorney, Agent, or Firm* — Sterne, Kessler, Goldstein & Fox P.L.L.C.

(57) ABSTRACT

In various example embodiments, a system and method for offering and billing advertisement opportunities are provided. In example embodiments, an advertisement opportunity in media to be communicated to a user device associated with a viewer is identified. Attributes of the advertisement opportunity are determined. Based on these attributes, a value to assign to the advertisement opportunity is determined. The advertisement opportunity is offered to a potential advertiser based on the assigned value determined using the attributes of the advertisement opportunity.

20 Claims, 37 Drawing Sheets

START
DETECT AD OPPORTUNITY 3602
DETERMINE ATTRIBUTES FOR AD OPPORTUNITY 3604
DETERMINE ASSIGNED VALUE FOR AD OPPORTUNITY 3606
DETERMINE POTENTIAL ADVERTISERS FOR AD OPPORTUNITY 3608
OFFER THE AD OPPORTUNITY TO ADVERTISERS AT ASSIGNED VALUE 3610
EMBED AD 3612
BILL FOR AD 3614
END
3600

(56) References Cited

U.S. PATENT DOCUMENTS 5,973,681 A 10/1999 Tanigawa et al.
5,974,398 A * 10/1999 Hanson et al. ............ 705/14.64
6,035,304 A 3/2000 Machida et al.
6,040,851 A 3/2000 Cheng et al.
6,253,189 B1 6/2001 Feezell et al.
6,324,519 B1 11/2001 Eldering
6,574,793 B1 6/2003 Ngo et al.
6,621,866 B1 9/2003 Florencio et al.
6,698,020 B1 2/2004 Zigmond et al.
6,820,277 B1 11/2004 Eldering et al.
6,859,936 B2 2/2005 Makowski, Jr. et al.
6,928,413 B1 8/2005 Pulitzer
6,993,782 B1 1/2006 Newberry et al.
7,017,173 B1 3/2006 Armstrong et al.
7,249,367 B2 7/2007 Bove et al.
7,421,729 B2 9/2008 Zenoni
7,444,656 B2 10/2008 Lemmons
7,444,659 B2 10/2008 Lemmons
7,478,417 B2 1/2009 Sakamoto et al.
7,490,053 B1 2/2009 Emerson, III et al.
7,752,642 B2 * 7/2010 Lemmons ...................... 725/32
7,779,438 B2 8/2010 Davies
7,979,877 B2 7/2011 Huber et al.
7,983,959 B2 * 7/2011 Chickering ........... G06Q 30/02 705/14.4
8,010,988 B2 8/2011 Cox
8,145,528 B2 * 3/2012 Gilley et al. .............. 705/14.49
8,207,989 B2 6/2012 Mei et al.
8,522,273 B2 8/2013 Huber et al.
8,874,468 B2 * 10/2014 Gargi ................ G06Q 30/0241 702/179
9,154,852 B2 10/2015 Huber et al.
9,865,017 B2 1/2018 Huber et al.
10,032,192 B2 7/2018 Tinsman et al.
2001/0032333 A1 10/2001 Flickinger
2001/0047294 A1 11/2001 Rothschild
2001/0047298 A1 11/2001 Moore et al.
2001/0049824 A1 12/2001 Baker et al.
2002/0010928 A1 1/2002 Sahota
2002/0026637 A1 2/2002 Markel et al.
2002/0059588 A1 5/2002 Huber et al.
2002/0059604 A1 5/2002 Papagan et al.
2002/0062481 A1 5/2002 Slaney et al.
2002/0065678 A1 5/2002 Peliotis et al.
2002/0077954 A1 6/2002 Slaight et al.
2002/0083443 A1 6/2002 Eldering et al.
2002/0087980 A1 7/2002 Eldering et al.
2002/0092019 A1 7/2002 Marcus
2002/0097983 A1 7/2002 Wallace et al.
2002/0104083 A1 8/2002 Hendricks et al.
2002/0104090 A1 8/2002 Stettner
2002/0120931 A1 8/2002 Huber et al.
2002/0120934 A1 8/2002 Abrahams
2002/0120935 A1 8/2002 Huber et al.
2002/0123928 A1 9/2002 Eldering et al.
2002/0124255 A1 9/2002 Reichardt et al.
2002/0126990 A1 9/2002 Rasmussen et al.
2002/0131511 A1 9/2002 Zenoni
2002/0133565 A1 9/2002 Huat
2002/0133817 A1 9/2002 Markel
2002/0143901 A1 10/2002 Lupo et al.
2002/0144262 A1 10/2002 Plotnick et al.
2002/0147645 A1 10/2002 Alao et al.
2002/0147987 A1 10/2002 Reynolds et al.
2002/0162117 A1 10/2002 Pearson et al.
2002/0162118 A1 10/2002 Levy et al.
2002/0169709 A1 11/2002 Kitayama
2002/0174425 A1 11/2002 Markel et al.
2002/0176702 A1 11/2002 Frantz
2002/0184047 A1 12/2002 Plotnick et al.
2002/0184091 A1 12/2002 Pudar
2002/0184623 A1 12/2002 Hodge et al.
2002/0194595 A1 12/2002 Miller et al.
2003/0028873 A1 * 2/2003 Lemmons ...................... 725/36
2003/0070167 A1 4/2003 Holtz et al.
2003/0074303 A1 4/2003 Gould
2003/0078840 A1 4/2003 Strunk et al.
2003/0093790 A1 * 5/2003 Logan et al. .................. 725/38
2003/0149983 A1 8/2003 Markel
2003/0177199 A1 9/2003 Zenoni
2003/0177490 A1 9/2003 Hoshino et al.
2003/0194199 A1 10/2003 Roth
2003/0225629 A1 12/2003 Banks et al.
2004/0025176 A1 2/2004 Franklin et al.
2004/0031046 A1 2/2004 Weinblatt
2004/0031062 A1 2/2004 Lemmons
2004/0034874 A1 2/2004 Hord et al.
2004/0040035 A1 2/2004 Carlucci et al.
2004/0096002 A1 5/2004 Zdepski et al.
2004/0133467 A1 7/2004 Siler
2004/0148625 A1 7/2004 Eldering et al.
2004/0189873 A1 9/2004 Konig et al.
2004/0194128 A1 9/2004 McIntyre et al.
2004/0194131 A1 9/2004 Ellis et al.
2004/0205829 A1 10/2004 Hane
2004/0210942 A1 10/2004 Lemmons
2004/0261100 A1 12/2004 Huber et al.
2005/0015796 A1 1/2005 Bruckner et al.
2005/0039205 A1 2/2005 Riedl
2005/0057724 A1 3/2005 Patton et al.
2005/0137958 A1 * 6/2005 Huber et al. ................... 705/37
2005/0172312 A1 8/2005 Lienhart et al.
2005/0273808 A1 12/2005 Zeidman
2006/0010466 A1 1/2006 Swix et al.
2006/0041921 A1 2/2006 Hane
2006/0123443 A1 6/2006 Hamilton et al.
2006/0130114 A1 6/2006 Kwon et al.
2006/0149632 A1 7/2006 Register et al.
2006/0187358 A1 8/2006 Lienhart et al.
2006/0248569 A1 11/2006 Lienhart et al.
2006/0271947 A1 11/2006 Lienhart et al.
2006/0288366 A1 12/2006 Boylan, III et al.
2007/0079327 A1 4/2007 Khoo et al.
2007/0104369 A1 5/2007 Weatherhead
2007/0124756 A1 5/2007 Covell et al.
2007/0192189 A1 8/2007 Popowich et al.
2007/0214476 A1 * 9/2007 Zalewski .......... H04N 7/17318 725/32
2007/0226761 A1 9/2007 Zalewski et al.
2007/0266400 A1 11/2007 Rogers et al.
2008/0033801 A1 2/2008 Mckenna et al.
2008/0046315 A1 2/2008 Axe et al.
2008/0092168 A1 4/2008 Logan et al.
2008/0304805 A1 12/2008 Baharav et al.
2009/0172747 A1 7/2009 Vantalon et al.
2009/0193456 A1 7/2009 Ahn et al.
2009/0265737 A1 10/2009 Issa et al.
2010/0027550 A1 2/2010 Candelore et al.
2010/0031162 A1 2/2010 Wiser et al.
2010/0037253 A1 2/2010 Sheehan et al.
2010/0043022 A1 2/2010 Kaftan
2010/0162344 A1 6/2010 Casagrande et al.
2010/0175054 A1 7/2010 Matusikova et al.
2010/0175084 A1 7/2010 Ellis et al.
2010/0175804 A1 7/2010 Ellis et al.
2010/0242065 A1 9/2010 Murakami
2011/0066492 A1 3/2011 Sumiyoshi et al.
2011/0075992 A1 * 3/2011 Mei et al. .................... 386/249
2011/0157475 A1 6/2011 Wright et al.
2011/0173054 A1 * 7/2011 Kutaragi et al. ............. 705/14.5
2011/0178871 A1 7/2011 Watfa et al.
2011/0238495 A1 * 9/2011 Kang ........................ 705/14.49
2011/0243533 A1 10/2011 Stern et al.
2011/0282906 A1 11/2011 Wong
2011/0321087 A1 12/2011 Huber et al.
2012/0278823 A1 11/2012 Rogers et al.
2013/0019261 A1 1/2013 Huber et al.
2013/0024888 A1 1/2013 Sivertsen
2013/0031582 A1 1/2013 Tinsman et al.
2013/0312029 A1 11/2013 Huber et al.
2014/0245354 A1 8/2014 Kunkel et al.
2017/0150192 A1 5/2017 Sellers et al.
2017/0180789 A1 6/2017 Wright et al.
2018/0158136 A1 6/2018 Huber et al.

(56) References Cited

U.S. PATENT DOCUMENTS

FOREIGN PATENT DOCUMENTS

| | | | |
|---|---|---|---|
| CN | 101554048 | A | 10/2009 |
| CN | 101610152 | A | 12/2009 |
| CN | 101641873 | A | 2/2010 |
| CN | 101772777 | A | 7/2010 |
| CN | 102077548 | A | 5/2011 |
| CN | 102150177 | A | 8/2011 |
| CN | 102473269 | A | 5/2012 |
| CN | 102663375 | A | 9/2012 |
| FR | 2730837 | A1 | 2/1995 |
| JP | 2008-005123 | A | 1/2008 |
| WO | WO-9834189 | A1 | 8/1998 |
| WO | WO-2005062794 | A2 | 7/2005 |
| WO | WO-2012060803 | A1 | 5/2012 |

OTHER PUBLICATIONS

Mind—A Brief Introduction, John R. Searle, 2004, Oxford University Press, pp. 62-67.*
What is Thought, Eric Baum, the MIT Press, 2004, pp. 33-65.*
Robotics, Science and Systems III, Wolfram Burgard, Oliver Brock, and Cyrill Stachniss, the MIT Press, 2008, pp. 41-48.*
Noetics, Lawrence Krader, 2010, Peter Lang Publishing, pp. 551-553.*
Algorithms + Data Structures = Programs, 1976, pp. xii-55.*
Image and Video Retrieval, Springer-Verlag, pp. 279-288.*
HCI remixed : reflections on works that have influenced the HCI community, MIT Press, 2008: pp. 275-279.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
"U.S. Appl. No. 10/745,899 Non-Final Office Action dated Oct. 28, 2010", 25 pgs.
"U.S. Appl. No. 10/745,899, Advisory Action dated Jul. 1, 2009", 3 pgs.
"U.S. Appl. No. 10/745,899, Final Office Action dated Apr. 16, 2009", 28 pgs.
"U.S. Appl. No. 10/745,899, Decision on Pre-Appeal Brief mailed Aug. 13, 2010", 2 pgs.
"U.S. Appl. No. 10/745,899, Final Office Action dated Mar. 17, 2010", 24 pgs.
"U.S. Appl. No. 10/745,899, Final Office Action dated Jun. 13, 2008", 22 pgs.
"U.S. Appl. No. 10/745,899, Non Final Office Action dated Jul. 24, 2007", 16 pgs.
"U.S. Appl. No. 10/745,899, Non Final Office Action dated Sep. 25, 2009", 28 pgs.
"U.S. Appl. No. 10/745,899, Non-Final Office Action dated Oct. 16, 2008", 27 pgs.
"U.S. Appl. No. 10/745,899, Notice of Allowance dated Mar. 4, 2011", 9 pgs.
"U.S. Appl. No. 10/745,899, Pre-Appeal Brief Request filed Jun. 15, 2010", 4 pgs.
"U.S. Appl. No. 10/745,899, Preliminary Amendment filed May 13, 2004", 62 pgs.
"U.S. Appl. No. 10/745,899, Response filed Jan. 16, 2009 to Non-Final Office Action dated Oct. 16, 2008", 7 pgs.
"U.S. Appl. No. 10/745,899, Response filed Mar. 24, 2008 to Non-Final Office Action dated Sep. 24, 2007", 9 pgs.
"U.S. Appl. No. 10/745,899, Response filed Jun. 16, 2009 to Final Office Action dated Apr. 16, 2009", 9 pgs.
"U.S. Appl. No. 10/745,899, Response filed Sep. 15, 2008 to Final Office Action dated Jun. 13, 2008", 7 pgs.
"U.S. Appl. No. 10/745,899, Response filed Jan. 28, 2011 to Non Final Office Action dated Oct. 28, 2010", 11 pgs.
"U.S. Appl. No. 10/745,899, Response filed Dec. 18, 2009 to Non Final Office Action dated Sep. 25, 2009", 8 pgs.
"U.S. Appl. No. 13/175,663, Preliminary Amendment filed Oct. 12, 2011", 6 pgs.
"Austalian Application Serial No. 2004308298, Examiners Report dated Dec. 5, 2007", 1 pg.
"Austalian Application Serial No. 2004308298, Response filed Jun. 15, 2009 to Examiners Report dated Dec. 5, 2007", 7 pgs.
"International Application Serial No. PCT/US2004/42468, International Preliminary Report on Patentability dated Oct. 3, 2006", 4 pgs.
"International Application Serial No. PCT/US2004/42468, Written Opinion dated Aug. 1, 2006", 3 pgs.
"International Application Serial No. PCT/US2004/42468, International Search Report dated Aug. 1, 2006", 1 pg.
"U.S. Appl. No. 13/175,663, Notice of Allowance dated Apr. 26, 2013", 9 pgs.
"U.S. Appl. No. 13/621,733, Advisory Action dated May 8, 2014", 4 pgs.
"U.S. Appl. No. 13/621,733, Final Office Action dated Dec. 17, 2013", 23 pgs.
"U.S. Appl. No. 13/621,733, Non Final Office Action dated Apr. 25, 2013", 16 pgs.
"U.S. Appl. No. 13/621,733, Response filed Aug. 26, 2013 to Non Final Office Action dated Apr. 25, 2013", 11 pgs.
"U.S. Appl. No. 13/621,794 , Response filed Sep. 23, 2013 to Non Final Office Action dated Jun. 21, 2013", 11 pgs.
"U.S. Appl. No. 13/621,794, Advisory Action dated Jun. 11, 2014", 3 pgs.
"U.S. Appl. No. 13/621,794, Final Office Action dated Jan. 16, 2014", 10 pgs.
"U.S. Appl. No. 13/621,794, Non Final Office Action dated Jun. 21, 2013", 9 pgs.
"U.S. Appl. No. 13/621,794, Response filed Apr. 16, 2014 to Final Office Action dated Jan. 16, 2014", 10 pgs.
"U.S. Appl. No. 13/623,733, Response filed Apr. 16, 2014 to Final Office Action dated Dec. 17, 2013", 9 pgs.
"U.S. Appl. No. 13/950,234, Non Final Office Action dated May 29, 2014", 9 pgs.
"U.S. Appl. No. 13/950,234, Preliminary Amendment filed Aug. 27, 2013", 7 pgs.
"European Application Serial No. 13184173.6, Search Report dated Mar. 21, 2014", 6 pgs.
"European Application Serial No. 13184188.4, Search Report dated Mar. 31, 2014", 5 pgs.
"European Application Serial No. 13184200.7, Extended Search Report dated Mar. 20, 2014", 5 pgs.
"U.S. Appl. No. 13/621,794, Non Final Office Action dated Dec. 10, 2015", 20 pgs.
"U.S. Appl. No. 13/950,234, Supplemental Notice of Allowability dated Aug. 25, 2015", 5 pgs.
"U.S. Appl. No. 13/621,733, Appeal Decision mailed Sep. 1, 2016", 11 pgs.
"U.S. Appl. No. 13/621,733, Corrected Notice of Allowance dated Dec. 23, 2016", 4 pgs.
"U.S. Appl. No. 13/621,733, Notice of Allowance dated Nov. 17, 2016", 7 pgs.
"U.S. Appl. No. 13/621,794, Final Office Action dated Jun. 9, 2016", 30 pgs.
"U.S. Appl. No. 13/621,794, Non Final Office Action dated Sep. 21, 2016", 26 pgs.
"U.S. Appl. No. 13/621,794, Response filed Apr. 4, 2016 to Non Final Office Action dated Dec. 10, 2015", 17 pgs.
"U.S. Appl. No. 13/621,794, Response filed Sep. 8, 2016 to Final Office Action dated Jun. 9, 2016", 19 pgs.
"U.S. Appl. No. 13/621,794,Response filed Feb. 21, 2017 to Non Final Office Action dated Sep. 21, 2016", 17 pgs.
"U.S. Appl. No. 13/950,234, Notice of Allowance dated Jul. 7, 2015", 8 pgs.
"U.S. Appl. No. 13/950,234, Response filed Jun. 3, 2015 to Final Office Action dated Dec. 5, 2014", 11 pgs.
"Application 201310631283.5 Notification of the First Office Action", w/English Translation, 8 pgs.

(56) References Cited

OTHER PUBLICATIONS

"U.S. Appl. No. 13/621,733, Corrected Notice of Allowance dated Dec. 15, 2017", 3 pgs.
"U.S. Appl. No. 13/621,733, Notice of Allowance dated Aug. 16, 2017", 8 pgs.
"U.S. Appl. No. 13/621,794, Final Office Action dated Apr. 26, 2017", 27 pgs.
"U.S. Appl. No. 13/621,794, Non Final Office Action dated Sep. 7, 2017", 31 pgs.
"U.S. Appl. No. 13/621,794, Respnse filed Jul. 20, 2017 to Final Office Action dated Apr. 26, 2017", 12 pgs.
U.S. Appl. No. 13/175,663, filed Jul. 1, 2011, Advertising Methods for Advertising Time Slots and Embedded Objects.
U.S. Appl. No. 13/621,794, filed Sep. 17, 2012, Automatic Localization of Advertisements.
U.S. Appl. No. 13/621,733, filed Sep. 17, 2012, System and Method for Providing Interactive Advertisement.
U.S. Appl. No. 14/842,709, filed Sep. 1, 2015, Advertising Methods for Advertising Time Slots and Embedded Objects.
U.S. Appl. No. 15/845,595, filed Dec. 18, 2017, System and Method for Providing Interactive Advertisement.
"U.S. Appl. No. 13/621,733, Appeal Brief filed Aug. 19, 2014", 16 pgs.
"U.S. Appl. No. 13/621,733, Response filed Apr. 16, 2014 to Final Office Action dated Dec. 17, 2013", 9 pgs.
"U.S. Appl. No. 13/621,794, Appeal Brief filed Sep. 16, 2014", 12 lpgs.
"U.S. Appl. No. 13/950,234, Final Office Action dated Dec. 5, 2014", 10 pgs.
"U.S. Appl. No. 13/950,234, Response filed Sep. 29, 2014 to Non Final Office Action dated May 29, 2014", 11 pgs.

* cited by examiner

STEPS ILLUSTRATING THE CARRYING OUT OF THE INSTALLATION OF EMBEDDED ADS BY AUTOMATIC DESIGNATION OF AD SPACE AND SEARCHING FOR ACTUAL OBJECTS

STEPS ILLUSTRATING THE CARRYING OUT OF THE INSTALLATION OF EMBEDDED ADS BY AUTOMATIC DESIGNATION OF AD SPACE AND SEARCHING FOR BLANK SPACES

STEPS ILLUSTRATING THE INSTALLATION OF EMBEDDED ADS BY USING TAGS AND MARKERS

3100
PROCESS FOR BILLING ADVERTISERS BASED UPON DISPLAY TIME OF EMBEDDED ADS

SYSTEM AND METHOD FOR OFFERING AND BILLING ADVERTISEMENT OPPORTUNITIES

RELATED APPLICATION

The present application is a continuation-in-part U.S. patent application Ser. No. 13/175,663, filed Jul. 1, 2011 and entitled "Advertising Methods for Advertising Time Slots and Embedded Objects," which is a continuation of U.S. Pat. No. 7,979,877, issued Jul. 12, 2011 and entitled "Advertising Methods for Advertising Time Slots and Embedded Objects," both of which applications are hereby incorporated by reference herein in their entirety.

FIELD

The present disclosure relates generally to advertising, and in a specific example embodiment, to offering and billing advertisement opportunities.

BACKGROUND

Typically, an advertiser looks for advertising opportunities that may be of interest to the advertiser. For example, certain events may be more appealing for the advertising of a product of the advertiser. However, the proactive searching of these opportunities by the advertiser may be time consuming.

BRIEF DESCRIPTION OF DRAWINGS

The appended drawings merely illustrate example embodiments of the present invention and cannot be considered as limiting its scope.

DETAILED DESCRIPTION

Figure 1:
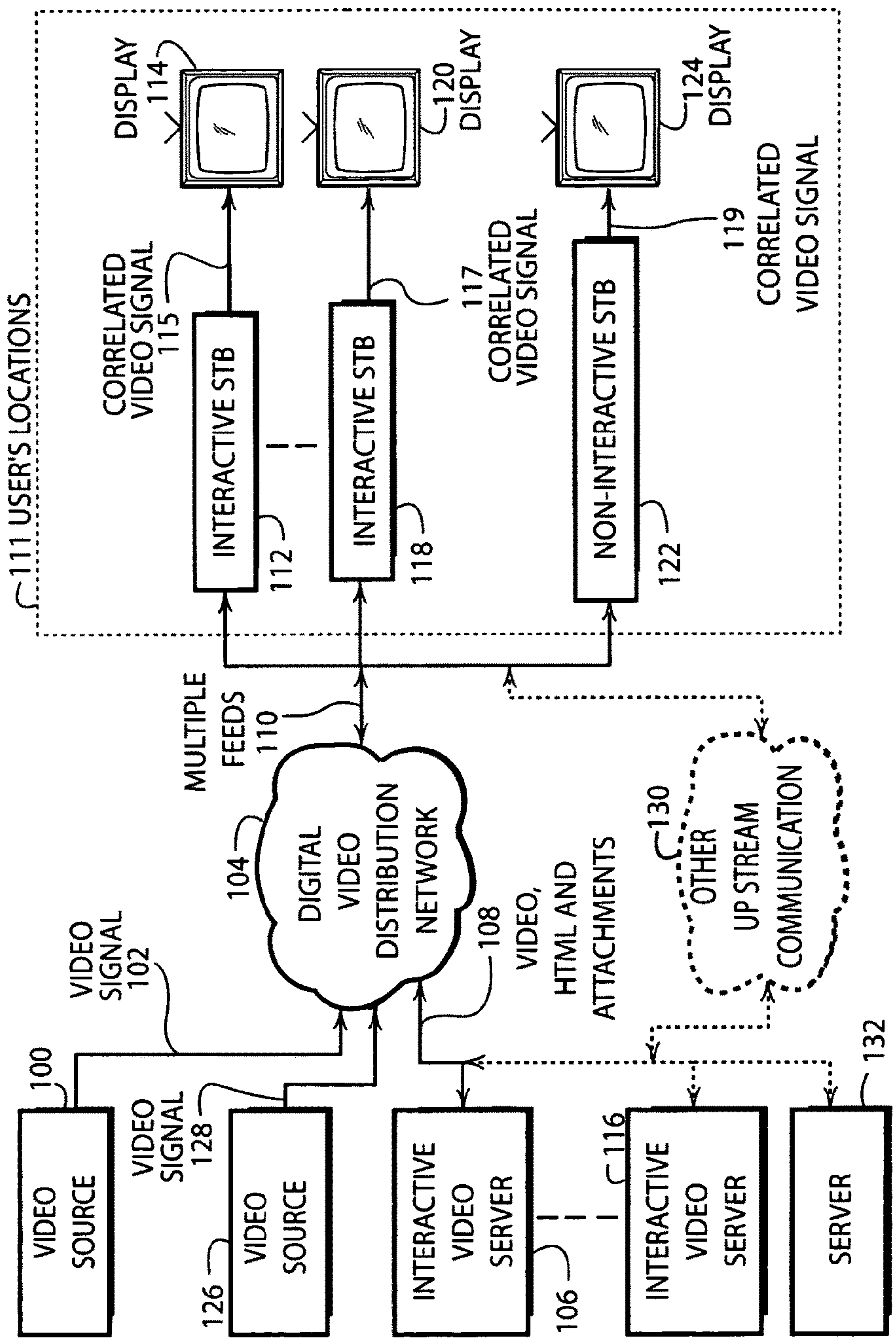
FIG. 1 is a schematic illustration of the overall system of the present invention.

The description that follows includes systems, methods, techniques, instruction sequences, and computing machine program products that embody illustrative embodiments of the present invention. In the following description, for purposes of explanation, numerous specific details are set forth in order to provide an understanding of various embodiments. It will be evident, however, to those skilled in the art that embodiments may be practiced without these specific details. In general, well-known instruction instances, protocols, structures, and techniques have not been shown in detail.

Example embodiments described herein provide systems and methods for offering and billing advertisement opportunities. In example embodiments, an advertisement opportunity in media to be communicated to a user device associated with a viewer is identified. Attributes of the advertisement opportunity are determined. Based on these attributes, a value to assign to the advertisement opportunity is determined. The attributes may comprise a location of the advertisement opportunity in a scene of the media. The value assigned may be higher based on this location being a prominent location in the scene (e.g., an area where a level of activity in the scene is higher than other areas of the scene, an area near a center of the scene). The attributes may also comprise a plot line attribute, whereby the value assigned to the advertisement opportunity is higher based on a scene being a critical scene in a plot line. Different weights may be applied to various attributes in determining the value.

The advertisement opportunity is offered to a potential advertiser based on the assigned value determined using the attributes of the advertisement opportunity. The assigned value may be a starting bid price in an auction for the advertisement opportunity, or the value may be a fixed price in a fixed price offer for the advertisement opportunity. The potential advertisers may be identified by determining potential advertisers listing, in an advertiser database, attributes that match the attributes of the advertisement opportunity.

Subsequently, the advertiser who wins the auction or responds to the fixed price offer will have their advertisement embedded into the advertisement opportunity and is billed for the advertisement placement. The billing is based on the value assigned to the advertisement opportunity. In one example, a length of time an advertisement is displayed is determined and is factored into a calculation of a final invoice.

FIGS. 1 through 6 illustrate one method of generating embedded advertising using video combination techniques. The combination of signals may occur in the set top box or may occur in an upstream source (e.g., national broadcaster, local station). The embedded advertising can take the form of objects that are inserted into a video (e.g., television) programming or other digital media using overlay pages that are generated by markup language, by video combination techniques, or by any other desirable technique. Embedded advertising using overlay pages can replace objects in, for example, the television broadcast by negating the television broadcast display on a pixel by pixel basis so that objects can actually be eliminated from the broadcast, such as disclosed in U.S. patent application Ser. No. 10/212,289, entitled "Post Production Visual Alterations," by Thomas Lemmons, filed on Aug. 2, 2002, which is specifically incorporated herein by reference for all that it discloses and teaches. Alternatively, video combination techniques can be used to embed ads by combining video images at the set top box level, such as disclosed in U.S. patent application Ser. No. 10/103,545, entitled "Video Combiner," Thomas Lemmons, et al., filed Mar. 20, 2002, which is specifically incorporated herein by reference for all that it discloses and teaches. Inserted objects can track with the background of the display and conform to objects in the display so that the inserted objects appear as objects that are actually contained within the television broadcast such as disclosed in U.S. patent application Ser. No. 10/357,155, entitled "Tracking Moving Objects on Video with Interactive Access Points", filed Jan. 31, 2003, by Steven O. Markel which is specifically incorporated herein by reference for all that it discloses and teaches. Embedded advertising provides a high degree of flexibility for offering (e.g., auctioning or selling) ads. This high degree of flexibility allows television broadcasters to offer embedded advertising which can be bid upon by television advertisers for both prerecorded and live programming.

FIG. 1 illustrates the interconnections of the various components that may be used to deliver a composite video signal to individual viewers. Video sources 100 and 126 send video signals 102 and 126 through a distribution network 104 to viewer's locations 111. Additionally, multiple interactive video servers 106 and 116 send video, HTML, and other attachments 108. The multiple feeds 110 are sent to several set top boxes 112, 118, and 122 connected to televisions 114, 120, and 124, respectively. The set top boxes 112 and 118 may be interactive set top boxes and set top box 122 may not have interactive features.

The video sources 100 and 126 and interactive video servers 106 and 116 may be attached to a conventional cable television head-end, a satellite distribution center, or other centralized distribution point for video signals. The distribution network 104 may comprise a cable television network, satellite television network, Internet video distribution network, or any other network capable of distributing video or multimedia data.

The interactive set top boxes 112 and 118 may communicate to the interactive video servers 106 and 108 though the video distribution network 104 if the video distribution network supports two-way communication, such as with cable modems. Additionally, communication may be through other upstream communication networks 130. Such upstream networks may include a dial up modem, direct Internet connection, or other communication network that allows communication separate from the video distribution network 104.

Although FIG. 1 illustrates the use of interactive set-top boxes 112 and 118, the present invention can be implemented without an interactive connection with an interactive video server, such as interactive video servers 106 and 116. In that case, separate multiple video sources 100 can provide multiple video feeds 110 to non-interactive set-top box 122 at the viewer's locations 111. The difference between the interactive set top boxes 112 and 118 and the non-interactive set top box 122 is that the interactive set top boxes 112 and 118 incorporate the functionality to receive, format, and display interactive content and send interactive requests to the interactive video servers 106 and 116.

The set top boxes 112, 118, and 122 may receive and decode two or more video feeds and combine the feeds to produce a composite video signal that is displayed for the viewer. Such a composite video signal may be different for each viewer, since the video signals may be combined in several different manners. The manner in which the signals are combined is described in the presentation description. The presentation description may be provided through the interactive video servers 106 and 116 or through another server 132. Server 132 may be a web server or a specialized data server.

As disclosed below, the set-top box includes multiple video decoders and a video controller that provides control signals for combining the video signal that is displayed on the display 114. In accordance with currently available technology, the interactive set-top box 112 can provide requests to the interactive video server 106 to provide various web connections for display on the display 114. Multiple interactive video servers 116 can provide multiple signals to the viewer's locations 111.

The set top boxes 112, 118, and 122 may be a separate box that physically rests on top of a viewer's television set, may be incorporated into the television electronics, may be functions performed by a programmable computer, or may take on any other form. As such, a set top box refers to any receiving apparatus capable of receiving video signals and employing a presentation description as disclosed herein.

The manner in which the video signals are to be combined is defined in the presentation description. The presentation description may be a separate file provided by the server 132, the interactive video servers 106 and 116, or may be embedded into one or more of the multiple feeds 110. A plurality of presentation descriptions may be transmitted and program code operating in a set top box may select one or more of the presentation descriptions based upon an identifier in the presentation description(s). This allows presentation descriptions to be selected that correspond to set top box requirements and/or viewer preferences or other information. Further, demographic information may be employed by upstream equipment to determine a presentation description version for a specific set top box or group of set top boxes and an identifier of the presentation description version(s) may then be sent to the set top box or boxes. Presentation descriptions may also be accessed across a network, such as the Internet, that may employ upstream communication on a cable system or other networks. In a similar manner, a set top box may access a presentation description across a network that corresponds to set top box requirements and/or viewer preferences or other information. And in a similar manner as described above, demographic information may be employed by upstream equipment to determine a presentation description version for a specific set top box or group of set top boxes and an identifier of the presentation description version(s) may then be sent to the set top box or boxes. The identifier may comprise a URL, filename, extension or other information that identifies the presentation description. Further, a plurality of presentation descriptions may be transferred to a set top box and a viewer may select versions of the presentation description. Alternatively, software program operating in the set top box may generate the presentation description and such generation may also employ viewer preferences or demographic information.

In some cases, the presentation description may be provided by the viewer directly into the set top box 112, 118, 122, or may be modified by the viewer. Such a presentation description may be viewer preferences stored in the set top box and created using menus, buttons on a remote, a graphical viewer interface, or any combination of the above. Other methods of creating a local presentation description may also be used.

The presentation description may take the form of a markup language wherein the format, look, and feel of a video image is controlled. Using such a language, the manner in which two or more video images are combined may be fully defined. The language may be similar to XML, HTML or other graphical mark-up languages and allow certain video functions such as pixel by pixel replacement, rotation, translation, and deforming of portions of video images, the creation of text and other graphical elements, overlaying and ghosting of one video image with another, color key replacement of one video image with another, and any other command as may be contemplated. In contrast to hard-coded image placement choices typical to picture-in-picture (PIP) display, the presentation description of the present invention is a "soft" description that provides freedom in the manner in which images are combined and that may be easily created, changed, modified or updated. The presentation is not limited to any specific format and may employ private or public formats or a combination thereof. Further, the presentation description may comprise a sequence of operations to be performed over a period of time or over a number of frames. In other words, the presentation description may be dynamic. For example, a video image that is combined with another video image may move across the screen, fade in or out, may be altered in perspective from frame to frame, or may change in size.

Specific presentation descriptions may be created for each set top box and tailored to each viewer. A general presentation description suited to a plurality of set top boxes may be parsed, translated, interpreted, or otherwise altered to conform to the requirements of a specific set top box and/or to be tailored to correspond to a viewer demographic, preference, or other information. For example, advertisements may be targeted at selected groups of viewers or a viewer may have preferences for certain look and feel of a television program. In some instances, some presentation descriptions may be applied to large groups of viewers.

The presentation descriptions may be transmitted from a server 132 to each set top box through a backchannel 130 or other network connection, or may be embedded into one or more of the video signals sent to the set top box. Further, the presentation descriptions may be sent individually to each set top box based on the address of the specific set top box. Alternatively, a plurality of presentation descriptions may be transmitted and a set top box may select and store one of the presentation descriptions based upon an identifier or other information contained in the presentation description. In some instances, the set top box may request a presentation description through the backchannel 130 or through the video distribution network 104. At that point, a server 132, interactive video server 106 or 116, or other source for a presentation description may send the requested presentation description to the set top box.

Interactive content supplied by interactive video server 106 or 116 may include the instructions for a set top box to request the presentation description from a server through a backchannel. A methodology for transmitting and receiving this data is described in U.S. Provisional Patent Application entitled "Multicasting of Interactive Data Over a Back Channel", filed Mar. 5, 2002 by Ian Zenoni, which is specifically incorporated herein by reference for all it discloses and teaches.

The presentation description may contain the commands necessary for several combinations of video. In such a case, the local preferences of the viewer, stored in the set top box, may indicate which set of commands would be used to display the specific combination of video suitable for that viewer. For example, in an advertisement campaign, a presentation description may include commands for combining several video images for four different commercials for four different products. The viewer's preferences located inside the set top box may indicate a preference for the first commercial, thusly the commands required to combine the video signals to produce the first commercial will be executed and the other three sets of commands will be ignored.

In operation, the device of FIG. 1 provides multiple video feeds 110 to the viewer's locations 111. The multiple video feeds are combined by each of the interactive set-top boxes 112, 118, 122 to generate correlated or composite video signals 115, 117, 119, respectively. As disclosed below, each of the interactive set-top boxes 112, 118, 122 uses instructions provided by the video source 100, interactive video servers 106, 116, a separate server 132, or viewer preferences stored at the viewer's location to generate control signals to combine the signals into a correlated video signal. Additionally, presentation description information provided by each of the interactive video servers 106, 116 can provide layout descriptions for displaying a video attachment. The correlated video signal may overlay the various video feeds on a full screen basis, or on portions of the screen display. In any event, the various video feeds may interrelate to each other in some fashion such that the displayed signal is a correlated video signal with interrelated parts provided by each of the separate video feeds.

Figure 2:
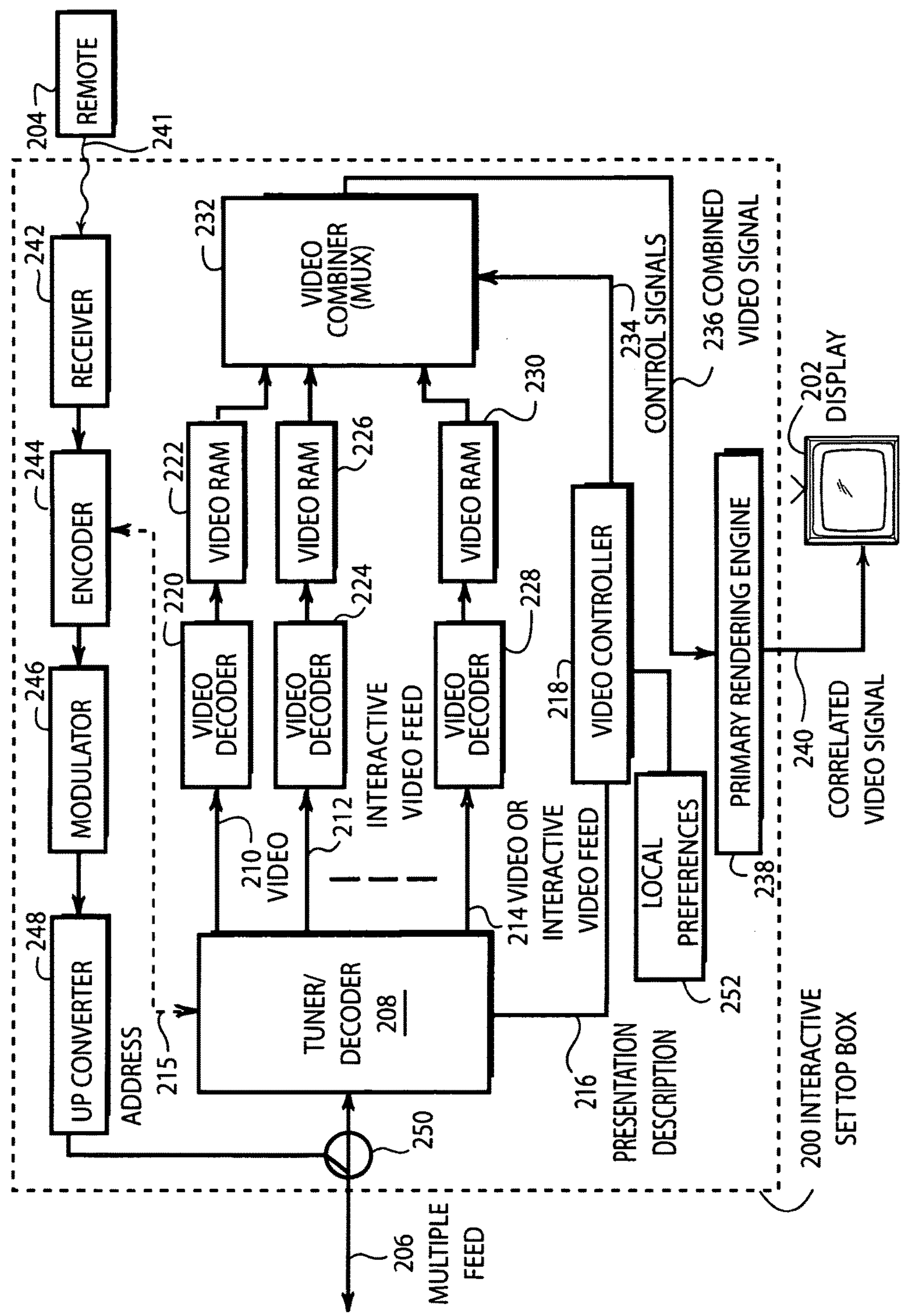
FIG. 2 is a detailed block diagram of a set-top box, display, and remote control device of the system of the present invention.

FIG. 2 is a detailed schematic block diagram of an interactive set-top box together with a display 202 and remote control device 204. As shown in FIG. 2, a multiple video feed signal 206 is supplied to the interactive set-top box 200. The multiple video feed signal 206 that includes a video signal, HTML signals, video attachments, a presentation description, and other information is applied to a tuner/decoder 208. The tuner/decoder 208 extracts each of the different signals such as a video MPEG signal 210, an interactive video feed 212, another video or interactive video feed 214, and the presentation description information 216.

The presentation description information 216 is the information necessary for the video combiner 232 to combine the various portions of multiple video signals to form a composite video image. The presentation description information 216 can take many forms, such as an ATVEF trigger or a markup language description using HTML or a similar format. Such information may be transmitted in a vertical blanking encoded signal that includes instructions as to the manner in which to combine the various video signals. For example, the presentation description may be encoded in the vertical blanking interval (VBI) of stream 210. The presentation description may also include Internet addresses for connecting to enhanced video web sites. The presentation description information 216 may include specialized commands applicable to specialized set top boxes, or may contain generic commands that are applicable to a wide range of set top boxes. References made herein to the ATVEF specification are made for illustrative purposes only, and such references should not be construed as an endorsement, in any manner, of the ATVEF specification.

The presentation description information 216 may be a program that is embedded into one or more of the video signals in the multiple feed 206. In some cases, the presentation description information 216 may be sent to the set top box in a separate channel or communication format that is unrelated to the video signals being used to form the composite video image. For example, the presentation description information 216 may come through a direct internet connection made through a cable modem, a dial up internet access, a specialized data channel carried in the multiple feed 206, or any other communication method.

As also shown in FIG. 2, the video signal 210 is applied to a video decoder 220 to decode the video signal and apply the digital video signal to video RAM 222 for temporary storage. The video signal 210 may be in the MPEG standard, wherein predictive and intracoded frames comprise the video signal. Other video standards may be used for the storage and transmission of the video signal 210 while maintaining within the spirit and intent of the present invention. Similarly, video decoder 224 receives the interactive video feed 212 that may comprise a video attachment from an interactive web page. The video decoder 224 decodes the video signal and applies it to a video RAM 226. Video decoder 228 is connected to video RAM 230 and operates in the same fashion. The video decoders 220, 224, 228 may also perform decompression functions to decompress MPEG or other compressed video signals. Each of the video signals from video RAMs 222, 226, 230 is applied to a video combiner 232. Video combiner 232 may comprise a multiplexer or other device for combining the video signals. The video combiner 232 operates under the control of control signals 234 that are generated by the video controller 218. In some embodiments of the present invention, a high-speed video decoder may process more than one video feed and the functions depicted for video decoders 220, 224, 228 and RAMs 222, 226, 230 may be implemented in fewer components. Video combiner 232 may include arithmetic and logical processing functions.

The video controller 218 receives the presentation description instructions 216 and generates the control signals 234 to control the video combiner 232. The control signals may include many commands to merge one video image with another. Such commands may include direct overlay of one image with another, pixel by pixel replacement, color keyed replacement, the translation, rotation, or other movement of a section of video, ghosting of one image over another, or any other manipulation of one image and combination with another as one might desire. For example, the presentation description instructions 216 may indicate that the video signal 210 be displayed on full screen while the interactive video feed 212 only be displayed on the top third portion of the screen.

The presentation description instructions 216 also instruct the video controller 218 as to how to display the pixel information. For example, the control signals 234 generated by the video controller 218 may replace the background video pixels of video 210 in the areas where the interactive video feed 212 is applied on the top portion of the display. The presentation description instructions 216 may set limits as to replacement of pixels based on color, intensity, or other factors. Pixels can also be displayed based upon the combined output of each of the video signals at any particular pixel location to provide a truly combined output signal. Of course, any desired type of combination of the video signals can be obtained, as desired, to produce the combined video signal 236 at the output of the video combiner 232. Also, any number of video signals can be combined by the video combiner 232 as illustrated in FIG. 2. It is only necessary that a presentation description 216 be provided so that the video controller 218 can generate the control signals 234 that instruct the video combiner 232 to properly combine the various video signals.

The presentation description instructions 216 may include instructions sent from a server directly to the set top box 200 or the presentation description instructions 216 may be settable by the viewer. For example, if an advertisement were to be shown to a specific geographical area, such as to the viewers in a certain zip code, a set of presentation description instructions 216 may be embedded into the advertisement video instructing the set top box 200 to combine the video in a certain manner or in a certain location.

In some embodiments, the viewer's preferences may be stored in the local preferences 252 and used either alone or in conjunction with the presentation description instructions 216. For example, the local preferences may be to merge a certain preferred background with a news show. In another example, the viewer's local preferences may select from a list of several options presented in the presentation description information 216. In such an example, the presentation description information 216 may contain the instructions for several alternative presentation schemes, one of which may be preferred by a viewer and contained in the local preferences 252.

In some embodiments, the viewer's preferences may be stored in a central server. Such an embodiment may provide for the collection and analysis of statistics regarding viewer preferences. Further, customized and targeted advertisements and programming preferences may be sent directly to the viewer, based on their preferences analyzed on a central server. The server may have the capacity to download presentation description instructions 216 directly to the viewer's set top box. Such a download may be pushed, wherein the server sends the presentation description instructions 216, or pulled, wherein the set top box requests the presentation description instructions 216 from the server.

As also shown in FIG. 2, the combined video signal 236 is applied to a primary rendering engine 238. The primary rendering engine 238 generates the correlated video signal 240. The primary rendering engine 238 formats the digital combined video signal 236 to produce the correlated video signal 240. If the display 202 is an analog display, the primary rendering engine 238 also performs functions as a digital-to-analog converter. If the display 202 is a high definition digital display, the primary rendering engine 238 places the bits in the proper format in the correlated video signal 240 for display on the digital display.

FIG. 2 also discloses a remote control device 204 under the operation of a viewer. The remote control device 204 operates in the standard fashion in which remote control devices interact with interactive set-top boxes, such as interactive set-top box 200. The set-top box includes a receiver 242 such as an infrared (IR) receiver that receives the signal 241 from the remote 204. The receiver 242 transforms the IR signal into an electrical signal that is applied to an encoder 244. The encoder 244 encodes the signal into the proper format for transmission as an interactive signal over the digital video distribution network 104. The signal is modulated by modulator 246 and up-converted by up-converter 248 to the proper frequency. The up-converted signal is then applied to a directional coupler 250 for transmission on the multiple feed 206 to the digital video distribution network 104. Other methods of interacting with an interactive set top box may be also employed. For example, viewer input may come through a keyboard, mouse, joystick, or other pointing or selecting device. Further, other forms of input, including audio and video may be used. The example of the remote control 204 is exemplary and not intended to limit the invention.

As also shown in FIG. 2, the tuner/decoder 208 may detect web address information 215 that may be encoded in the video signal 102 (FIG. 1). This web address information may contain information as to one or more web sites that contain presentation descriptions that interrelates to the video signal 102 and that can be used to provide the correlated video signal 240. The decoder 208 detects the address information 215 which may be encoded in any one of several different ways such as an ATVEF trigger, as a tag in the vertical blanking interval (VBI), encoded in the back channel, embedded as a data PID (packet identifier) signal in a MPEG stream, or other encoding and transmitting method. The information can also be encoded in streaming media in accordance with Microsoft's ASF format. Encoding this information as an indicator is more fully disclosed in U.S. patent application Ser. No. 10/076,950, filed Feb. 12, 2002 entitled "Video Tags and Markers," which is specifically incorporated herein by reference for all that it discloses and teaches. The manner in which the tuner/decoder 208 can extract the one or more web addresses 215 is more fully disclosed in the above referenced patent application. In any event, the address information 215 is applied to the encoder 244 and is encoded for transmission through the digital video distribution network 104 to an interactive video server. The signal is modulated by modulator 246 and up-converted by up-converter 248 for transmission to the directional coupler 250 over the cable. In this fashion, video feeds can automatically be provided by the video source 100 via the video signal 102.

The web address information that is provided can be selected, as referenced above, by the viewer activating the remote control device 204. The remote control device 204 can comprise a personalized remote, such as disclosed in U.S. patent Ser. No. 09/941,148, filed Aug. 27, 2001 entitled "Personalized Remote Control," which is specifically incorporated by reference for all that it discloses and teaches. Additionally, interactivity using the remote 204 can be provided in accordance with U.S. patent application Ser. No. 10/041,881, filed Oct. 24, 2001 entitled "Creating On-Content Enhancements," which is specifically incorporated herein by reference for all that it discloses and teaches. In other words, the remote 204 can be used to access "hot spots" on any one of the interactive video feeds to provide further interactivity, such as the ability to order products and services, and other uses of the "hot spots" as disclosed in the above referenced patent application. Preference data can also be provided in an automated fashion based upon viewer preferences that have been learned by the system or are selected in a manual fashion using the remote control device in accordance with U.S. patent application Ser. No. 09/933,928, filed Aug. 21, 2001, entitled "iSelect Video" and U.S. patent application Ser. No. 10/080,996, filed Feb. 20, 2002 entitled "Content Based Video Selection," both of which are specifically incorporated by reference for all that they disclose and teach. In this fashion, automated or manually selected preferences can be provided to generate the correlated video signal 240.

Figure 3:
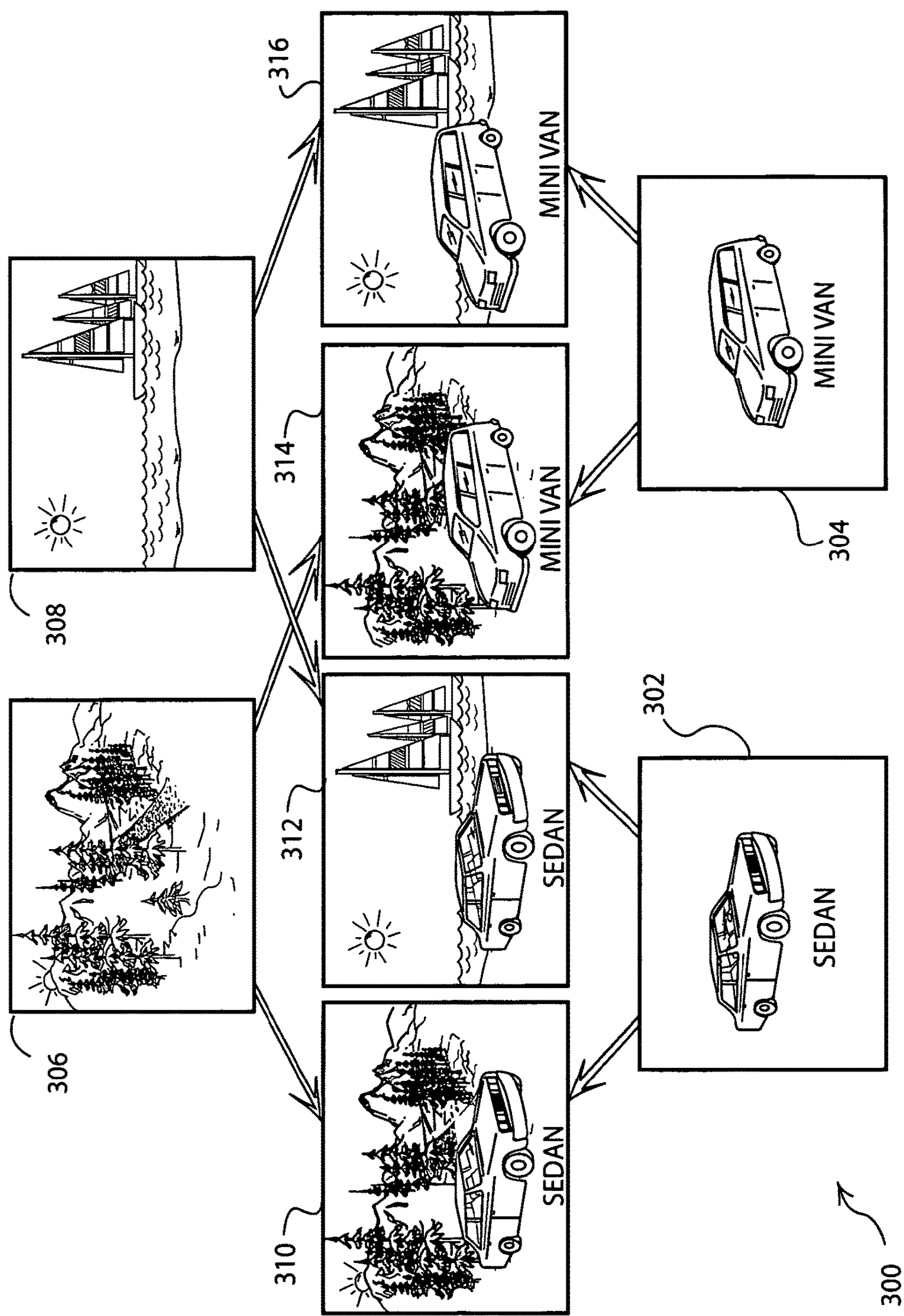
FIG. 3 is an illustration of an embodiment of the present invention wherein four video signals may be combined into four composite video signals.

FIG. 3 illustrates an embodiment 300 of the present invention wherein four video signals, 302, 304, 306, and 308, may be combined into four composite video signals 310, 312, 314, and 316. The video signals 302 and 304 represent advertisements for two different vehicles. Video signal 302 shows an advertisement for a sedan model car, where video signal 304 shows an advertisement for a minivan. The video signals 306 and 308 are background images, where video signal 306 shows a background for a mountain scene and video signal 308 shows a background for an ocean scene. The combination or composite of video signals 306 and 302 yields signal 310, showing the sedan in front of a mountain scene. Similarly, the signals 312, 314, and 316 are composite video signals.

In the present embodiment, the selection of which composite image to display on a viewer's television may be made in part with a local preference for the viewer and by the advertiser. For example, the advertiser may wish to show a mountain scene to those viewers fortunate enough to live in the mountain states. The local preferences may dictate which car advertisement is selected. In the example, the local preferences may determine that the viewer is an elderly couple with no children at home and thus may prefer to see an advertisement for a sedan rather than a minivan.

The methodology for combining the various video streams in the present embodiment may be color key replacement. Color key replacement is a method of selecting pixels that have a specific color and location and replacing those pixels with the pixels of the same location from another video image. Color key replacement is a common technique used in the industry for merging two video images.

Figure 4:
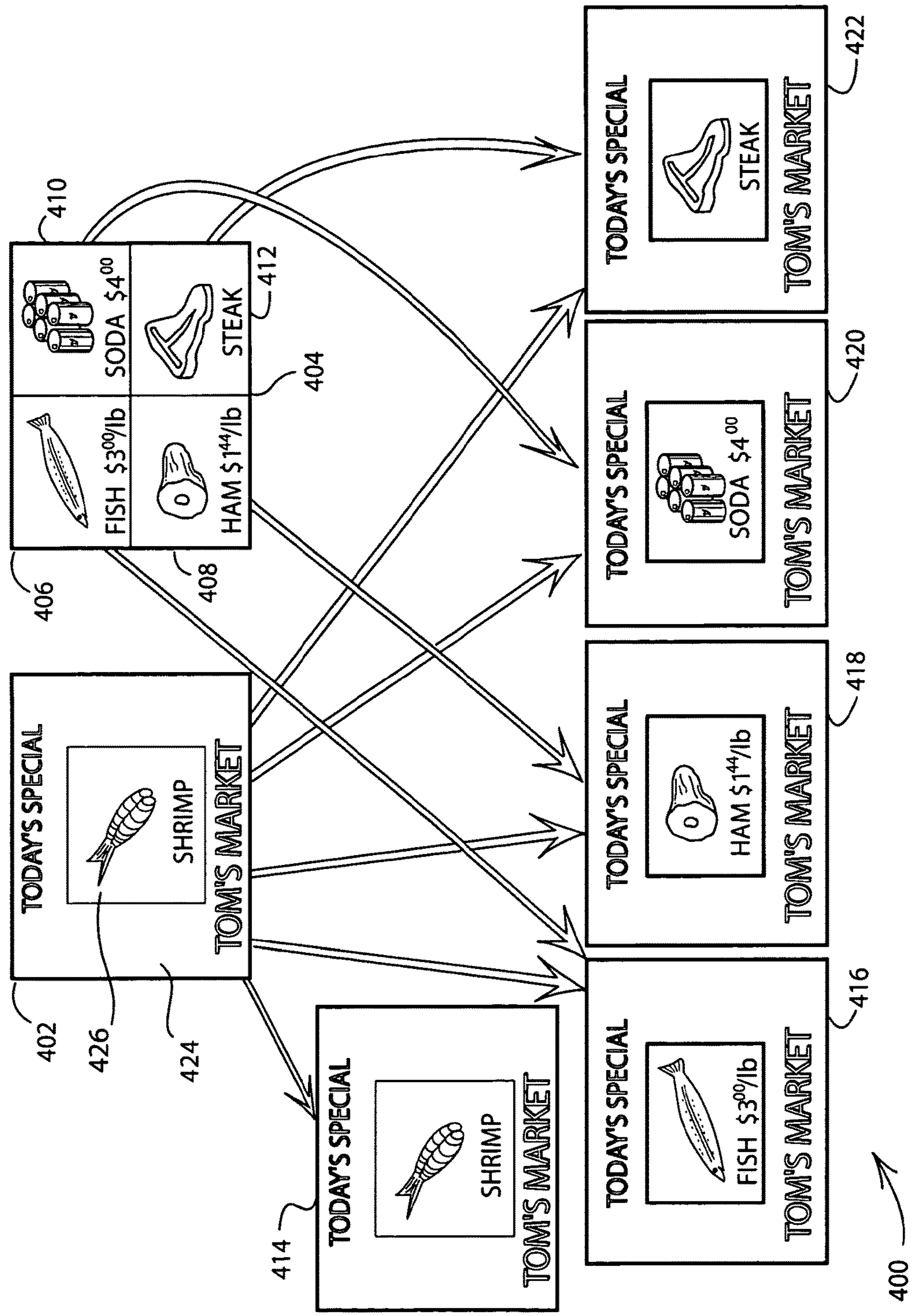
FIG. 4 is an illustration of an embodiment of the present invention wherein a main video image is combined with portions of a second video image to create five composite video signals.

FIG. 4 illustrates an embodiment 400 of the present invention wherein a main video image 402 is combined with portions of a second video image 404. The second video image 404 comprises four small video images 406, 408, 410, and 412. The small images may be inserted into the main video image 402 to produce several composite video images 414, 416, 418, 420, and 422.

In the embodiment 400, the main video image 402 comprises a border 424 and a center advertisement 426. In this case, the border describes today's special for Tom's Market. The special is the center advertisement 426, which is shrimp. Other special items are shown in the second video image 404, such as fish 406, ham 408, soda 410, and steak 412. The viewer preferences may dictate which composite video is shown to a specific viewer. For example, if the viewer is a vegetarian, neither the ham 408 nor steak 412 advertisements would be appropriate. If the person had a religious preference that indicated that they would eat fish on a specific day of the week, for example, the fish special 406 may be offered. If the viewer's preferences indicated that the viewer had purchased soda from the advertised store in the past, the soda advertisement 410 may be shown. In cases where no preference is shown, a random selection may be made by the set top box, a default advertisement, or other method for selecting an advertisement may be used. While FIG. 4 provides the center advertisement 426, it is noted that the advertisement may be located anywhere on the main video image 402.

Hence, the present invention provides a system in which a correlated or composite video signal can be generated at the viewer location. An advantage of such a system is that multiple video feeds can be provided and combined as desired at the viewer's location. This eliminates the need for generating separate combined video signals at a production level and transmission of those separate combined video signals over a transmission link. For example, if ten separate video feeds are provided over the transmission link, a total of ten factorial combined signals can be generated at the viewer's locations. This greatly reduces the number of signals that have to be transmitted over the transmission link.

Further, the present invention provides for interactivity in both an automated, semi-automated, and manual manner by providing interactive video feeds to the viewer location. As such, greater flexibility can be provided for generating a correlated video signal.

Figure 5:
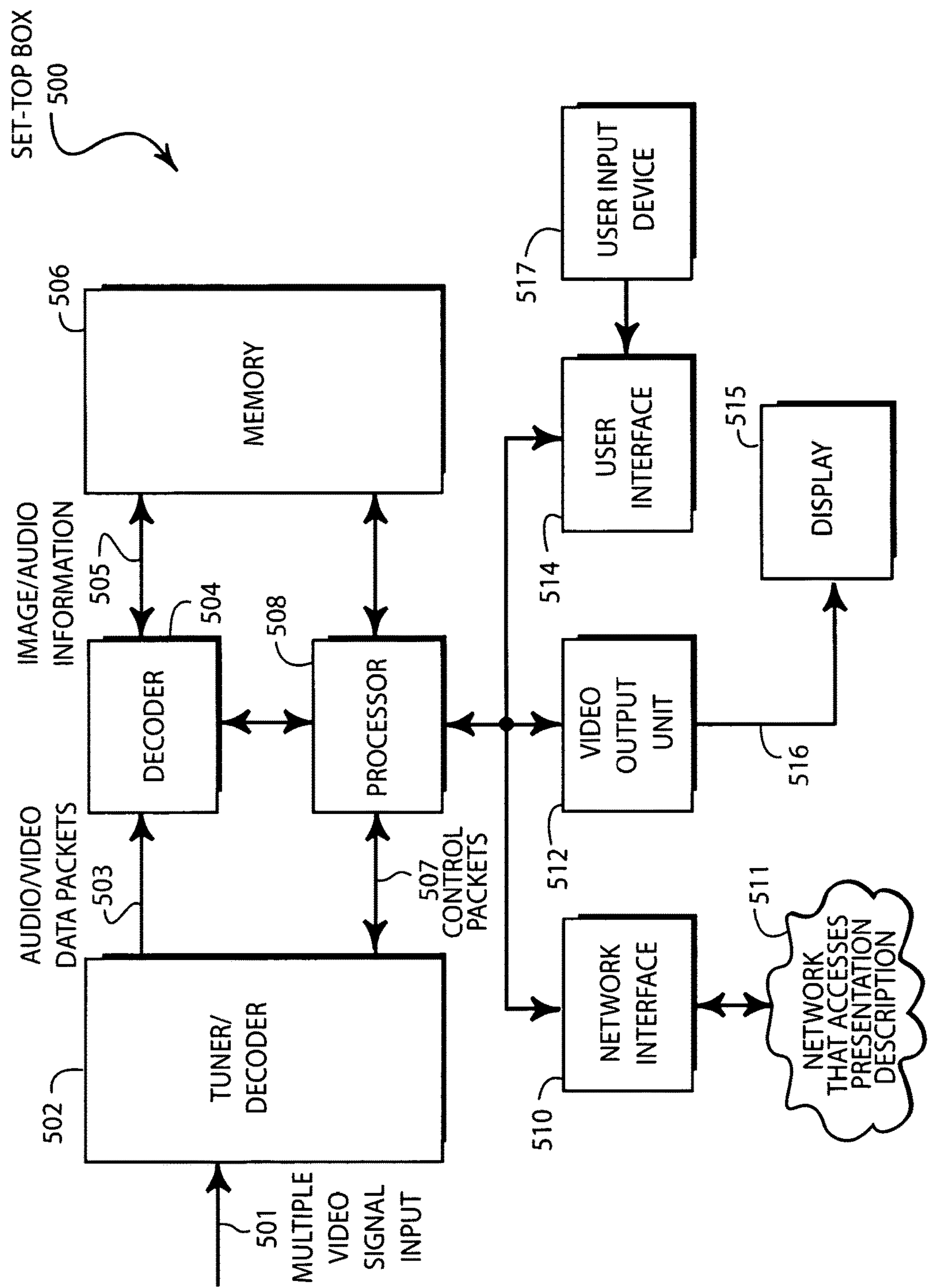
FIG. 5 depicts another set top box embodiment of the present invention.

FIG. 5 depicts another set top box embodiment of the present invention. Set top box 500 comprises tuner/decoder 502, decoder 504, memory 506, processor 508, optional network interface 510, video output unit 512, and user interface 514. Tuner/decoder 502 receives a broadcast that comprises at least two video signals 501. In one embodiment of FIG. 5, the tuner/decoder 502 is capable of tuning at least two independent frequencies. In another embodiment of FIG. 5, the tuner/decoder 502 decodes at least two video signals contained within a broadcast band, as may occur with QAM or QPSK transmission over analog television channel bands or satellite bands. "Tuning" of video signals may comprise identifying packets with predetermined PID (Packet Identifiers) values or a range thereof and forwarding such packets to processor 508 or to decoder 504. For example, audio and/or video data packets 503 may be transferred to decoder 504 and control packets may be transferred to processor 508. Data packets may be discerned from control packets 507 through secondary PIDs or through PID values in a predetermined range. Decoder 504 processes packets received from tuner/decoder 502 and generates and stores image and/or audio information 505 in memory 506. Image and audio information 505 may comprise various information types common to DCT based image compression methods, such as MPEG and motion JPEG, for example, or common to other compression methods such as wavelets and the like. Audio information may conform to MPEG or other formats such as those developed by Dolby Laboratories and THX as are common to theaters and home entertainment systems. Decoder 504 may comprise one or more decoder chips to provide sufficient processing capability to process two or more video streams substantially simultaneously. Control packets 507 provided to processor 508 may include presentation description information. Presentation description information may also be accessed employing network interface 510. Network interface 510 may be connected to any type of network 511 that provides access to a presentation description including modems, cable modems, DSL modems, upstream channels in a set top box and the like. Network interface 510 may also be employed to provide user responses to interactive content to an associated server or other equipment.

Processor 508 of FIG. 5 employs the presentation description to control the combination of the image and/or audio information stored in memory 506. The combining process may employ processor 508, decoder 504, or a combination of processor 508 and decoder 504. The combined image and or audio information, as created employing the presentation description, is supplied to video output unit 512 that produces and output signal for a television, monitor, or other type of display 515. The output signal 516 may comprise composite video, S-video, RGB, or any other format. User interface 514 supports a remote control, mouse, keyboard or other input device. User input 517 may serve to select versions of a presentation description or to modify a presentation description via user interface 514.

Figure 6:
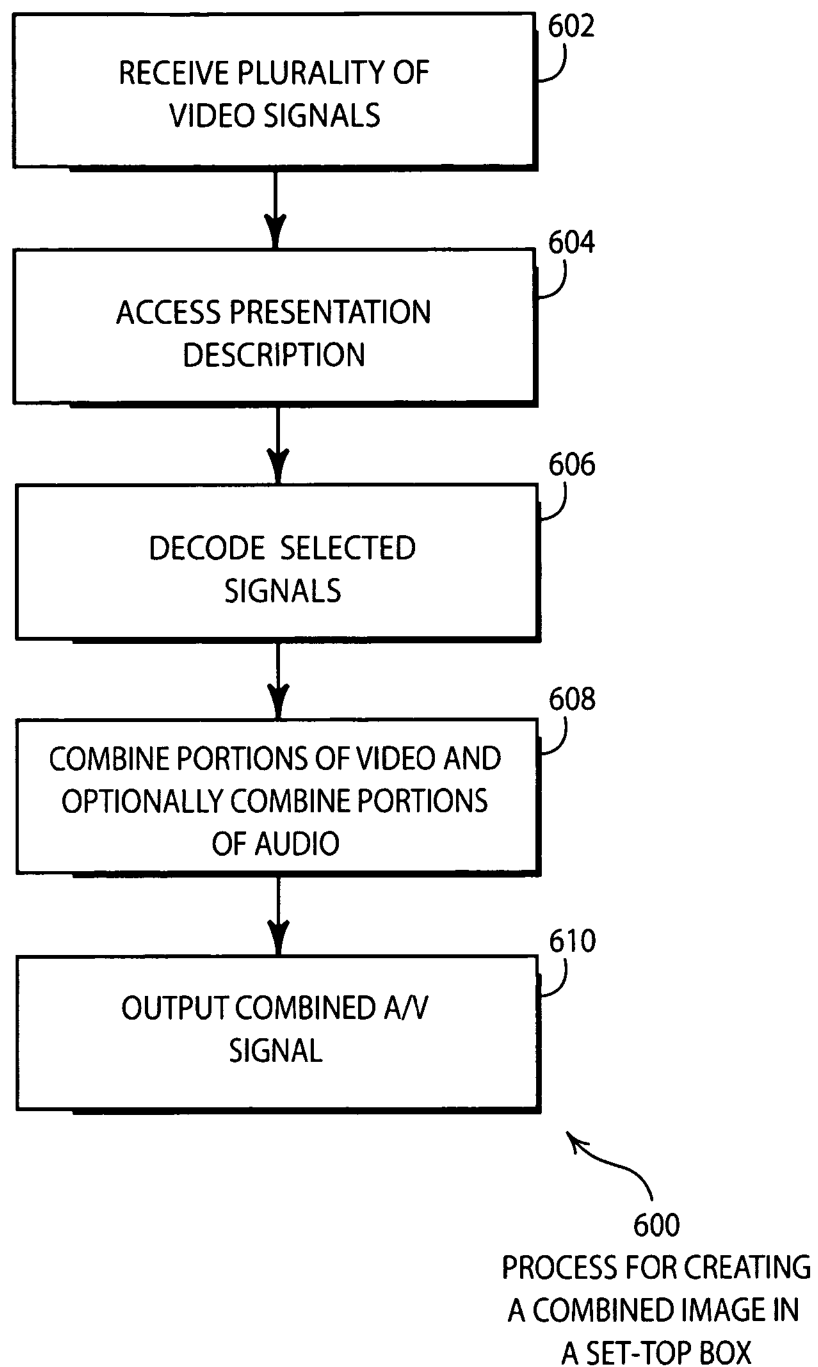
FIG. 6 depicts a sequence of steps employed to create a combined image at a user's set top box.

FIG. 6 depicts a sequence of steps 600 employed to create a combined image at a user's set top box. At step 602 a plurality of video signals are received. These signals may contain digitally encoded image and audio data. At step 604 a presentation description is accessed. The presentation description may be part of a broadcast signal or may be accessed across a network. At step 606, at least two of the video signals are decoded and image data and audio data (if present) for each video signal is stored in a memory of the set top box. At step 608, portions of the video images and optionally portions of the audio data are combined in accordance with the presentation description. The combination of video images and optionally audio data may produce combined data in the memory of the set top box, or such combination may be performed "on the fly" wherein real-time combination is performed and the output provided to step 610. For example, if a mask is employed to select between portions of two images, non-sequential addressing of the set top box memory may be employed to access portions of each image in a real-time manner, eliminating the need to create a final display image in set top box memory. At step 610 the combined image and optionally combined audio are output to a presentation device such as a television, monitor, or other display device. Audio may be provided to the presentation device or to an amplifier, stereo system, or other audio equipment.

The presentation description of the present invention provides a description through which the method and manner in which images and/or audio streams are combined may be easily be defined and controlled. The presentation description may specify the images to be combined, the scene locations at which images are combined, the type of operation or operations to be performed to combine the images, and the start and duration of display of combined images. Further, the presentation description may include dynamic variables that control aspects of display such as movement, gradually changing perspective, and similar temporal or frame varying processes that provide image modification that corresponds to changes in scenes to which the image is applied.

Images to be combined may be processed prior to transmission or may be processed at a set top box prior to display or both. For example, an image that is combined with a scene as the scene is panned may be clipped to render the portion corresponding to the displayed image such that a single image may be employed for a plurality of video frames.

The combination of video images may comprise the process of replacing and/or combining a portion of a first video image with a second video image. The manner in which images are combined may employ any hardware or software methods and may include bit-BLTs (bit block logic transfers), raster-ops, and any other logical or mathematical operations including but not limited to maxima, minima, averages, gradients, and the like. Such methods may also include determining an intensity or color of an area of a first image and applying the intensity or color to an area of a second image. A color or set of colors may be used to specify which pixels of a first image are to be replaced by or to be combined with a portion of a second image. The presentation description may also comprise a mask that defines which areas of the first image are to be combined with or replaced by a second image. The mask may be a single bit per pixel, as may be used to specify replacement, or may comprise more than one bit per pixel wherein the plurality of bits for each pixel may specify the manner in which the images are combined, such as mix level or intensity, for example. The mask may be implemented as part of a markup language page, such as HTML or XML, for example. Any of the processing methods disclosed herein may further include processes that produce blurs to match focus or motion blur. Processing methods may also include processes to match "graininess" of a first image. As mentioned above, images are not constrained in format type and are not limited in methods of combination.

The combination of video signals may employ program code that is loaded into a set top box and that serves to process or interpret a presentation description and that may provide processing routines used to combine images and/or audio in a manner described by the presentation description. This program code may be termed image combination code and may include executable code to support any of the aforementioned methods of combination. Image combination code may be specific to each type of set top box.

The combination of video signals may also comprise the combination of associated audio streams and may include mixing or replacement of audio. For example, an ocean background scene may include sounds such as birds and surf crashing. As with video images, audio may be selected in response to viewer demographics or preferences. The presentation description may specify a mix level that varies in time or across a plurality of frames. Mixing of audio may also comprise processing audio signals to provide multichannel audio such as surround sound or other encoded formats.

Embodiments of the present invention may be employed to add content to existing video programs. The added content may take the form of additional description, humorous audio, text, or graphics, statistics, trivia, and the like. As previously disclosed, a video feed may be an interactive feed such that the viewer may response to displayed images or sounds. Methods for rendering and receiving responses to interactive elements may employ any methods and includes those disclosed in incorporated applications. Methods employed may also include those disclosed in U.S. application Ser. No. 10/403,317 filed Mar. 27, 2003 by Thomas Lemmons entitled "Post Production Visual Enhancement Rendering", which is a continuation-in-part of U.S. patent application Ser. No. 10/212,289 filed Aug. 8, 2002 by Thomas Lemmons entitled "Post Production Visual Alterations", which is based upon U.S. Provisional Patent Application No. 60/309,714 filed Aug. 8, 2001 by Thomas Lemmons entitled "Post Production Visual Alterations", all of which are specifically incorporated herein for all that they teach and disclose. As such, an interactive video feed that includes interactive content comprising a hotspot, button, or other interactive element, may be combined with another video feed and displayed, and a user response the interactive area may be received and may be transferred over the Internet, upstream connection, or other network to an associated server.

FIGS. 7 through 25 illustrate, in more detail, the manner in which enhancements, such as HTML overlay pages, can be used to create embedded advertising in video programming.

Figure 7:
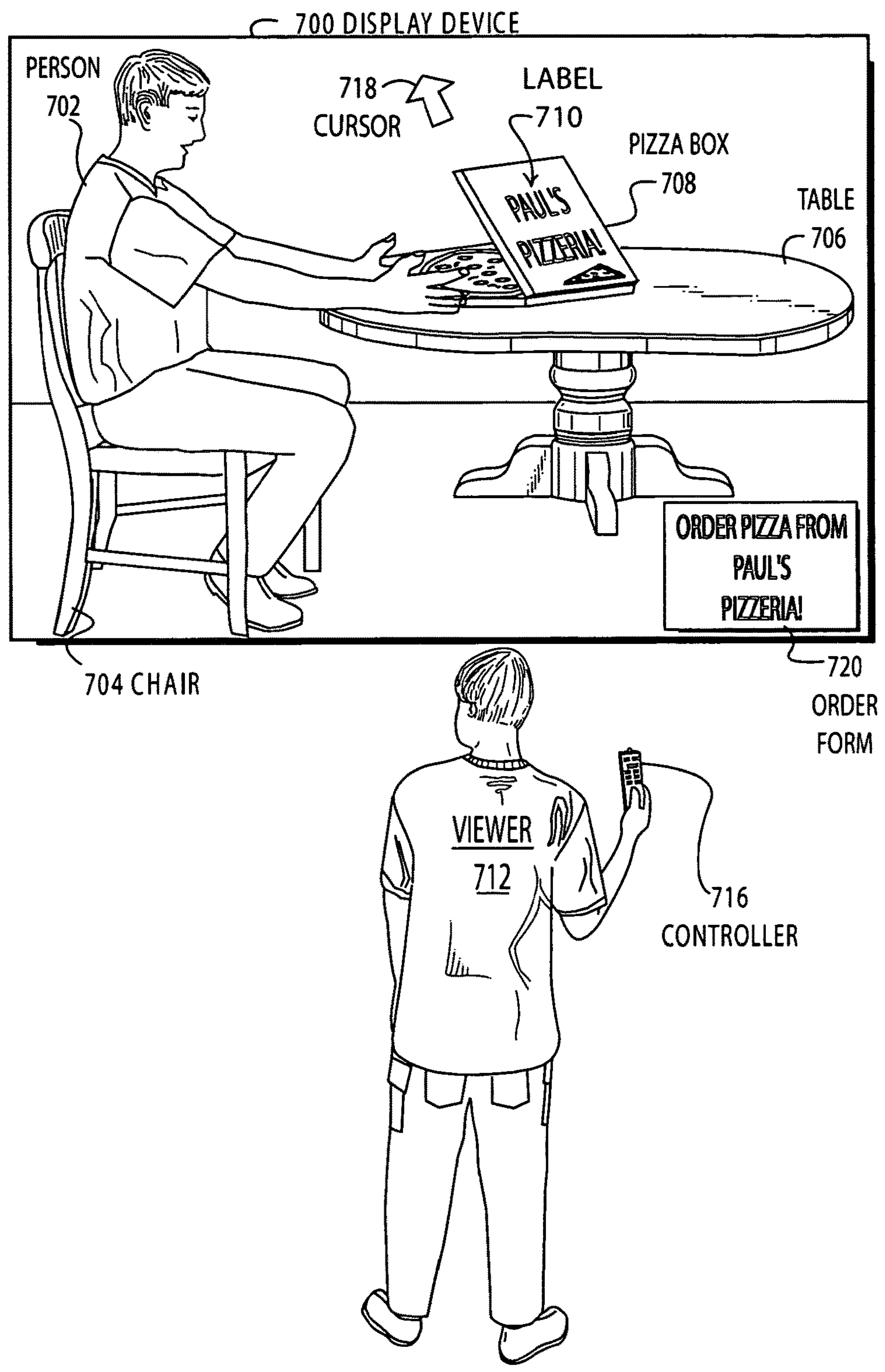
FIG. 7 is an illustration of one implementation of the present invention.

FIG. 7 is an illustration of one implementation for providing embedded advertising using enhancements. Referring to FIG. 7, a scene from a video broadcast is displayed showing various items or objects in the scene. The video may be displayed on a display device 700, such as a television set, which may comprise any type of display such as a plasma display, flat panel display, CRT monitor, or any other display. The video may also be displayed on a computer monitor displaying embedded ads within video streams over the Internet, or the video may be displayed on any other type of display system/device including movies displayed at movie theaters. In the scene, a person 702 is shown as sitting on a chair 704 at a table 706. The person 702 is seated in front of an object, such as a pizza box 708, from which the person is eating pizza. The object, or pizza box, may be automatically identified by some existing technique such as pattern recognition software, as will be discussed in more detail in FIG. 23. Alternatively, tags and markers, as disclosed in the above referenced patent applications, may be supplied in the video stream that provides the object identification information (pizza box) and location of the object in the video stream. The system may then determine if a pizza advertiser has been listed as an embedded advertiser. That is, a list may be compiled that comprises advertisers who wish to exhibit advertisements, in the form of embedded advertising, in a video presentation. The list of advertisers may also include the item (attribute), which may be in the form of a product, idea, etc., that the advertisers wish to promote. Such a list of advertisers and attributes may be stored in a database by the broadcaster. The list of advertisers and attributes is more fully disclosed with regard to the description of FIG. 9.

It is noted that due to the prominent location and activity involving the pizza box in the above example, a premium value or price may be requested for placement of an advertisement on the pizza box. The premium value may be in the form of a higher starting bid price or a higher fixed price as compared to a price for an ad location located away from the activity (e.g., a corner or bottom of the screen).

Referring again to FIG. 7, once an object, in this instance a pizza box 708, is recognized, the advertiser list may be queried for a pizza advertiser. If a pizza advertiser has been listed as an embedded ad advertiser, an embedded ad, which may be in the form of a logo, text, or other form of advertisement for the advertiser, is graphically displayed (superimposed or overlaid) on the pizza box. The process of applying, or superimposing, the embedded on the pizza box is discussed in further detail with regard to the description of FIG. 23. The embedded ad may comprise any form of video enhancement, including video sequences, text, graphical images that may be in bitmap format or any other format, or other graphical representation. If the embedded ad is a "hot label," (i.e., the embedded ad is an interactive enhancement), the viewer may then click on the hot label to order a pizza from that advertised store. Details of this process are further discussed with respect to FIG. 23.

Embedded ads may comprise enhancements to the original video signal, such as improvements, augmentations or new additions. For example, a company logo may be applied to a soda-can. The soda-can may already exist within the original video signal, or the soda-can may be inserted into the original signal. Alternatively, changes may comprise downgrades from the original video signal, such as degradations, reductions, or deletions. For example, a portion of the video may be "erased" in order to create a blank space, which may be used for applying embedded ads or displaying advertisements. Object insertion, in this fashion, can be done using either video combination techniques, such as disclosed above in FIGS. 1 through 7, or by using enhancements, such as markup language overlay pages, including interactive enhancements.

Embedded ads may be applied to any type of video content and video signals such as live or taped a television broadcasts, animation, filmed video and the like or may be captured as a magnetic or optical media file, such as in a Digital Video/Versatile/Variable Disc (DVD) feature-length film. Embedded ads may also comprise informational content such as markings. Content may be created by taping or filming, such as the filming of a live broadcast, a feature-length film, a television program, or other presentation. Content may also be created using animation. Cartoons on television or on feature-length films are one example of animation. Content creation may comprise computer animation. Computer animation is a principal component of multimedia presentations including feature-length films, and many software applications can be used to create animations that can be displayed on any display device, such as a computer monitor, television screen, or movie screen.

Of course, embedded ads may be applied to any form of viewing material, including educational programs, multimedia presentations, or entertainment presentations. Such multimedia or entertainment presentations may include digitally enhanced or computer enhanced presentations, animated presentations, which may include feature-length animated films, animated programs that are broadcast over a television network, DVD animated presentations, or other forms of animated presentations. Additionally, embedded ads may be applied to such multimedia or entertainment presentations as feature-length video films that may be shown in movie theatres, perhaps in a digital format, over fiber-optic connections, through laser technology, or through other technology.

As mentioned above, techniques to facilitate supplementary content in a video signal can also be accomplished by combining video signals. Such a technique is disclosed in U.S. Provisional Application Ser. No. 60/278,669, filed Mar. 20, 2001 entitled "DELIVERY OF INTERACTIVE VIDEO CONTENT USING FULL MOTION VIDEO PLANES", now U.S. Non-Provisional application Ser. No. 10/103,545, filed Mar. 20, 2002 entitled "VIDEO COMBINER", both of which are specifically incorporated herein by reference for all that they discloses and teach. In accordance with the above referenced application, the system is capable of combining video signals that incorporate embedded ads at the viewer's location. For example, multiple video feeds, some of which can include embedded ads, are provided to a viewer's set-top box together with instructions for combining two or more video feeds. The video feeds can then be combined in a set-top box or otherwise located at or near the viewer's location to generate the combined or correlated video signal for display with embedded ads. As mentioned above, the video feeds can be combined by the TV broadcaster prior to transmission over the video distribution network.

Additionally, one or more video feeds can comprise enhanced video that is provided from an Internet connection. HTML-like scripting can be used to indicate the layout of the enhanced video signal. Instructions can be provided for replacement of particular segments comprising the embedded ads space, to make an interactive embedded advertisement.

Hot labels (interactive embedded ads) can appear unobtrusively during a video broadcast. As disclosed above, the embedded ad itself can be an interactive element which is placed on specific objects that relate to the advertising element or in a blank portion of the screen. As also disclosed above, embedded ads may not be interactive (e.g., embedded ads may exist simply as an advertisement or informational material that is part of the video stream). Insertion of video content to produce combined video streams, as well as insertion of interactive content can be accomplished by using tags and markers inserted into the video stream as disclosed in U.S. Non-Provisional application Ser. No. 10/076,950, filed Feb. 12, 2002, which is based upon U.S. Provisional Application Ser. No. 60/268,350, filed Feb. 12, 2001 entitled "VIDEO TAGS AND MARKERS", both of which are specifically incorporated herein by reference for all that they disclose and teach.

Embedded ads that are interactive links can allow for superimposition of interactive embedded ad information on products. Embedded ads may appear as a visual enhancement, such as a logo or name, and thus an advertisement of any party or advertiser, such as a local or national company, or simply informational. Embedded ads can also be individualized, localized advertisements. An embodiment may employ pattern recognition techniques that provide an automated method of identifying objects on which to place embedded ads that pertain to the object. Embedded ads may be localized to a point where specific advertisements can be superimposed from set top-boxes, so that advertising can be personalized down to the household or individual viewing level.

Embedded ads may be applied to content by creating "embedded ad space," or space within the content (which may be a video stream), that is available for application of an embedded ad. The designation of such embedded ad space may be completed by manual or automatic methods. The embedded ad or type of embedded ad to be superimposed may be chosen based on "attributes," as further explained with regard to the description of FIG. 9. A list of advertisers, along with the advertisers' associated attributes, may be stored in a database. "Attributes" are a class of actual objects, or blank spaces that may be associated with an advertiser or with types or classes of information. An embedded ad may be applied, to the embedded ad space within the video stream, according to the class of object or blank space identified within the video stream. The identified object or blank space (within the video stream) may be compared to objects, classes of objects or blank spaces listed as attributes within the aforementioned database. Once a matching actual object or blank space is found, an appropriate embedded ad is chosen and applied to the embedded ad space within the video stream.

Referring again to FIG. 7, the embedded ad 710 appears as a logo of a local franchise called "Paul's Pizzeria." The embedded ad may be an actual logo, name, or advertisement of a company that can be either a local company or national chain and may exist as a non-obtrusive advertisement that appears to be an actual element of the originally filmed scene. The embedded ad 710 appears as a logo on the actual pizza box, thus appearing completely naturally in the scene. The embedded ad 710 may exist as a non-interactive enhancement that is part of the video signal, and thus the embedded ad may simply exist as an advertisement, or the embedded ad may be an interactive element that has the functionality to be activated by the viewer, thus acting as an advertisement and interactive tool.

Again referring to FIG. 7, if the embedded ad 710 is interactive, the embedded ad may be activated by the viewer 712. As previously described, the "viewer" is a person watching the video. Activation of the embedded ad 710 may occur in several ways, including toggling through a series of embedded ads using control buttons on some form of a hand-held control device 716, such as a remote-control, activating a cursor 718 using a wired or wireless mouse, or by other means including but not by way of limitation, light beams, such as IR beams that can be used as pointers to point at embedded ads. Such a system may operate in a fashion similar to a touch screen that identifies the light beam rather than a user's finger. A cursor 718 may be an indicator, such as a spot, a flashing line, an arrow, a symbol, or any other indicator, that is displayed on the TV screen 700. The cursor position may be controlled by another form of a hand-held control device, such as a wired mouse or a wireless mouse (not shown) in a similar fashion to that of a mouse being connected to a computer and monitor. Once activated, the embedded ad may make available a host of options, including bringing up an order form 720, which may allow the viewer to begin the process of directly ordering a pizza. The order form 720 may appear on an unused portion of the TV screen 700, thereby causing no interruption of the current video presentation.

Figure 8:
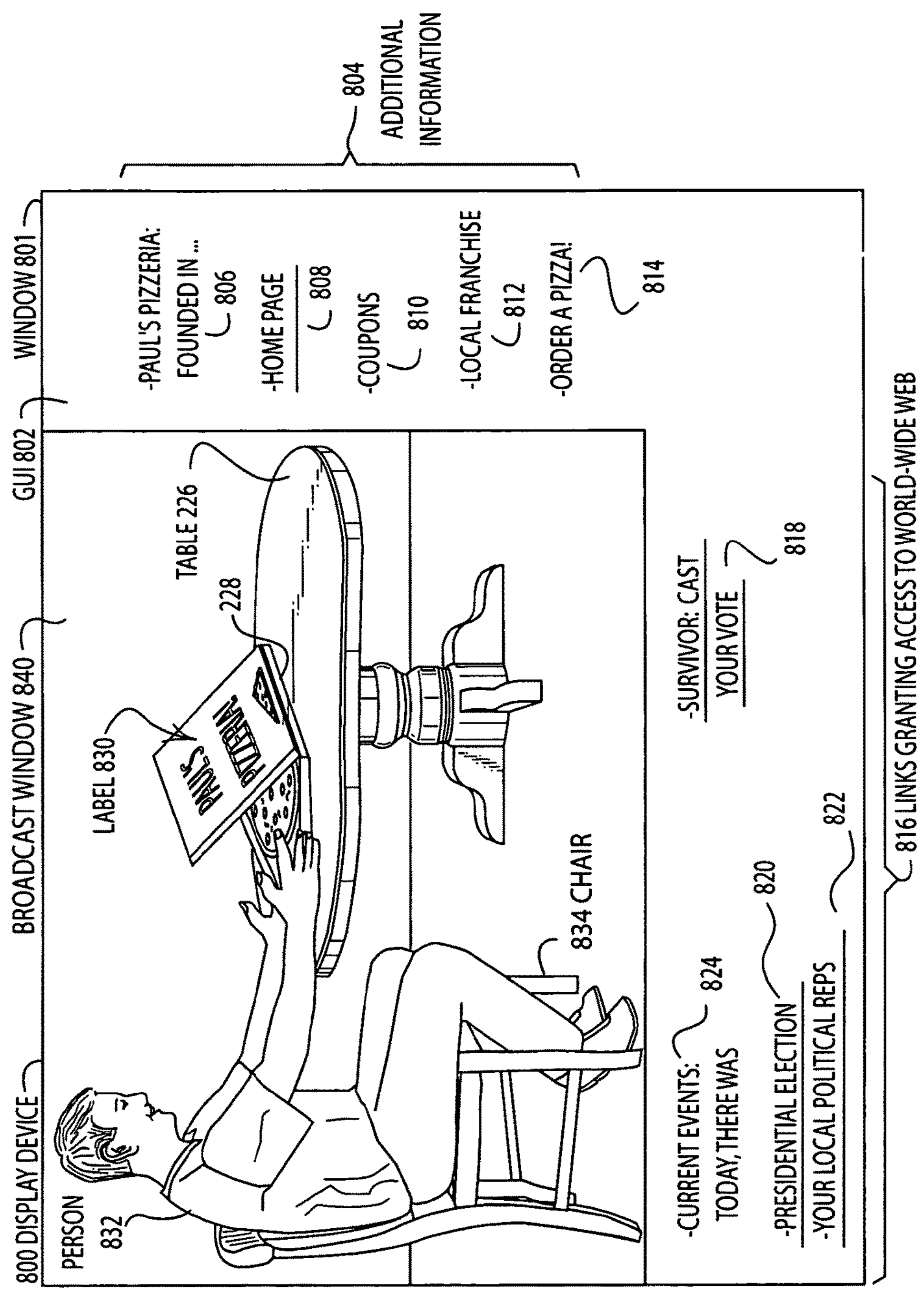
FIG. 8 is an illustration of the manner in which interactive content may be displayed.

FIG. 8 is an illustration of the manner in which interactive content may be displayed. Once activated, the embedded ad (as referred to in FIG. 7) may display information in an enhanced content window or border area 801. The current video presentation shown on display device 800 may remain viewable in the broadcast window 840. As shown in FIG. 8, the displayed video that includes the same objects that appeared in FIG. 7, including the table 826, pizza box 828, embedded ad 830, person 832, and chair 834, remain visible. Alternatively, the information brought up by the embedded ad may be displayed on a completely separate page. The embedded ad may bring up a graphical user interface (GUI) 802, a text box, or some other presentation scheme that serves to present information in some manner to the viewer. The GUI 802 may present additional information 804 about the company for which the embedded ad has been activated. Such additional information may be submitted by the advertiser or by the author (e.g., person examining and/or editing the video signal). The additional information 804 may be contained in a separate storage device, such as a database. The database containing additional advertiser information is more fully disclosed with regard to the description of FIG. 9. Once an embedded ad is activated, this corresponding database can be accessed for the additional information. The separate database may be located in a central computer, or on multiple computers, which may be a server at the head-end, a retransmission site, other site, or in the household of the viewer in a set-top box. The central computer is more fully disclosed with regard to the description of FIGS. 17 and 18. The central computer inserts the embedded ad. Insertion of the embedded ad is discussed in further detail in FIG. 23.

Figure 17:
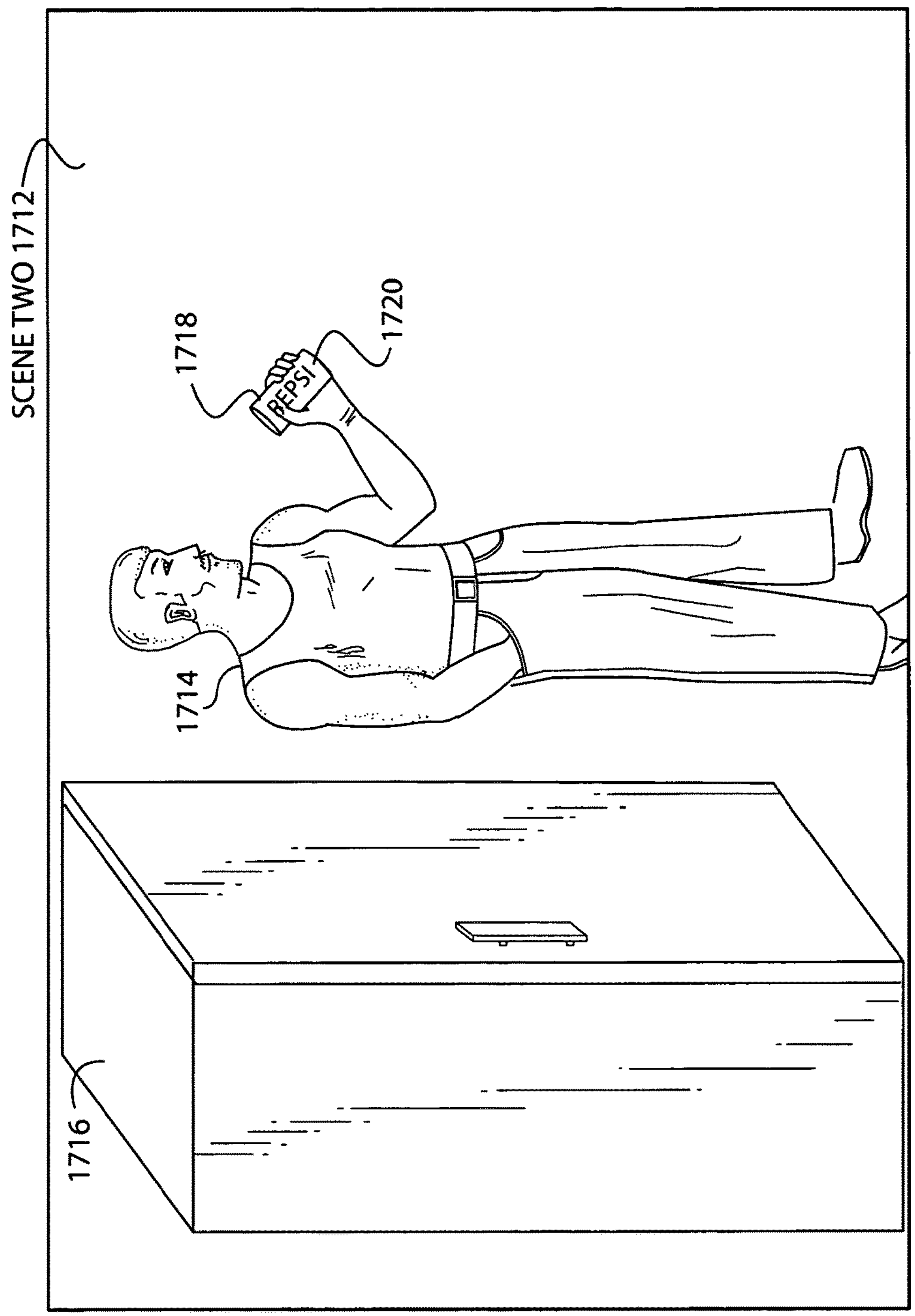

Referring again to FIG. 8, the additional information 804 may include company profile 806, web address 808, coupons 810, or other information. The web address 808 may simply be an address that is non-interactive and is simply there for the viewer to take note of and to have the opportunity to visit that address at a later time, or the web address may act as a direct, interactive link. The interactive link 808 may link the viewer to the company home page, or the company website that allows the viewer to make a purchase 814. That is, the "order a pizza" website 814 may be a special website designed specifically for viewer interaction with embedded ads. In addition, if the advertiser is a national company, the additional information may include local distributors or franchises 812 of the national company. The embedded ad may provide a link to the local server to provide information regarding the local store. For example, if Paul's Pizzeria is a national chain, the local broadcaster may superimpose the local franchise of Paul's Pizzeria at the server at the head-end, as illustrated in FIG. 17. The viewer, when clicking on the embedded ad, will see their local Paul's' Pizzeria in the additional information display and be able to order a pizza directly from their local store.

Furthermore, the viewer may also have the choice of accessing links that have nothing to do with the current video presentation. For example, on a different part of the graphical user interface 802, the viewer may be able to activate links 816 that facilitate access to the world-wide-web. For example, the viewer may be able to cast a vote 818 on which character the viewer liked the best during a particular television program such as the "Survivor" series. The viewer may also be able to cast a vote 820 for elections, read about their local political representatives by clicking on an interactive link 822 and entering their local information, or even read about current world events 824.

Figure 9:
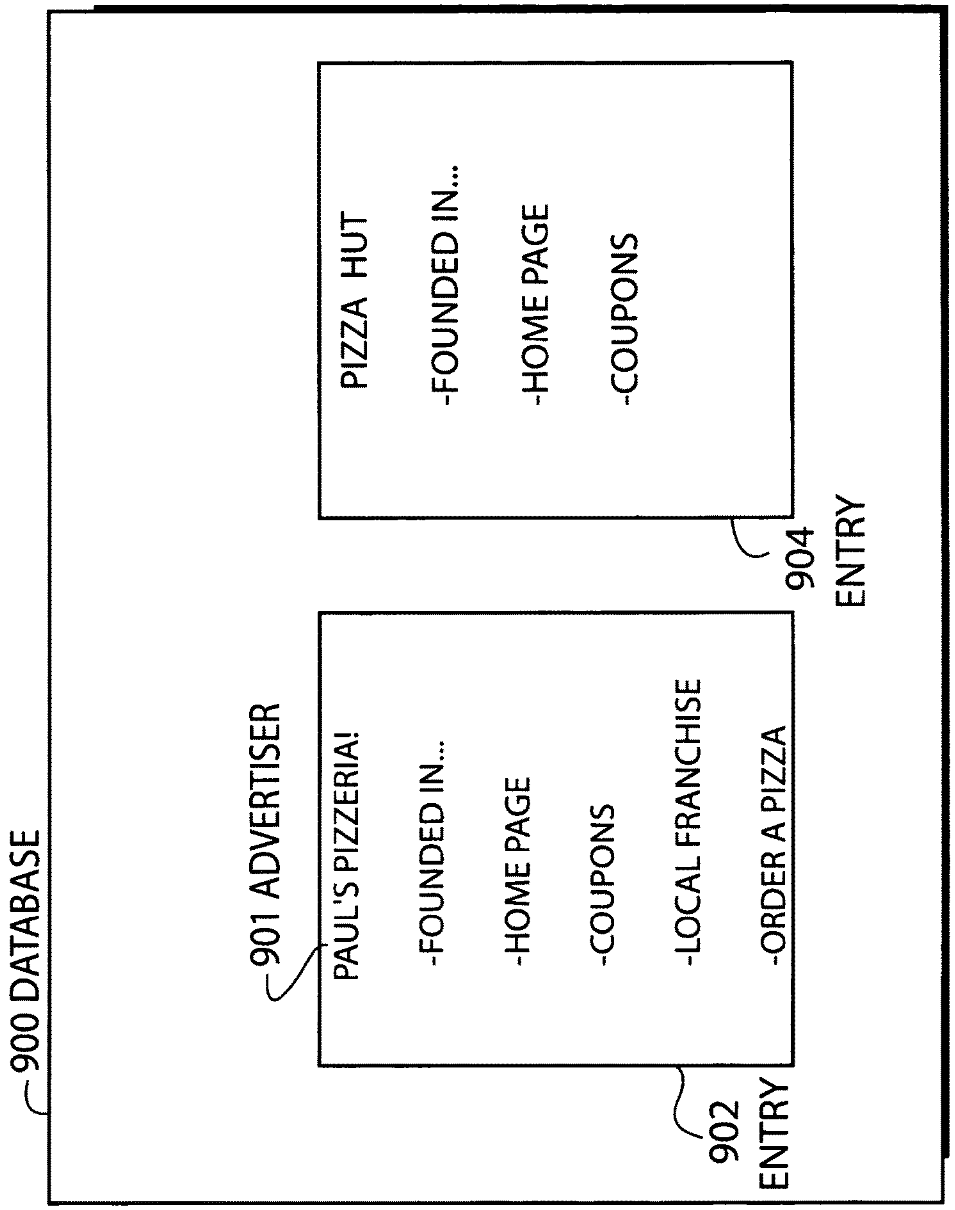
FIG. 9 is a graphical representation of a database that provides a list of additional information associated with advertisers.

FIG. 9 is a graphical representation of a database that provides a list of additional information associated with advertisers, as listed in database 900. As previously mentioned with regard to the description of FIG. 8, the additional information of an advertiser may be contained in a storage device, such as a database 900. As illustrated in FIG. 9, such additional information may be submitted as an entry 902. For example, one entry may be for the advertiser's name, Paul's Pizzeria 901, with additional associated information that may include company profile, web address, coupons, or other information. The additional information may be submitted by the advertiser and/or by the author. Additionally, other advertisers may be stored in the same database along with similar information, as a separate entry 904.

Figure 10:
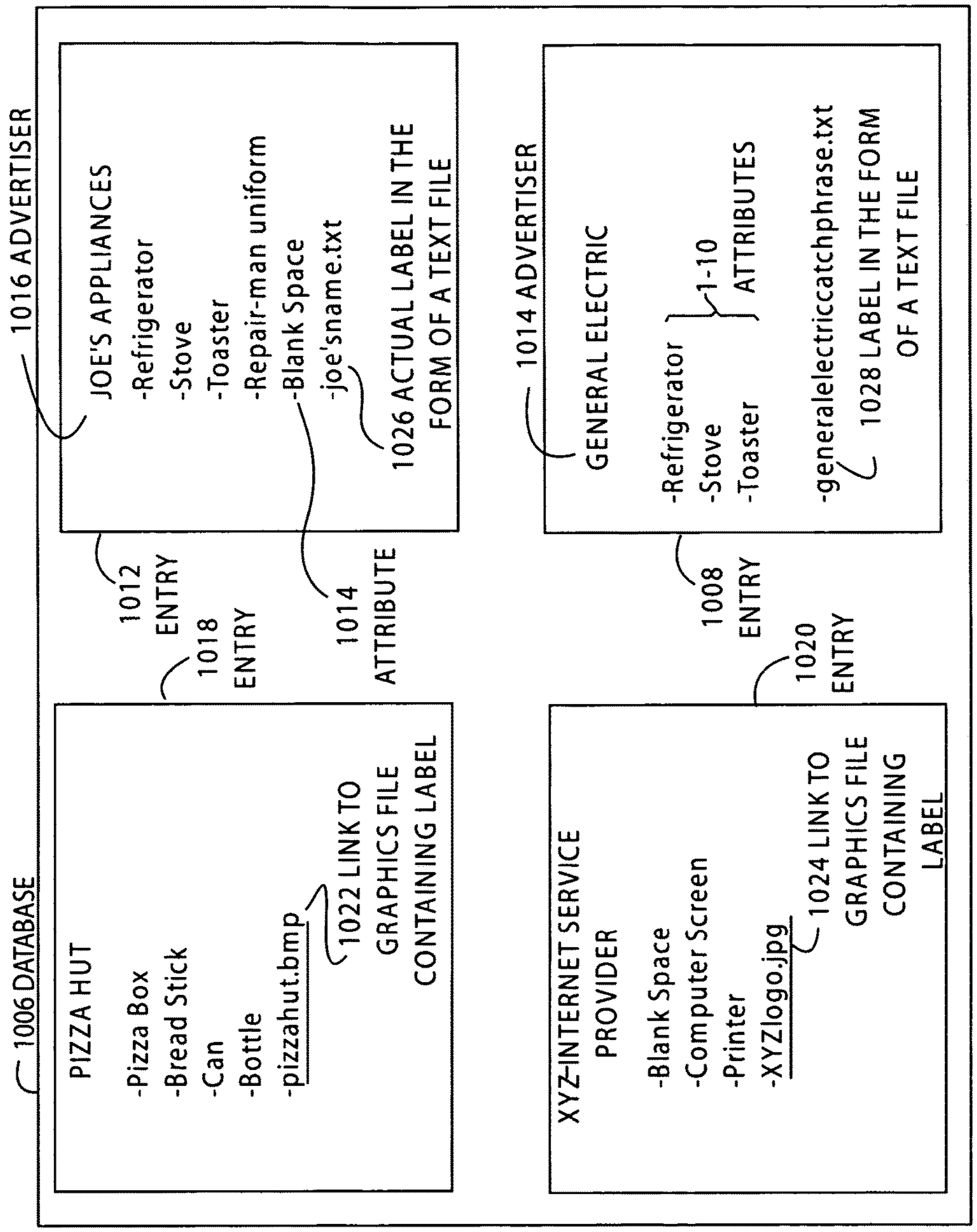
FIG. 10 is a graphical representation of a database that provides a list of attributes associated with advertisers.

FIG. 10 is a graphical representation of a database that provides a list of attributes associated with advertisers, as listed in database 1006. Database 1006 may also contain an embedded ad itself, or a link to an embedded ad. Referring to FIG. 10, in order to paint the embedded ad onto a particular object or even onto a blank space, there is a determination of whether or not there is an appropriate embedded ad to apply. Thus, a list of advertisers is stored in a storage device, such as a database 1006, along with associated attributes. "Attributes" are defined as any actual object or categories of objects that are associated with the advertiser, or "blank space," which will subsequently be explained. Attributes may be submitted by the advertiser and/or by the author. Referring to FIG. 10, an advertiser, as may be seen as one entry out of many, is stored in the database 1006. For example, the advertiser General Electric 1014 may be an entry 1008. General Electric may be accompanied by a list of attributes 1010. Such attributes 1010 may include actual objects, such as "stove," "refrigerator," "toaster," and other actual objects or categories such as appliances, etc. Alternatively, advertisers may wish to have the opportunity to advertise on an available blank space; in this case, the advertiser may submit "blank space" as one of their attributes. For example, the advertiser Joe's Appliances 1016, as seen in entry 1012, may elect to list "blank space" 1014 as an attribute, which would allow Joe's Appliances the opportunity to bid on a blank space in the video content as well as to apply an advertisement to an actual object. Blank space may be further constrained to specific areas such as the dasher boards below the Colorado Avalanche hockey bench. Blank space advertising is more fully disclosed with regard to the description of FIGS. 11 and 12. Additionally, other advertisers may be stored in the same database along with similar information, as other entries such as 1018 and 1020. In addition, this database may store the file name of and/or link to an embedded ad graphics file, which may be stored in a separate location. Alternatively, the database may contain embedded ad text files 1026, 1028. These concepts are more fully disclosed with respect to the description of FIGS. 13 and 14. The manner in which a company is chosen as an advertiser using an embedded ad is discussed in greater detail in FIG. 24. If the system of the present invention finds a pizza advertiser in the list of advertisers, an embedded ad is painted onto the identified pizza box, at which time the viewer may click on the embedded ad and order a pizza. The process of applying the embedded ad is discussed in greater detail in FIG. 23.

Figure 11:
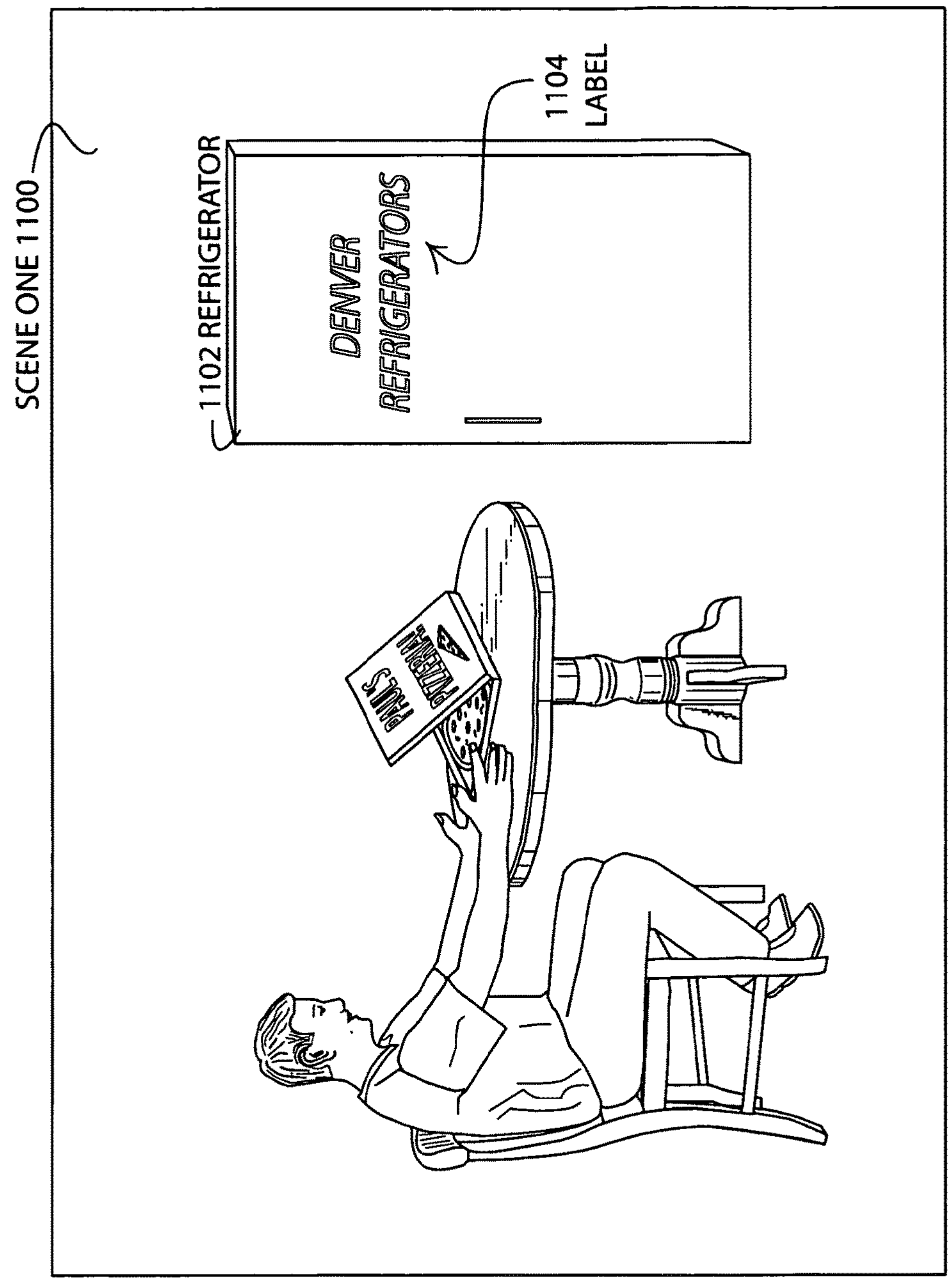
FIGS. 11 and 12 are illustrations of scenes showing other implementations of the present invention.
Figure 12:
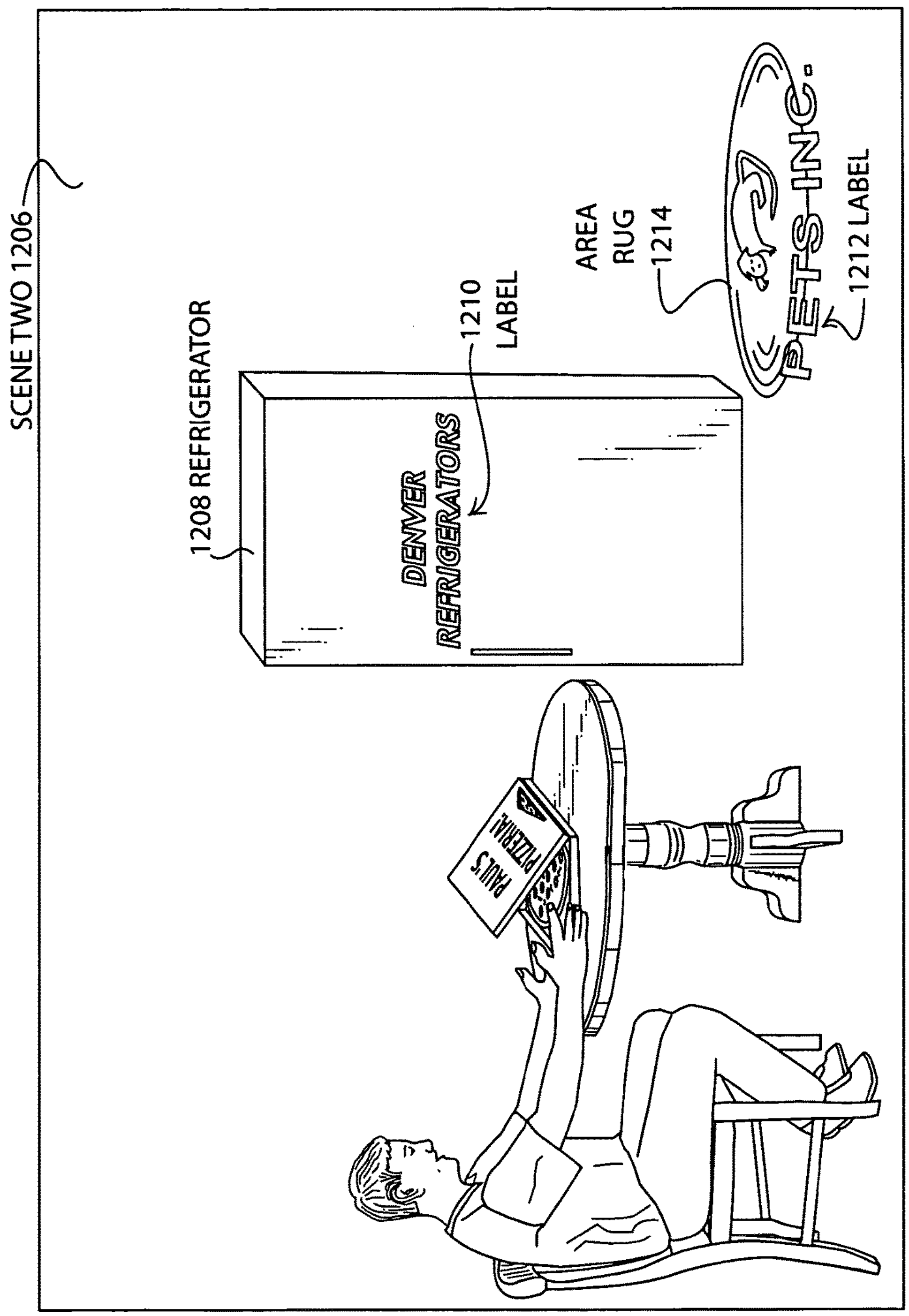

FIGS. 11 and 12 are illustrations of scenes showing other embodiments. Embedded ads can be coded to change on a per-scene basis. As illustrated by FIG. 11, in scene one 1100 of a television show, a refrigerator 1102 may be superimposed (e.g., overlaid) with an embedded ad 1104. In scene two 1206, the camera angle is different, which changes the position of the refrigerator 1208. During this scene, the embedded ad 1210 remains on the refrigerator. Furthermore, instead of the embedded ad appearing as a normal part of the scene as illustrated by embedded ads 1104 and 1210, an embedded ad 1212 may appear larger and more apparent, such as text written outside the boundaries of the area rug 1214, thus appearing to the viewer as an obvious part of the scene.

Figure 13:
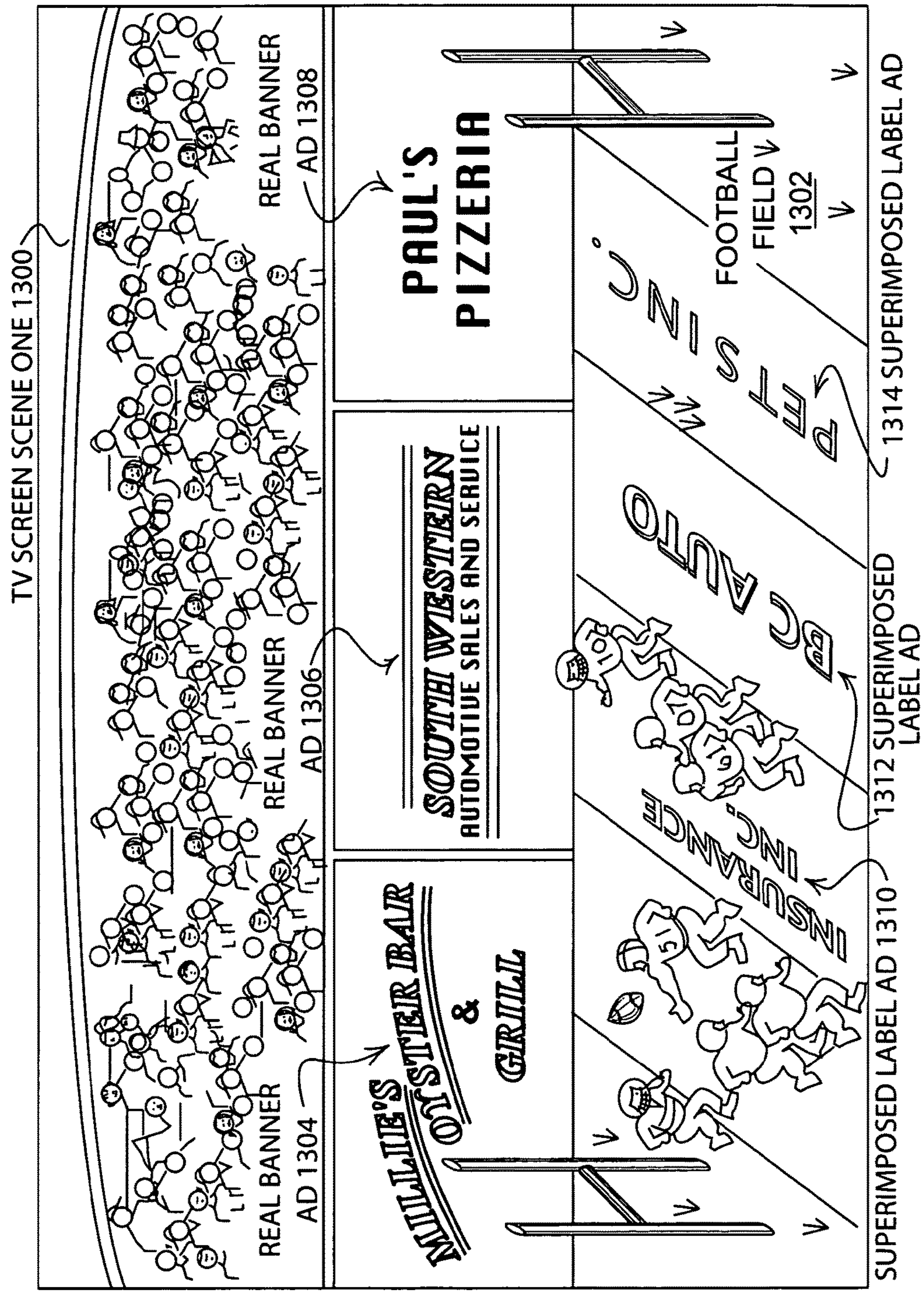
FIGS. 13, 14, and 15 are illustrations of scenes showing other implementations of the present invention.
Figure 14:
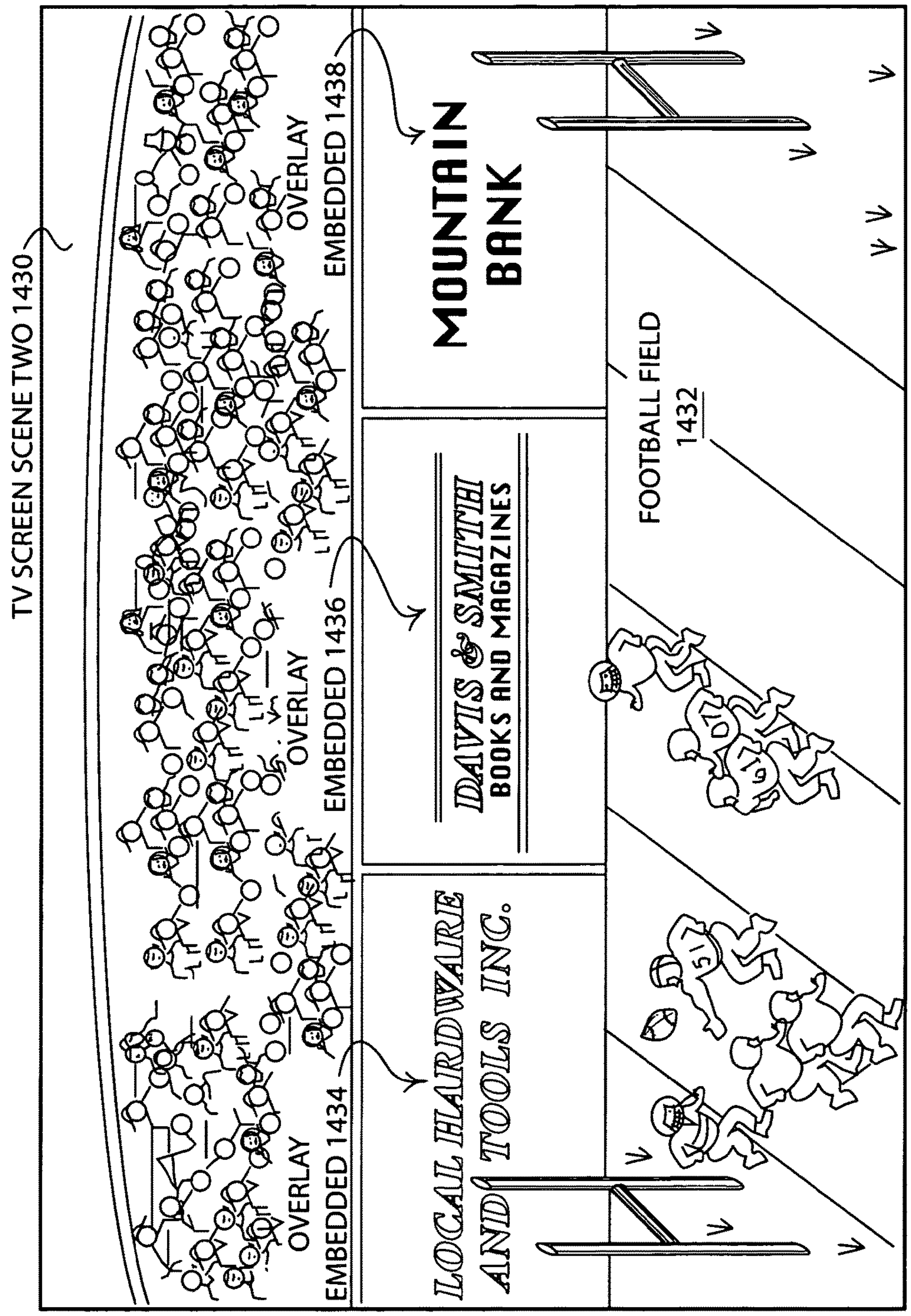
Figure 15:
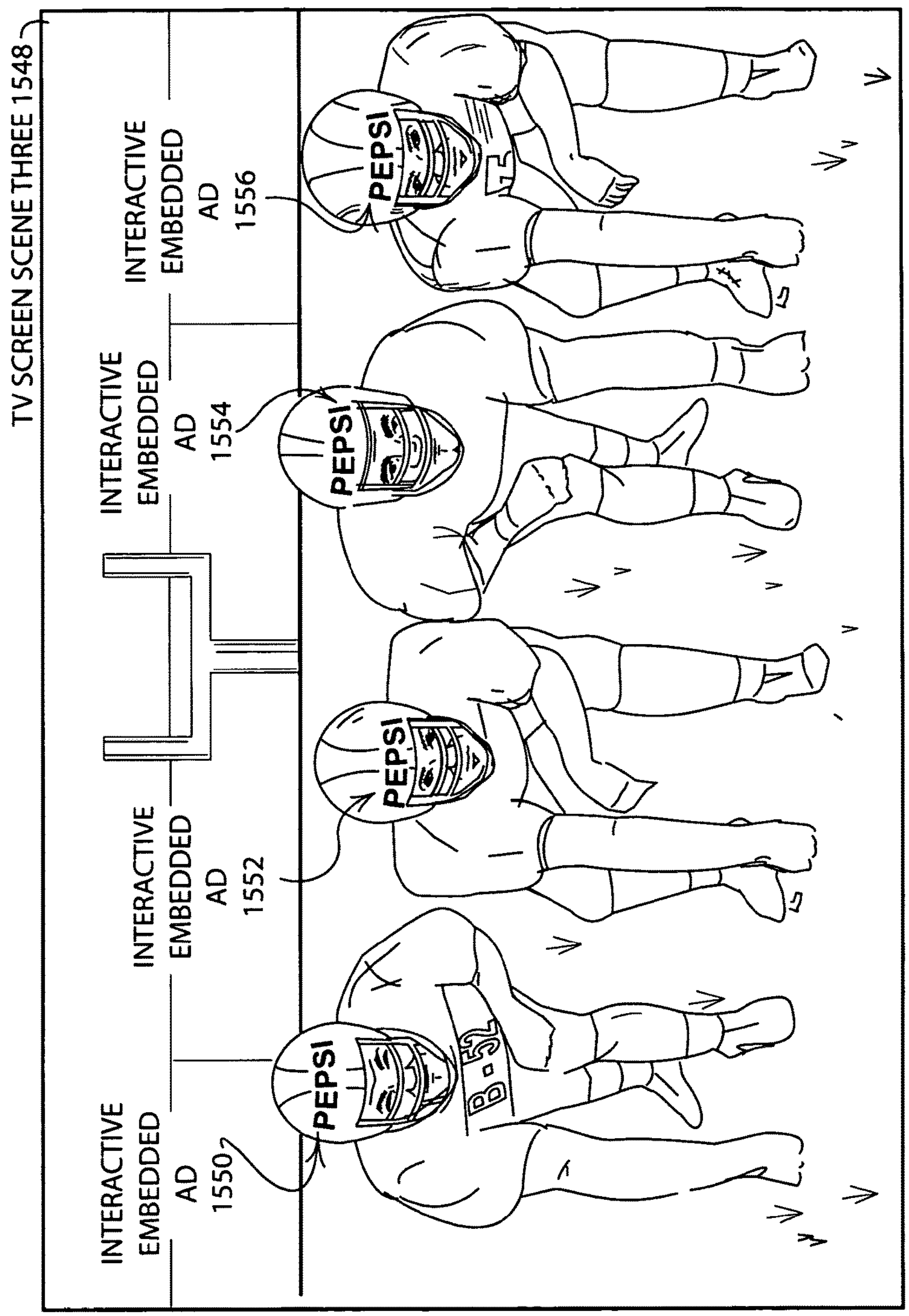

FIGS. 13, 14 and 15 are illustrations of scenes showing other embodiments. As shown in FIG. 13, a football game is displayed on a display screen 1300. The scene illustrates a football field 1302 and viewing stands with real banner ads 1304, 1306 and 1308 as typically found in sports arenas. Embedded advertising is supplemented in this pre-existing video signal by superimposing embedded ads 1310, 1312, and 1314 on to the playing field 1302. Thus, the final enhanced video signal appears to the viewer as though the field embedded ads 1310, 1312, and 1314 are inherent to the setting and look as if they are a natural part of the scene.

In example embodiments, different ad locations on the playing field may be valued differently. For example, because the action in the football game is centered around a location of the ad 1310, that ad location may cost more for the advertiser (e.g., have a higher value) than an ad location further away from the action (e.g., where the ad 1314 is positioned). In another example, an ad location near the fifty yard line in the football game may be valued or priced higher than an ad location near the thirty yard line. Additionally or instead, the value may differ based on the size of the ad location. For example, a larger ad size may command a higher price than a smaller ad size at the same ad location. However, a larger ad size in a less desirable location (e.g., off to a side) may not be valued as high as a smaller ad size in a more prominent location (e.g., center of the display screen).

In FIG. 14, a display screen 1430 is shown wherein embedded ads 1434, 1436, and 1438 are superimposed over the top of the real banner ads that existed in the un-enhanced video signal. The enhanced video signal completely obscures the real banner ads present at the sports arena and appears to the viewer as though the superimposed embedded ads 1434, 1436, and 1438 are inherent to the setting and are a natural part of the scene. In this way, local embedded advertising can supercede national embedded advertising for different regions of a nationally broadcast program. FIG. 14 also illustrates an informational embedded ad 1440 placed on the football field 1432 denoting the end zone of the team on offense. Similarly, the ad locations over the real banner ads may dictate different values (e.g., price for ad location of ad 1436 may be higher or lower than price for ad location of ad 1438).

In FIG. 15, a display screen 1548 is shown wherein interactive player name embedded ads 1550, 1552, 1554 and 1556 are superimposed over the helmets of the football players in a game. In this instance, the enhanced video signal is not viewed as inherent to the setting and the embedded ads may be used as hot labels to bring up additional player information when accessed. This information can include personal, biographical or statistical data or the like for the accessed player but requires the user to click on the embedded ad.

Figure 16:
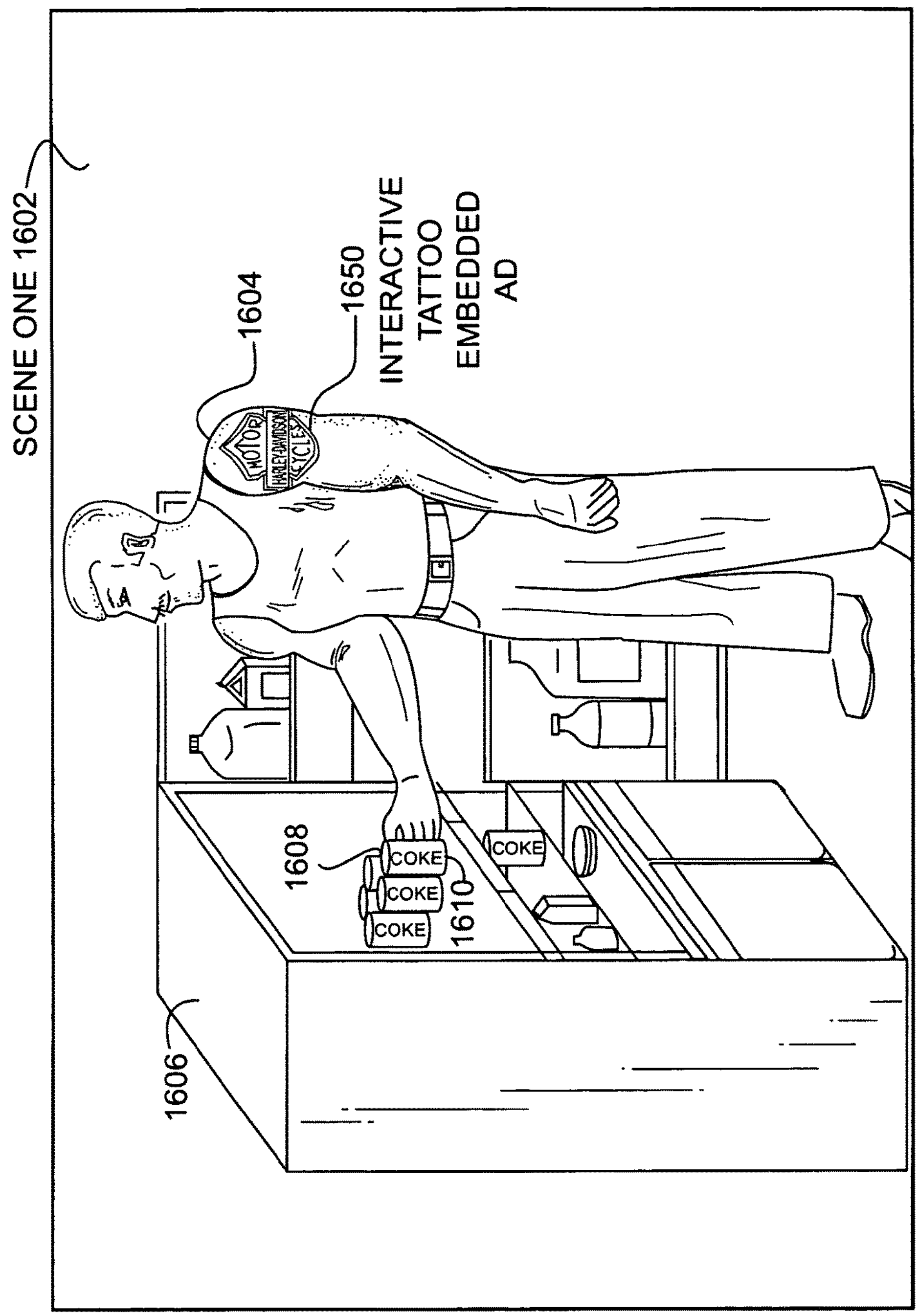
FIGS. 16 and 17 are illustrations of scenes showing other implementations of the present invention.

FIGS. 16 and 17 are illustrations of scenes showing other embodiments. Each time that an embedded ad appears in a new scene, the embedded ad may be a different advertisement. As shown in FIG. 16, scene one 1602, the person 1604 reaches into an open refrigerator 1606 for a soda can 1608. The embedded ad 1610 is a "Coke" logo. In FIG. 17, scene two 1712, the same person 1714, while standing beside the closed refrigerator 1716, drinks from the soda can 1718. The embedded ad 1720 is now a "Pepsi" logo. Applying embedded ads in this fashion may be done through pattern recognition and localized superimposition of ads, as will subsequently be explained.

FIG. 16 also illustrates the addition of an interactive tattoo embedded ad. In scene one 1602 the person 1604 is depicted with tattoo containing nationally recognized logo 1650 superimposed on the persons arm. In this scene, the tattoo is overlaid with a transparent background to look like a natural part of the scene. Accessing this interactive hot label may link the viewer to either the home page of the company depicted in the nationally recognized logo or to an address and phone number of a local tattoo shop.

Figure 18:
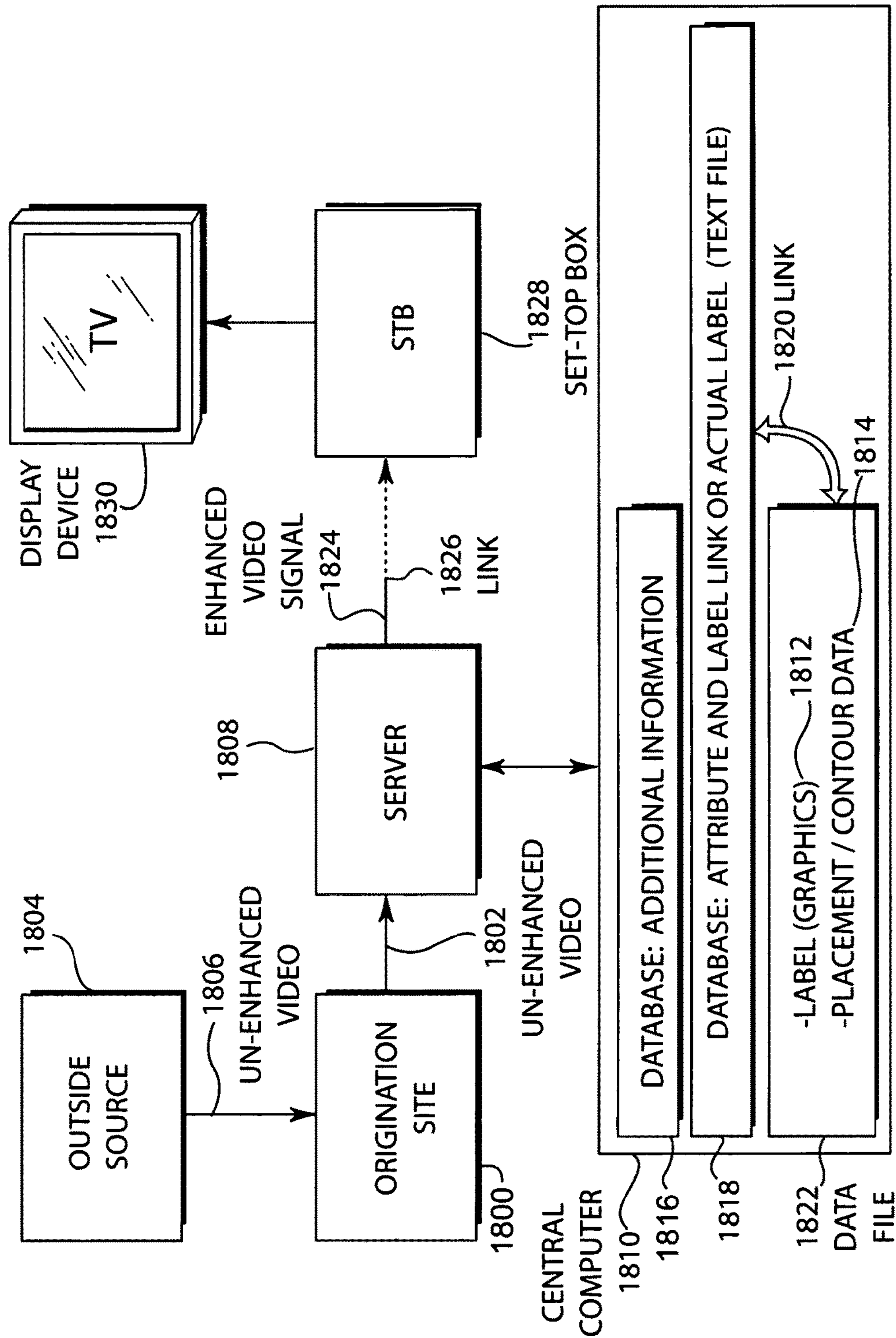
FIG. 18 is a schematic block diagram that generally illustrates one embodiment of the present invention.

FIG. 18 is a schematic block diagram that generally illustrates another embodiment. As shown in FIG. 18, an origination site 1800 may provide content. Content comprises an un-enhanced video signal 1802. The content may be created by a content provider such as a television network, television studio, a live broadcast, a server providing code or data such as an Applications Service Provider, an Internet Service Provider, or any other type of content provider that may be capable of sending content to viewers. The origination site 1800 may be capable of generating the content itself, or may simply provide content that is supplied from an outside source 1804 in the form of an un-enhanced video signal 1806. The origination site 1800 transmits the un-enhanced video signal 1802 to a server 1808. The address of the un-enhanced video signal can be provided by the advertiser to the TV broadcaster.

Referring to FIG. 18, the server 1808 interacts with a central computer 1810 and applies an embedded ad 1812 to the un-enhanced video signal 1802. This embedded ad 1812 may comprise any form of video enhancement, including video sequences, text or graphical images and may be in any format or other graphical representation such as bitmap or GIF. The server 1808 accesses on or more of the multiple data files 1822 contained in a central computer 1810. There may be one data file for each advertiser or one data file for each advertisement (e.g., embedded ad) and may comprise an embedded ad 1812 that exists as graphical information within the data file. The data file 1822 may also comprise placement and contour data 1814 which may be obtained by use of existing computer recognition, physical manipulation, or other techniques. By using placement and contour data, the embedded ad either may be applied unobtrusively to the video signal, or may appear to be an obvious addition to the original video signal 1802. Alternatively, the data file 1822 may comprise secondary video streams that may be superimposed (overlaid) onto the original un-enhanced video signal 1802.

Referring again to FIG. 18, the central computer 1810 may also contain a database 1816, as referred to in the description of FIG. 9, which stores each advertiser name and additional information. The central computer 1810 may also contain another database 1818, as referred to in the description of FIG. 10, which stores each advertiser name, associated attributes as well as a link 1022, 1024 to the embedded ad (as illustrated in FIG. 10) or an embedded ad text file 1026 and 1028. Each entry for each advertiser in the database 1818 (as previously illustrated in FIG. 10) may be linked to the associated advertiser's data file 1822 though a link 1820. Again, the databases and the data files may be stored in a central computer or on multiple computers which can comprise a server located at a head-end or in a set-top box.

Referring to FIG. 18, the server 1808 may incorporate existing pattern recognition software and techniques to provide one way in which available advertising space may be identified. However, identification of advertising space can be achieved by several methods as may be further seen with respect to the description of FIG. 25. The pattern recognition software may communicate with the attribute database 1818, stored in the central computer 1810. As previously discussed, the attributes may be actual objects or "blank space" attributes. The pattern recognition software may search the unenhanced video stream 1802 for these actual objects or blank spaces. Once a pattern is identified, the server searches the attribute database 1818 for a matching attribute. In the event that more than one company has listed the identified actual object or blank space as an attribute, bidding may start to choose which advertiser will receive the embedded ad. A detailed discussion of criteria, process and application of the embedded ad is described in further detail with respect to FIG. 23.

Referring again to FIG. 18, once the server 1808 has applied the embedded ad 1812 which the server accessed from either the data file 1822, or the attribute and text-embedded ad database 1818, the output from the server is an enhanced video signal 1824; for example, a video signal which has one or more embedded ads applied to the video signal. The enhanced video signal 1824 is transmitted via a link 1826 to a set-top box 1828. The link 1826 may comprise a radio frequency link, satellite link, cable connection, or any other type of communication. The set-top box 1828 receives and transmits the enhanced video signal 1824 to a display device 1830, such as a computer monitor or TV screen.

Figure 19:
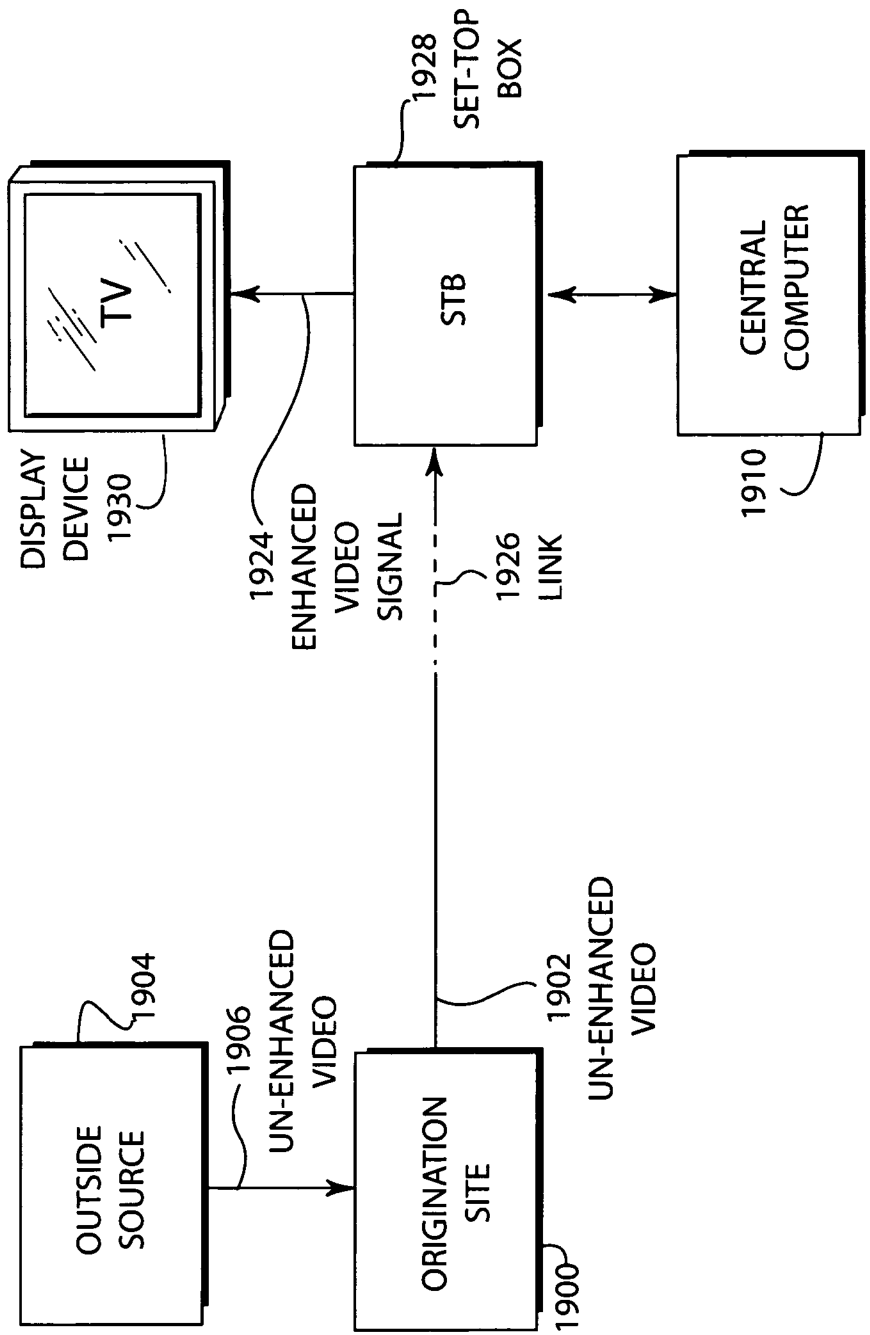
FIG. 19 is a schematic block diagram that generally illustrates another embodiment of the present invention.

FIG. 19 is a schematic block diagram that generally illustrates another embodiment. In FIG. 19, the embedded ad is applied by the set-top box, rather than the server. Content comprises an un-enhanced video signal 1902. The content may be created by a content provider such as a television network, television studio, a live broadcast, a server providing code or data such as an Applications Service Provider, an Internet Service Provider, or any other type of content provider that may be capable of sending content to viewers. The origination site 1900 may be capable of generating the content itself, or may simply provide content that is supplied from an outside source 1904 in the form of an un-enhanced video signal 1906. The origination site 1900 transmits the un-enhanced video signal 1902 via a link 1926, which again, may comprise a radio frequency link, a satellite link, or other type of link, to the set-top box 1928. The set-top box 1928 accesses the central computer 1910 to apply one or more embedded ads to the un-enhanced video signal 1902 to produce an enhanced video signal 1924 output. This enhanced video signal 1924 is then sent from the set-top box 1928 to a display device 1930, such as a computer monitor or television screen.

Figure 20:
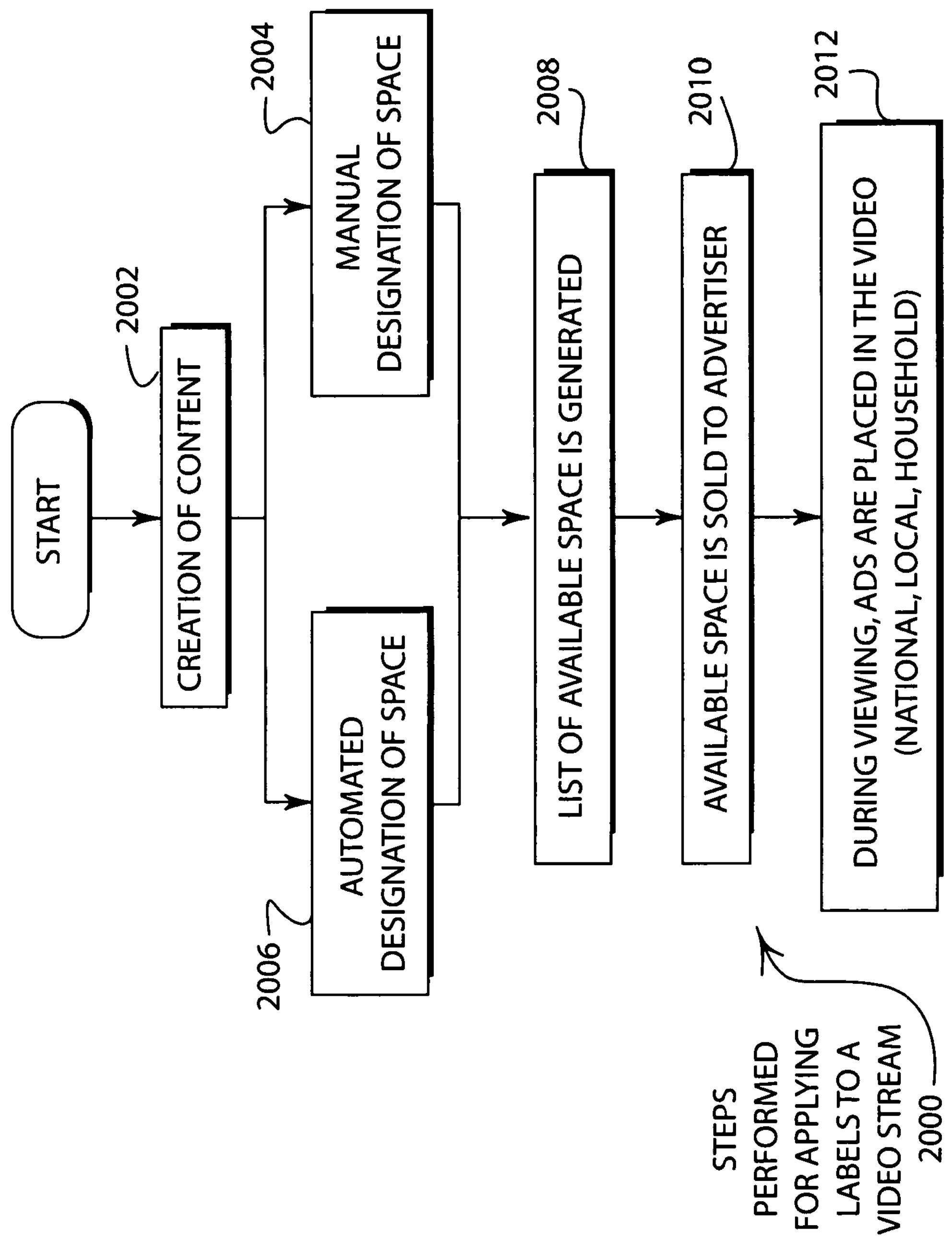
FIG. 20 is a flow diagram that illustrates the steps that may be performed in applying embedded ads into a video stream.

FIG. 20 is a flow diagram that illustrates the steps performed in applying embedded ads to a video stream 2000. As shown in FIG. 20, content is created at step 2002. As previously disclosed, the content may be created by a content provider such as a television network, television studio, a live broadcast, a server providing data such as an Applications Service Provider, an Internet Service Provider, or any other type of content provider that may be capable of sending content to viewers. The process is continued at step 2004 where available advertising space is designated by manual methods. Such manual methods may comprise having an author, such as a person examining the un-enhanced video signal, manually designate places within the current unenhanced video signal that are available for advertising. Alternatively, the process may proceed from step 2002, where the content is created, to step 2006, where the designation of available advertising space is automated. Automatic methods of designating advertising space may include visual (pattern) recognition or other techniques. The process proceeds to step 2008, where a list of the available advertising spaces is generated. This list may be generated by a server that also contains a list of advertisers and their associated attributes. At step 2010, the available advertising space that has been recently designated is bid upon by the advertisers. At step 2012, embedded ads are placed in the video while the video content is being shown on a display device, such as a computer monitor or television screen.

Embedded ads may be representative of local or national companies and may be superimposed on a per-household basis. This individualized superimposition may be facilitated by utilizing affinity data, such as disclosed in U.S. patent application Ser. No. 10/046,618, filed Oct. 26, 2001 entitled "Collection of Affinity Data from Television, Video, or Similar Transmissions," which is based upon U.S. Provisional Application Ser. No. 60/243,506, filed Oct. 26, 2000 entitled "Collection of Affinity Data from Television, Video, or Similar Transmission," and also disclosed in U.S. Non-Provisional application Ser. No. 10/099,054, filed Mar. 13, 2002 entitled "Affinity Marketing for Interactive Media Systems," which is based on U.S. Provisional Application Ser. No. 60/275,295, filed Mar. 13, 2001 entitled "Affinity Marking for Interactive Television," all of which are specifically incorporated herein by reference for all that they discloses and teach. Embedded ads may also be superimposed on a house-by-house basis by collecting data received from personalized remote controls, as disclosed in U.S. Patent Application Ser. Nos. 60/227,916 and 09/941,148 referenced above. In accordance with the above applications, affinity data provides information to a television broadcaster as to whether or not an audience is actually engaged in the current video presentation, through use of a variety of sensors, and feedback mechanisms as opposed to simply having the television on and not watching the television. The personalized remote is used to collect data regarding what shows are being watched by each different member of a household. Together, the use of technology from affinity data and personalized remotes may allow for personal targeting of advertisements. In that regard, television broadcasters may provide data to advertisers as to how many households will receive their ad prior to starting the bidding process. This information may be stored with the attribute data and transmitted to the advertiser when the television broadcaster solicits bids.

Figure 21:
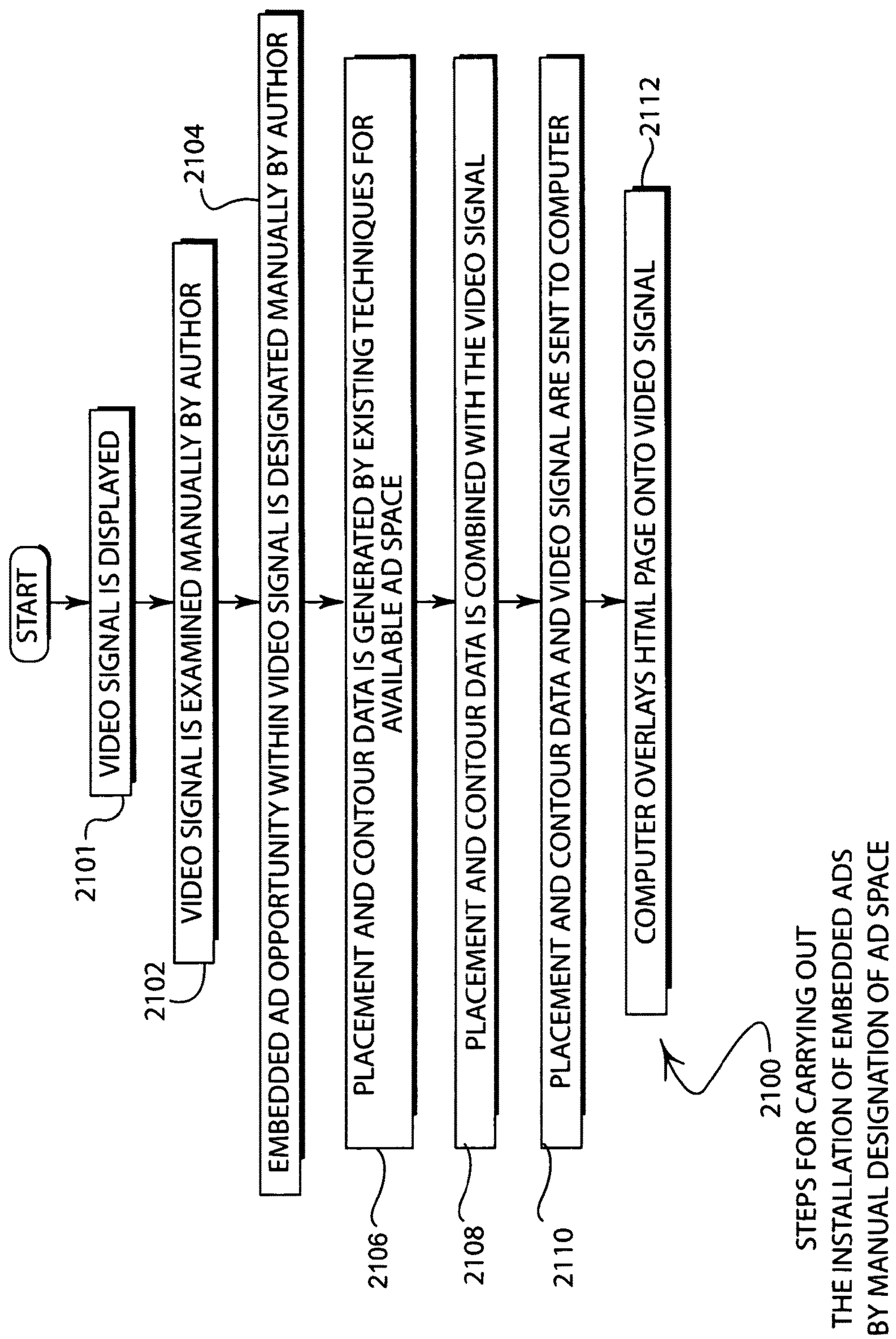
FIG. 21 is a flow diagram illustrating the steps that may be performed for the installation of embedded ads by manual designation of available advertising space.

FIG. 21 is a flow diagram illustrating the steps for carrying out the installation of embedded ads by manual designation of available advertising space 2100. The content or video signal is displayed in step 2101. In step 2102, the author, previously defined as the person examining the video signal, examines the video signal. The process proceeds to step 2104 where the author manually designates available advertising space within the un-enhanced video signal. That is, the author looks for possible places existing in the original unenhanced video stream onto which to place advertisements. Such possible places may include actual objects, onto which a particular logo of a company may be applied or blank spaces onto which any advertiser desiring to place their advertisement on a blank space may utilize. In addition, the author may plan the insertion of objects such as billboards, cans, cars, clothing, etc. In that regard, the existing objects in the program may be changed. For example, the video signal may show an actress driving a Chevy. The embedded advertising has the ability to change the Chevy to a Ford. Once the author identifies an embedded advertising opportunity, the author designates the identified opportunity and placement spot as being available for an embedded advertisement. Proceeding to step 2106, placement and contour data for the identified object, an inserted object, or blank space, which can act as the available advertising space, is generated. The placement/contour data may be obtained by use of existing computer recognition techniques, physical manipulation, or other techniques, and may be generated by a computer located at the head-end, the set-top box, or other site. Utility of the contour data may include making the embedded ad appear more naturally in the scene. As an example, if the object to which the embedded ad is applied is round, the embedded ad, as text or graphics or any visual enhancement, may be wrapped around the object's physical shape so that the embedded ad-enhanced object appears to look natural. By generating placement/contour data, the available advertising space is designated and comprises a boundary around the identified object.

Again referring to FIG. 21, in step 2108, the placement/contour data is combined with the video signal. In step 2110, the combined placement/contour data and video signal are accessed by the computer. The location of the computer may be at the head-end (transmission site), retransmission site, the set top box (household), or some other site. In step 2112, the embedded ad is applied to the unenhanced video signal. As previously disclosed, the embedded ad may be applied by overlaying data, which may contain the embedded ad itself along with placement/contour data, onto the original un-enhanced video signal. The data may be in the form of a Hypertext Mark-up Language (HTML) overlay page, which is mostly blank except for the embedded ad that the HTML overlay page contains. In this way, only the embedded ad is visible as the video signal flows through the system. The server or set-top box overlays the HTML page onto the video signal, thus applying the embedded ad to selective areas of the video signal by using the coordinates given by the placement/contour data. The embedded ad may be color-coded or partially transparent such that the embedded ad appears to be part of the original broadcast to the viewer. Alternatively, the embedded ad may be presented as an obvious addition to the original video signal, as was previously illustrated in FIG. 11.

The embedded ad may constitute graphical, image or text information and may be in the form of an MPEG stream, a bitmap, a JPEG image, etc. The graphical, image, or text information of the embedded ad may be stored locally in the set-top box, at the head-end, at a distribution point or may be accessed over the Internet or other network. As indicated above, an HTML overlay page may be used to combine the information of the embedded ad with the pre-existing video stream. However, any type of computer-generated bitmap can be used to produce a screen that can be combined with the pre-existing video signal in one or more frames.

In addition, the computer-generated bitmap need not just overlay the preexisting video image. For example, the combination of the video image and the embedded ad image may employ arithmetic or logical combinations of the bitmap information. Such combinations may employ raster operations common to windowed graphical user interface environments such as Microsoft Windows™. These arithmetic and logical combinations allow the embedded ad to replace or partially replace the pre-existing video image with the content of the embedded ad. Half toning and "see-through" embedded ads can also be produced using such techniques. The resultant video signal that is displayed to the viewer allows the embedded ad to then appear as an integral part of the displayed image. Hence, the process of superimposing the embedded ad content on the pre-existing video content can be accomplished by simply overlaying a computer generated bitmap on the pre-existing video content, which may also comprise bitmap information generated from an MPEG type of signal. Alternatively, the process of superimposing the embedded ad content on the pre-existing video content can be accomplished by actually combining the computer generated bitmap containing the embedded ad content with the pre-existing video content such as with arithmetic or logical combinations, as disclosed above. Further, commonly used color keying techniques, known in the television and computer arts and commonly referred to as "blue screen" and "chroma-key", can also be employed. For example, the embedded ad content may include specific colors that have been designated to not replace the content of the pre-existing video content, or specific colors may be employed to define areas of replacement or combination. In this fashion, the "transparency" of the embedded ad content can be accomplished using color key techniques.

The process of selecting the embedded ad content can be accomplished in various ways. For example, the embedded ad content may be accessed over a network connection. This network connection may be based upon preferences stored in a set-top box or based upon a tag or marker that is transmitted as part of the video content of the pre-existing video stream. In addition, the network connection may be an upstream connection to a server, such as a server located at the head-end or some distribution point that has stored embedded ad content that can then be downloaded to the set-top box either through the vertical blanking interval (VBI) or an out-of-band channel. In addition, the embedded ad content that is accessed in this fashion may be based upon preferences that are stored either at the head-end, an access point or at the set-top box. In addition, the bitmap information of the embedded ad content may be generated from instructions that are downloaded from a network such as the various network connections described above. These instructions may comprise executable code that is capable of generating graphics or text at the set-top box level. Again, these can be based upon preferences.

While the foregoing description may employ references to a set-top box, it is specifically intended that any and all such description shall apply to any receiving unit operable to provide a similar function, including intelligent televisions, multimedia computers, satellite receivers, etc., and also applies to portable systems that may employ wireless networks to receive video transmission and that may employ wireless networks to access embedded ad information.

Figure 22:
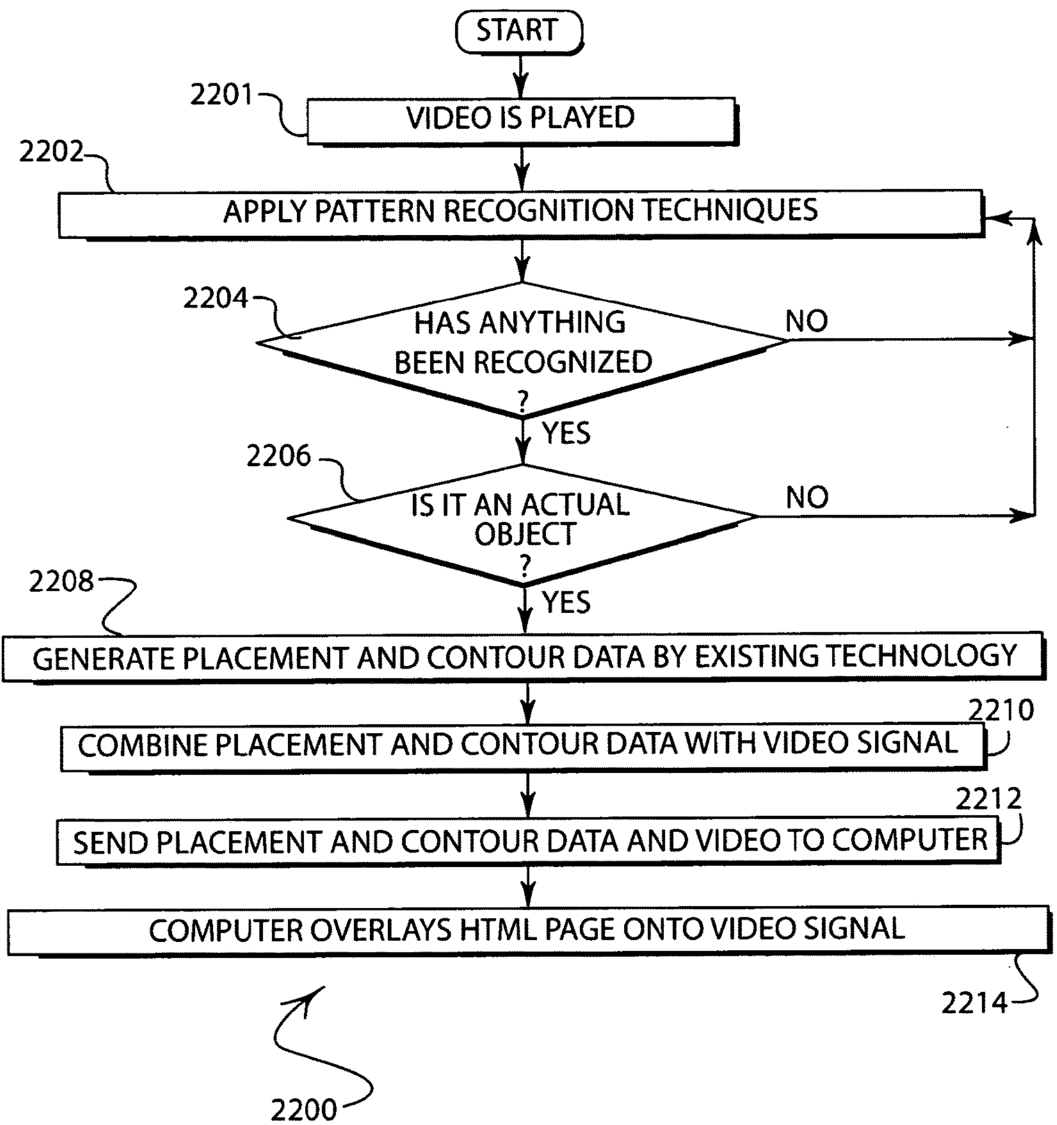
FIG. 22 is a flow diagram illustrating the steps that may be performed for the installation of embedded ads by automatic designation of available advertising space and searching for actual objects.

FIG. 22 is a flow diagram illustrating the steps for carrying out the installation of embedded ads by automatic designation of available advertising space and searching for actual objects 2200. In previous embodiments of the invention, the designation of available advertising space was performed by manual methods. Alternatively, the designation of opportunities for embedded advertising may be accomplished automatically. The following steps outline an automated process of designating available advertising opportunities. In step 2201, the current unenhanced video signal is displayed. The process proceeds to step 2202 where pattern recognition techniques may be applied to the current unenhanced video presentation. These pattern recognition techniques may be performed by a computer at a head-end (transmission site), retransmission site, the set top box (e.g., household), or some other site. In step 2204, a query is made as to whether a pattern has been recognized. Recognized patterns may include actual objects. If a pattern has not been recognized, the process returns to step 2202 and continues applying the pattern recognition component to the current video presentation. Returning to step 2204, if some sort of pattern is recognized, the process proceeds to step 2206, where a query is made as to whether the recognized pattern is an actual object. If the recognized pattern is not an actual object, the process returns to step 2202 and continues employing the pattern recognition component. After the query at step 2206, if it is determined that the recognized pattern is an actual object, the process proceeds to step 2208 where placement and contour data is generated, which may include coordinates of the recognized object. As previously disclosed, placement and contour data may be generated by use of existing computer recognition techniques, physical manipulation, or other techniques. The placement/contour data may be generated by a computer located at the head-end, the set-top box, or other site. By generating placement/contour data, the available advertising space is designated and comprises a boundary around the identified object. Recognized objects can also be replaced automatically by other objects, as described above.

Referring again to FIG. 22, the placement/contour data is combined with the video signal in step 2210. Thus, the output signal after step 2210 is an enhanced video signal. The placement/contour data and video signal, collectively referred to as the enhanced video signal, are accessed by the computer in step 2212. As previously disclosed, the location of the computer may be at a head-end (transmission site), retransmission site, the set top box (household), or some other site. In step 2214, the computer overlays a HTML page which is blank except for the embedded ad, onto the video signal. Thus, one or more embedded ads are applied to the selective areas of the video signal by using the coordinates given by the placement/contour data.

Figure 23:
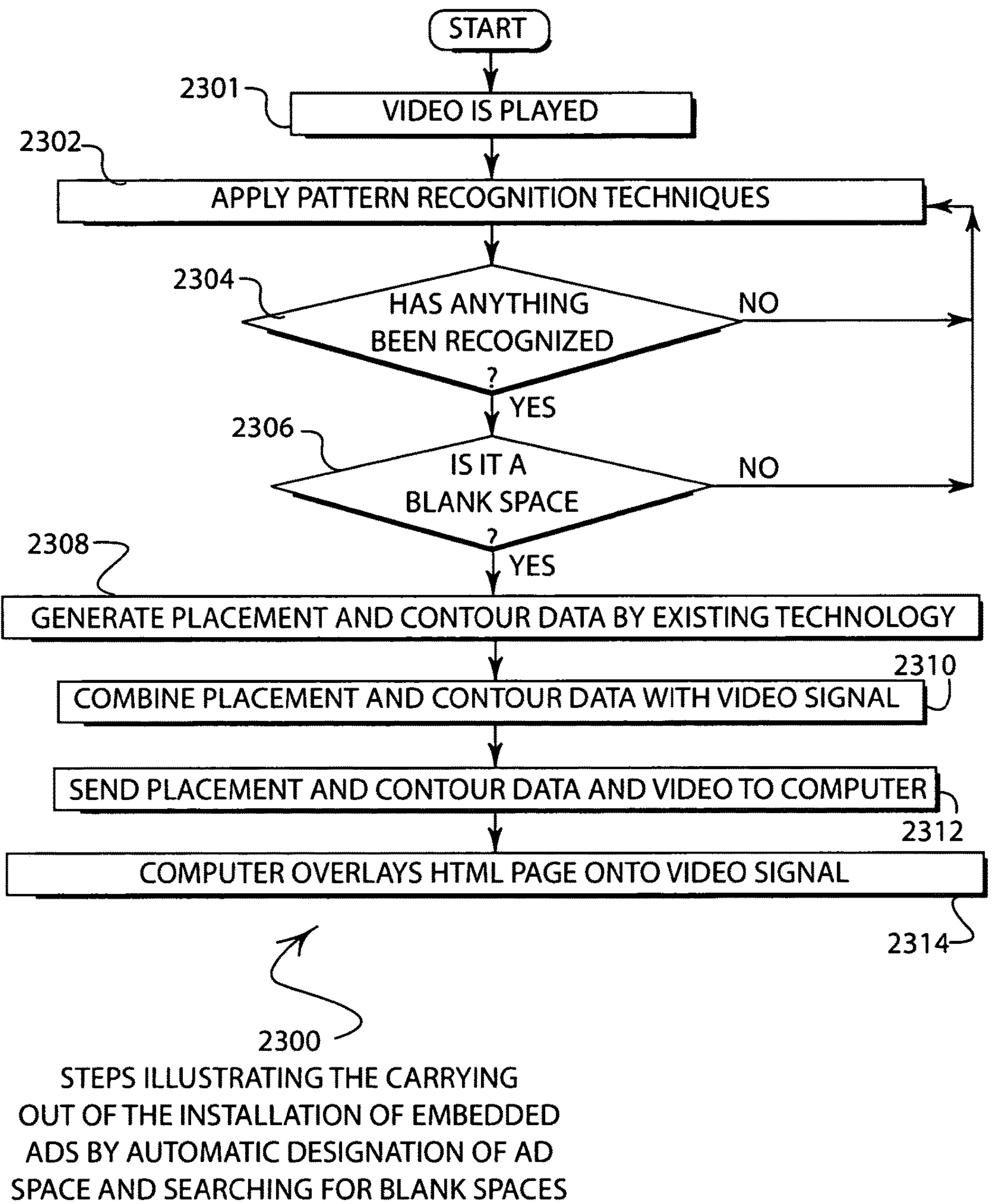
FIG. 23 is a flow diagram illustrating the steps that may be performed for the installation of embedded ads by automatic designation of available advertising space and searching for blank spaces.

FIG. 23 is a flow diagram illustrating the steps for carrying out the installation of embedded ads by automatic designation of available advertising space and searching for blank spaces 2300. The principles discussed in FIG. 23 are similar to the principles discussed in FIG. 22, with the pattern recognition component searching for a blank space instead of an actual object. As previously disclosed in FIG. 22, the designation of available advertising space is completed by use of automated methods. The process begins at step 2301 where the unenhanced video signal is displayed. The process continues at step 2302, where pattern recognition techniques may be applied to the unenhanced video signal. Again, the pattern recognition techniques may be performed by a computer at a head-end (transmission site), retransmission site, the set top box (household), or some other location. At step 2304, a query is made as to whether a pattern has been recognized. Recognized patterns may include blank spaces. If a pattern has not been recognized, the process returns to step 2304 and continues applying the pattern recognition component to the current video presentation. Returning to step 2304, if a pattern is recognized, the process proceeds to step 2306, where a query is made as to whether the recognized pattern is a blank space. If the recognized pattern is not a blank space, the process returns to step 2302 and continues employing the pattern recognition component. After the query at step 2306, if it is determined that the recognized pattern is a blank space, the process proceeds to step 1208 where placement and contour data is generated and may include coordinates of the recognized object. As previously disclosed, placement and contour data may be generated by use of existing computer recognition techniques, physical manipulation, or other techniques by a computer at the head-end, set-top box, or other site. By generating placement/contour data, the available advertising space is designated and comprises a boundary around the identified object.

Referring again to FIG. 23, the placement/contour data is combined with the video signal in step 2310. The resultant enhanced video signal is accessed by the computer in step 2312. As previously disclosed, the location of the computer may be at the head-end (transmission site), retransmission site, the set top box (household), or some other location. At step 2314 the computer overlays a HTML page, which is blank except for the embedded ad, onto the video signal. Thus, one or more embedded ads are applied to the selective areas of the video signal by using the coordinates given by the placement/contour data.

Figure 24:
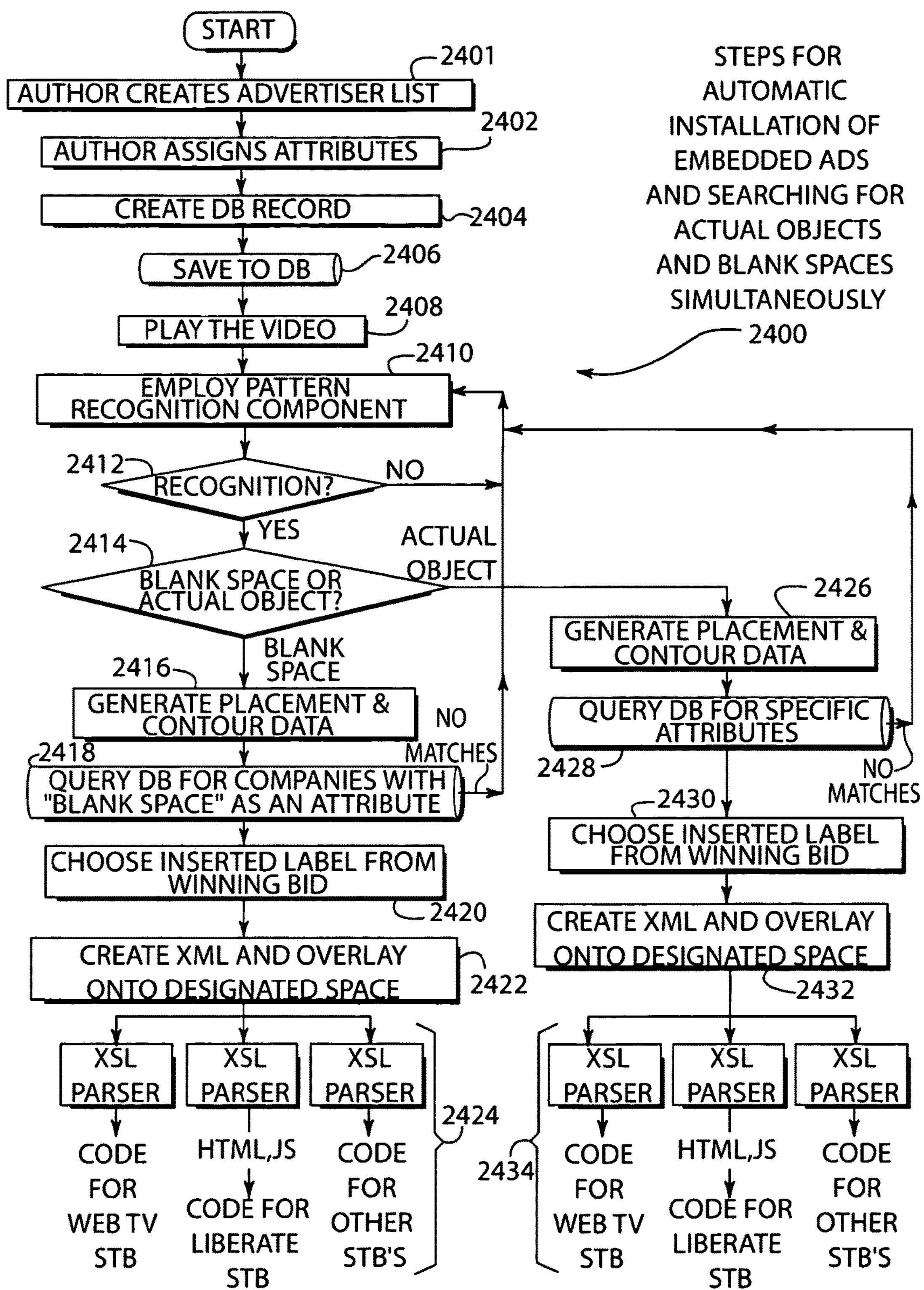
FIG. 24 is a flow diagram illustrating the steps that may be performed for the installation of embedded ads, using automatic methods, in a manner which combines the processes of looking for an actual object and blank space simultaneously.

FIG. 24 is a flow diagram illustrating the steps for carrying out the installation of embedded ads, using automatic methods, in a manner that combines the processes of looking for an actual object while searching for a blank space simultaneously 2400. As shown in FIG. 24, the author creates a list of advertisers at step 2401. At step 2402, attributes are entered and assigned to respective advertisers. As previously defined, attributes are any actual object that is associated with the advertiser or a blank space. Actual object attributes and blank space attributes are illustrated in FIGS. 11-15. As previously discussed in FIG. 8, each advertiser may be accompanied by a list of additional information.

Referring again to FIG. 24, at step 2404 a database record of each company and their associated attributes, as illustrated in FIG. 10, is created. This record is saved to the database at step 2406. At step 2408, the video signal, such as a television sitcom, is played. At step 2410 a pattern recognition component is activated, which constantly searches the video content to identify patterns, e.g., actual objects or blank spaces. At step 2412, a decision is made as to whether or not a pattern has been recognized. If a pattern has been recognized, the process proceeds to step 2414. If a pattern has not been recognized, the process returns to step 2410 and continues searching the video signal for additional patterns. If a pattern has been recognized at step 2414, a decision is made as to what type of pattern is recognized. If the identified pattern is a blank space, the process proceeds to step 2416. At step 2416, placement and/or contour data is generated which may include coordinates of the identified object. As previously disclosed, the placement and contour data may be generated by use of existing computer recognition techniques, physical manipulation, or other techniques. By generating placement data, available advertising space is designated. At step 2418, the database is searched for an appropriate advertisement. If no appropriate advertisement is found, the process returns to step 2410 and continues searching the video signal. At step 2420, the advertisers with matching attributes bid on the ad and the winning bidder is chosen.

Referring back to FIGS. 13-15, the pattern recognition component may recognize a blank space, such as arena panels, open ice or field, etc., onto which multiple advertisers may want to advertise (e.g., multiple advertisers had listed "blank space" as one of their attributes). An advertiser may have chosen an attribute such as a hockey game, baseball game, Friends episode, Seinfeld episode, situation comedy, prime time broadcast, rerun, etc. to be placed in the bidding. This allows the advertisers to be placed in the bidding process for areas of specific interest and allows the broadcasters to target advertisers in placing bids on topics, times, programs, etc. of interest to the advertisers.

Referring again to FIG. 24, at step 2422, Extensible Mark-up Language (XML) code is created and superimposed (e.g., overlaid) onto the designated blank space within the unenhanced video signal. The XML code is superimposed onto the unenhanced video signal by use of the placement/contour data previously acquired in step 2416. In the final step 2424, code is translated, via an Extensible Scripting Language (XSL) parser, from XML into code for Web TV set-top boxes, HTML, Java Script (JS) (code for Liberate set-top boxes) and/or code for other set-top boxes.

Referring again to FIG. 24, the process returns to step 2414. If the pattern recognized is an actual object, the process proceeds to step 2426. At step 2426, placement and/or contour data is generated. Again, the placement and contour data may be generated by use of existing computer recognition techniques, physical manipulation, or other techniques. At step 2428, the database is searched for a matching attribute. If no matching attribute is found, the process returns to step 2410 and the pattern recognition program continues searching the video stream. If a matching attribute is found, the process proceeds to step 2430. At step 2430, the advertisers that have matching attributes are contacted to place a bid. The information regarding the embedded ad is provided to the advertisers. The advertisers bid on the embedded ad and the winning bid is chosen. If there are no advertisers with matching attributes, the broadcaster may wish to categorize the opportunity as a blank space, which means that the object will be removed and a new one inserted. This provides move opportunities to obtain bidders for the embedded advertising opportunities.

The process then proceeds to step 2432, where XML code is created and superimposed on the designated actual object or replaces the object. In the final step 2434, code is translated, via an XSL parser, from XML into code for Web TV set-top boxes, HTML, JS (code for Liberate set-top boxes) and/or code for other set-top boxes.

Figure 25:
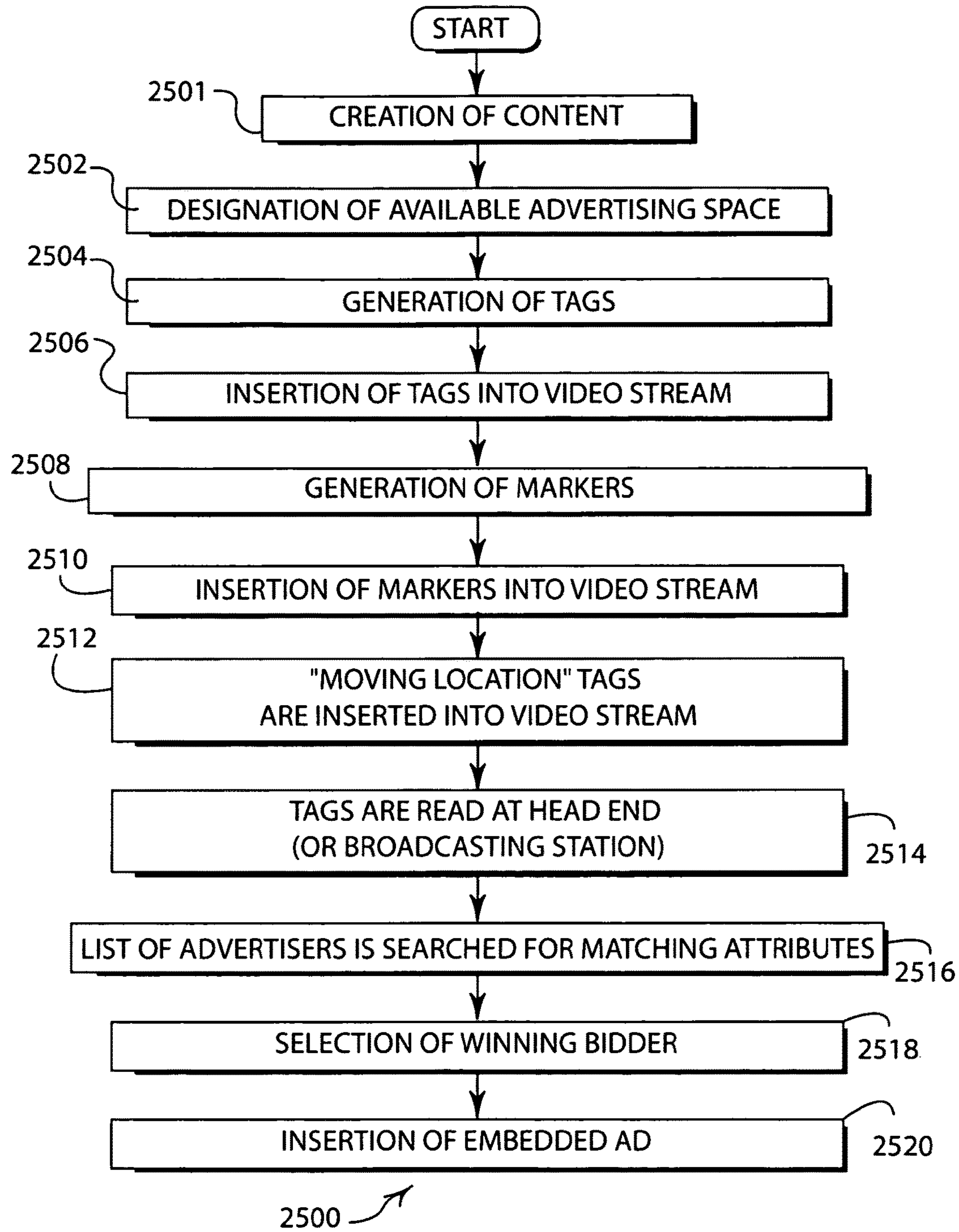
FIG. 25 is a flow diagram illustrating the steps that may be performed for the installation of embedded ads by using tags and markers to describe advertising space.

FIG. 25 is a flow diagram illustrating the steps performed for the installation of embedded ads by using tags and markers to describe advertising space 2500. As mentioned previously, pattern recognition techniques may provide a way in which available advertising space may be identified. However, identification of advertising space can be achieved by several methods. For example, available advertising space within the video stream may be defined by use of technology as disclosed in U.S. Application Ser. Nos. 60/268,350 and 10/076,950 referenced above.

Referring again to FIG. 25, content is created at step 2501. Proceeding to step 2502, available advertising space is designated. As discussed in FIGS. 21 and 22, the designation of available advertising space may be achieved by automatic or manual methods. If the available advertising space has been designated by automatic methods, it can then be checked and edited by manual methods. The process proceeds to step 2504 where tags are generated as disclosed in the above references. These tags describe the advertising space that is designated in step 2502. As previously disclosed, the advertising space may be an actual object or a blank space, and is referred to as an attribute. The tags define the location and perhaps contour of the identified object. That is, the tags may comprise a location or several defining locations, perhaps in x and y coordinates, and a contour of the object or blank space (attribute) identified. The tag may flag the attribute as being a blank space or an actual object. This placement and contour data may also be generated by use of existing computer recognition techniques, physical manipulation, or other techniques. The process proceeds to step 2506, where the tag is placed in the video stream.

Referring again to FIG. 25, the process proceeds to step 2508 where markers are generated in a manner disclosed above. These markers indicate the position of a division between each video segment of the video stream. That is, the markers indicate the beginning and the end of each video segment within the video stream. The process proceeds to step 2510, where the markers are inserted in the video stream. This can be done by the content provider or marketer of the program.

At step 2512, a "moving location" tag may be superimposed into the video stream and that indicates the new location of an object on the screen in a manner such as disclosed in U.S. Provisional Application Ser. No. 60/354,745, filed Feb. 6, 2002 entitled "TRACKING MOVING OBJECTS ON VIDEO WITH INTERACTIVE ACCESS POINTS", which is specifically incorporated herein by reference for all that it discloses and teaches.

For example, an identified object, which may be refrigerator, may move slightly from one frame to the next. Such a tag would account for the refrigerator's new location and/or orientation, and this tag may comprise new x and y coordinates and contour data of the refrigerator. The tags and markers may be sent during the video's vertical blanking interval (VBI). Any known standard for transmitting enhanced data, including advanced television enhancement forum (ATVEF), may be used. References made herein to the ATVEF specification are made for illustrative purposes only, and such references should not be construed as an endorsement, in any manner, of the ATVEF specification.

Referring again to FIG. 25, the process proceeds to step 2514, where the video signal, which has been enhanced with tags and markers, is transmitted to a broadcaster or to the head-end where the tag is read. Alternatively, the broadcaster could read the tag, if the advertisement to be superimposed is a national advertisement. Referring again to step 2514, the head-end reads the tag marking the location of an object or blank space and providing other information such as object or blank space profile, size, type, or other information. The process then proceeds to step 2516 where the head-end queries a list of advertisers, as referred to in FIG. 3. A query is made as to whether the list contains an advertiser that has listed the identified object or blank space as one of the advertiser's attributes. At step 2518, advertisers that have matching attributes are selected for bidding and the owning bidder is selected. The embedded ad is consequently superimposed into the video stream at head-end at step 2520. The display size of the embedded ad may be determined by the coordinate and contour data provided by the tag.

Various embodiments of the present invention therefore provide embedded advertising that can be bid upon by advertisers and implemented locally, or even on a household basis, which is the ultimate form of localized advertising. Localization of advertisements can be extremely effective especially when combined with personal preference and demographic data. Furthermore, by adding embedded ads to video content in a post-production environment, local advertising can be provided in a simple and inexpensive manner. Targeted advertising in this manner can be very valuable to prospective advertisers, and advertisers will be willing to bid high prices for such advertising. As such, revenue of broadcasters may be increased. Embedded ads may be unobtrusive, non-intrusive, and do not compromise size, color, or continuity of the video content. Embedded ads that are interactive may be activated by several methods, including clicking on the embedded ad with a hand-held device or remote, moving a pointing device over the embedded ad, or other methods. Embedded ads can transfer information back to the hand-held device for display/interaction, perhaps by a wireless or infrared link, send information back to a server for data aggregation, or perform any number of other actions. Further, a personalized hand-held device can be used in accordance with the present invention that allows the system to provide personalized information and allows several people to interact with the same program simultaneously. Such principles are disclosed in U.S. Non-Provisional application Ser. No. 09/941,148, filed Aug. 27, 2001 entitled "Personalized Remote Control," which is based upon U.S. Provisional Application Ser. No. 60/227,916, filed Aug. 25, 2000 entitled "Personalized Remote Control," both of which are specifically incorporated herein by reference for all that they disclose and teach.

Embedded ads encourage impulse buying of products or services which encourages advertisers to bid on embedded advertising. Embedded ads for products and services may be directly related to the content being watched or may provide additional information for the purchase of items that have no relevance to the video content. Embedded ads can be tailored individual one-on-one advertising, allow the viewer to vote, perform other interactive responses, or facilitate access to the world-wide-web. Embedded ads can display information in a number of different ways, such as on a relevant item, on a separate page, or on an unused portion of the video presentation. Traditional enhancements, such as a window or text-box on the side or bottom of the television screen may appear once the embedded ad is activated. A special small icon, perhaps called a "Buy-Con™," may appear in the corner of screen indicating to the viewer the availability of embedded ads in the scene.

Embedded ads may be installed automatically by use of existing pattern recognition technology. Patterns that are identified by the software may be actual objects that exist in the current video stream, or blank spaces that exist in the current video stream. Actual objects or blank spaces may be an appropriate place to superimpose an embedded ad. The patterns identified by the pattern recognition software are matched with the list of attributes to identify an applicable embedded ad, and the patterns are assigned placement and/or contour data. The placement/contour data is then used by a computer to apply the embedded ad in the current video stream. Objects can be replaced with other objects having the same or different attributes.

Alternatively, the installation of embedded ads may be achieved by manually installing embedded ads into the programming content such as disclosed in U.S. patent application Ser. No. 10/041,881, entitled "Creating On Content Enhancements," which is based upon U.S. Provisional Patent Application Ser. No. 60/243,107, entitled "Creating On Content Enhancements," referred to and incorporated above. Initially, manually installing advertising into the programming content may be done at the head-end (transmission site), at a retransmission site, or in individual households according to their demographics. The principles of placing embedded ads on a household-to-household basis are disclosed in U.S. patent application Ser. No. 09/941,148, entitled "Personalized Remote Control," which is based upon U.S. Provisional Patent Application Ser. No. 60/227,916, entitled "Personalized Remote Control," referred to and incorporated above.

Further advantages of the various embodiments disclosed include the ability to change embedded ads on a per-scene basis, and the ability to implement embedded ads automatically or by manual methods. In addition, because embedded ads do not have to be interactive and can exist as part of the video signal. Televisions not enabled for interactivity are still able to receive the embedded ads. Thus, the application of embedded ads may not be restricted to video signals, but embedded ads may be applied to any type of signal and any type of medium.

The various embodiments disclosed provide a system and method that allows post-production visual alterations in the form of bid-for advertisements to be added to a video stream. In this manner, broadcast and basic cable channels may provide bid-for embedded advertising to local companies in a simple and inexpensive manner. Visual alterations, or embedded ads, may be superimposed into the video stream manually or automatically. Embedded ads are an effective way to advertise, and embedded ads may be superimposed into the video stream on a house-by-house basis. Embedded ads may be personalized and localized. Embedded ads may be applied to any form of viewing material, within any type of signal or medium. Embedded ads may appear unobtrusively or obviously within the video content, and embedded ads may be either interactive or non-interactive. Embedded ads may change on a per-scene basis.

In addition, preferences and demographic information that controls the various types of ads that are displayed to users can be provided to advertisers prior to bidding on the embedded advertising. Demographic and preference information that controls the displayed advertising is disclosed in U.S. patent application Ser. No. 10/688,067, filed Oct. 16, 2003, entitled "Demographic/Preference Sniffer," which is based upon U.S. Provisional Patent Application Ser. No. 60/419,871, filed Oct. 18, 2002, entitled "Demographic/Preference Sniffer," which is specifically incorporated herein by reference for all that it discloses and teaches. Further, upgraded advertising, such as disclosed in U.S. patent application Ser. No. 10/688,075, filed Oct. 17, 2003, entitled "iChoose Video Advertising," which is based upon U.S. Provisional Application Ser. No. 60/420,110, filed Oct. 18, 2002, entitled "iChoose Video Advertising," which is specifically incorporated herein by reference for all that it discloses and teaches. Information regarding demographics and preferences that control the display of information can be used to further aid the TV advertisers in making bids on embedded advertising.

Figure 26:
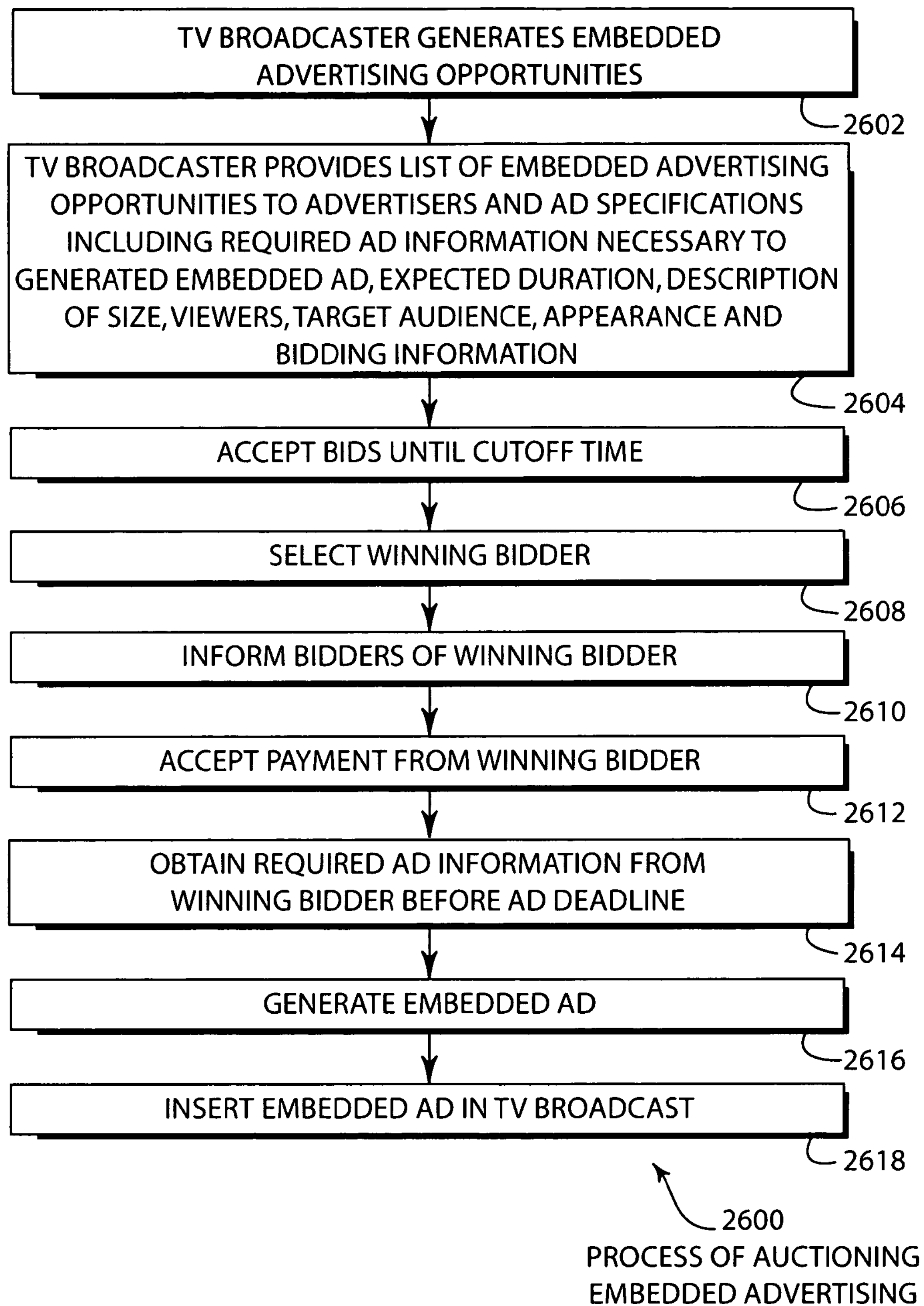
FIG. 26 is a flow diagram illustrating a process of auctioning embedded advertising.

FIG. 26 with a flow diagram that illustrates the process of auctioning embedded advertising. At step 2602, the broadcaster generates embedded advertising opportunities in the manner disclosed above. At step 2604, the broadcaster provides a list of embedded advertising opportunities to advertisers and advertising specifications including required ad information necessary to generate the embedded ad and other information such as the expected duration of the ad, a description of the size of the ad, viewers who may be viewing the ad, targeted audiences, appearance of the ad and bidding information. There are targeted audiences, as indicated above, that are based upon either demographic information or preference information of viewers. This information can be provided to the advertiser prior to bidding. The broadcaster then accepts bids until the cutoff time at step 2606. At step 2608, the broadcaster selects the winning bidder. At step 2610, the broadcaster informs the bidders of the winning bidder and may provide additional opportunities at that point in time for placing additional embedded ads to both the winning bidder and the losing bidders. At step 2614, the broadcaster obtains the required ad information from the winning bidder prior to the ad deadline. The broadcaster then generates the embedded ad at step 2616. At step 2618, the embedded ad is inserted into the broadcast in the manner indicated above.

Figure 27:
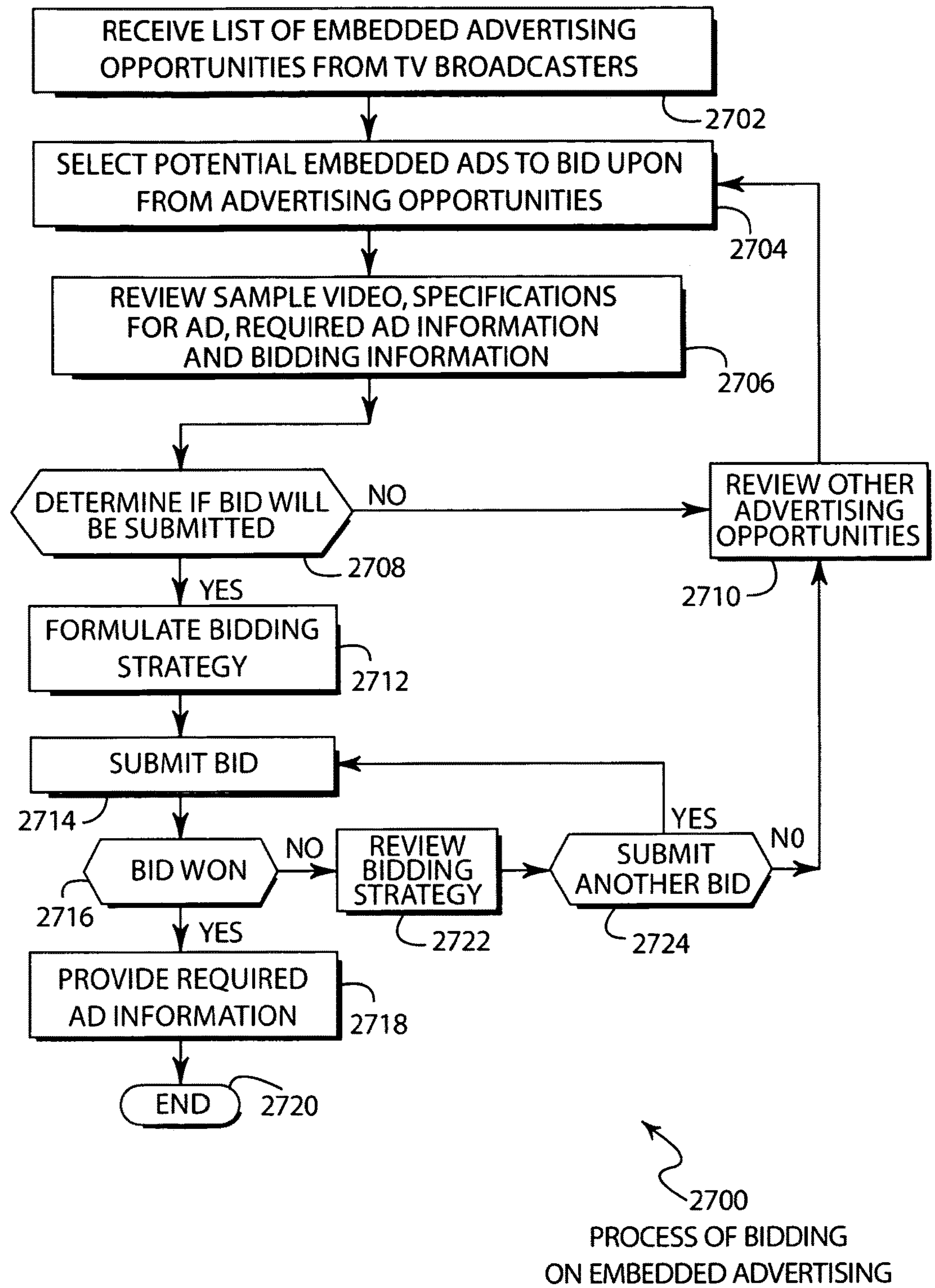
FIG. 27 is a flow diagram illustrating a process of biding on embedded advertising.

FIG. 27 is a flow diagram illustrating the steps 2700 that discloses the process performed by an advertiser in bidding on embedded advertising. At step 2702, the advertiser receives a list of embedded advertising opportunities from the broadcaster. This list may be created, as disclosed above, based upon attributes of the business of the advertiser. For example, an advertiser may be in the business of selling appliances, in which case, the advertiser may have listed "appliances" as an attribute. If there is an opportunity to place an embedded ad upon an appliance such as a refrigerator in a scene, the attribute "appliance" will be attached to the embedded advertising opportunity. Of course, there may be many other examples of attributes which may be very broad. As indicated above, the designation of an attribute of "reruns" which can be further limited to a type of programming, or a particular program, such as "situation comedy" or "Seinfeld" can be used as a series of attributes so that an advertiser can obtain relevant embedded advertising information.

Referring again to FIG. 27, at step 2706, the advertiser reviews simple videos, specifications for embedded ads, required ad information and bidding information. In this case, a simple video may be provided along with the embedded advertising opportunity which shows an ad embedded in a video clip so that the advertiser can have an idea as to the way in which the advertiser's ad may appear when the program is broadcast. Of course, this process applies to prerecorded programming. However, with live programming, such as a hockey game, video clips of previous games showing embedded ads on the ice and on the boards can be provided as an example of the manner in which an embedded ad may appear. Again, the advertiser can determine the manner in which the advertiser's ad may appear and may influence the amount that the advertiser may wish to bid on such ads.

At step 2708 of FIG. 27, the advertiser then determines if a bid will be submitted. If not, the process proceeds to step 2710, and the advertiser reviews other embedded advertising opportunities. If the advertiser determines it wants to submit a bid, the process proceeds to step 2712 to formulate a bidding strategy. Various bidding strategies are known in the art of bidding and can be used by the advertiser. For example, an advertiser may wish to submit a very high bid initially in an attempt to drive out other bidders. Of course, the advertiser may determine a maximum amount that the advertiser is willing to pay for the ad prior to submitting a first bid. In that regard, if affinity data is provided regarding the success of other embedded ads of the advertiser or the popularity of the show, those factors may influence the maximum bid amount of the advertiser. At step 2714, the advertiser then submits a bid. At step 2716, it is then determined whether the bid that has been submitted by the advertiser has won the auction. If it has not, the process proceeds to step 2722 where the advertiser may wish to review its bidding strategy. At step 2724, the advertiser then determines whether it wishes to submit another bid. If not, the process proceeds to step 2710 to review other advertising opportunities. If the advertiser does wish to submit another bid, the process returns to step 2714 to submit a bid. If the advertiser wins the bid at step 2716, the process proceeds to step 2718 where the advertiser provides the required ad information to the TV broadcaster. The process then ends at step 2720.

Figure 28:
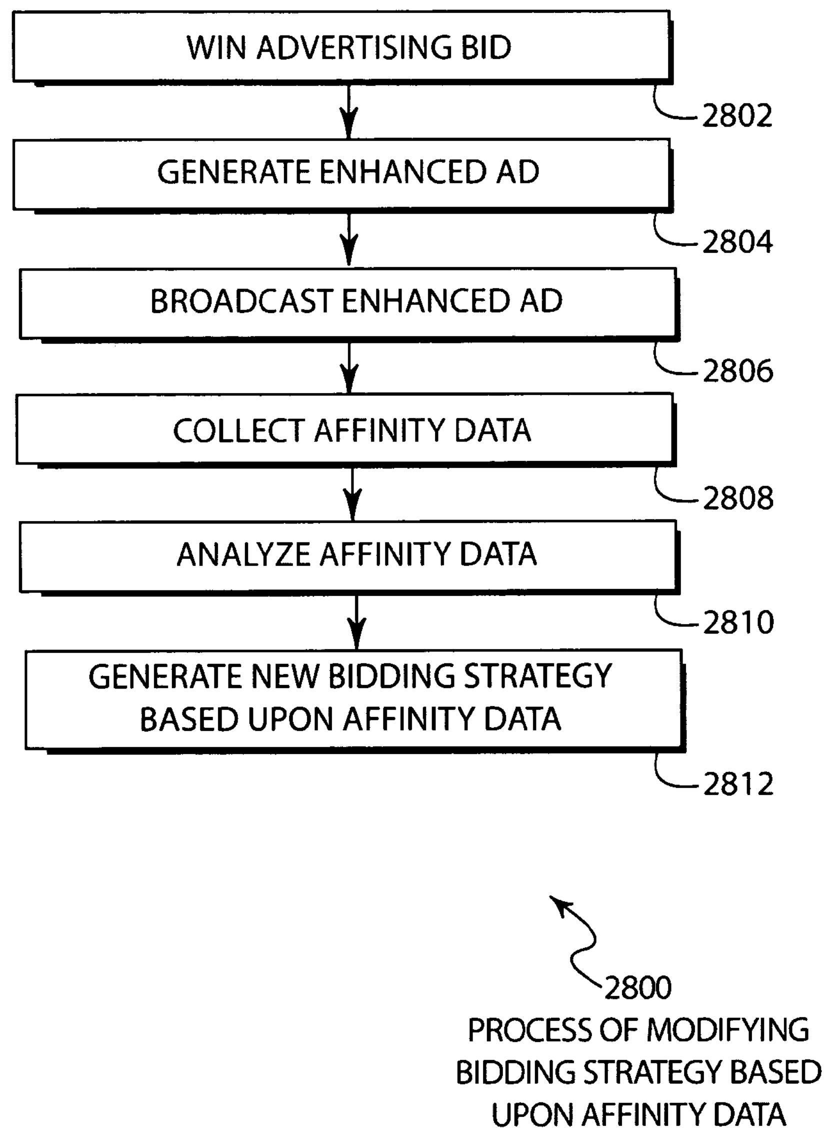
FIG. 28 is a flow diagram illustrating a process of modifying bidding strategy based upon affinity data.

FIG. 28 discloses the process 2800 of modifying bidding strategy based upon affinity data. Affinity data is data that indicates viewers' responses to a program, an ad or any other information that is displayed. Affinity data can be collected by any desired method including surveys, Nielsen rating data, or in accordance with the process described in U.S. patent application Ser. No. 10/046,618, entitled "Collection of Affinity Data from Television, Video or Similar Transmissions," filed Oct. 26, 2001, by Steven O. Markel, et al.

Referring again to FIG. 28, at step 2802, the advertiser determines that it has won an advertising bid. At step 2804, the broadcaster generates an enhanced ad. At step 2806, the enhanced ad is broadcast to viewers. At step 2808, affinity data is collected in accordance with any desired method such as those described above. The affinity data is then gathered by the advertiser and analyzed at step 2810. At step 2812, the advertiser may wish to generate a new bidding strategy based upon the affinity data. For example, if the advertiser is bidding on embedded ads for the Super Bowl and the game is a very close game in the fourth quarter, the advertiser may wish to bid greater amounts. Of course, the reverse is true, also. For example, if an advertiser is bidding in the Super Bowl and the score is very lopsided in the fourth quarter, the advertiser may wish to bid much lower amounts or withdraw a previous bid and pay a penalty fee.

Affinity data can also be used to determine the success of a particular ad. For example, affinity data can be collected with regard to the response of viewers to an embedded ad that has been displayed previously in a program. For example, affinity data can rate a viewer's response to an ad which provides valuable information to the advertiser as to whether the advertiser wishes to bid higher or lower on subsequent ads during an event such as a football game or hockey game.

Of course, the processes disclosed above are not limited to embedded ads only. For example, broadcasters may wish to designate certain advertising time slots as ads which can be bid upon by advertisers. In this manner, a broadcaster may wish to maximize its revenue by having some time slots available for bidding while maintaining standard pre-purchased advertising time slots so that a guaranteed amount of income is provided. In addition, these time slots may have particular relevance to what is occurring during the program. For example, a time slot may be designated as a "bid-for" ad after a penalty is assessed or a play is being reviewed in a sporting event. An advertiser may wish to purchase that time slot and run a humorous advertisement showing a referee with thick glasses who has a hard time seeing. In addition, the affinity data information can be very valuable for these types of advertisements to show viewer acceptance or rejection of the advertisements. By collecting this data, advertisers can determine if they would like to run these ads on a more frequent basis and bid higher for those particular time slots.

Figure 29:
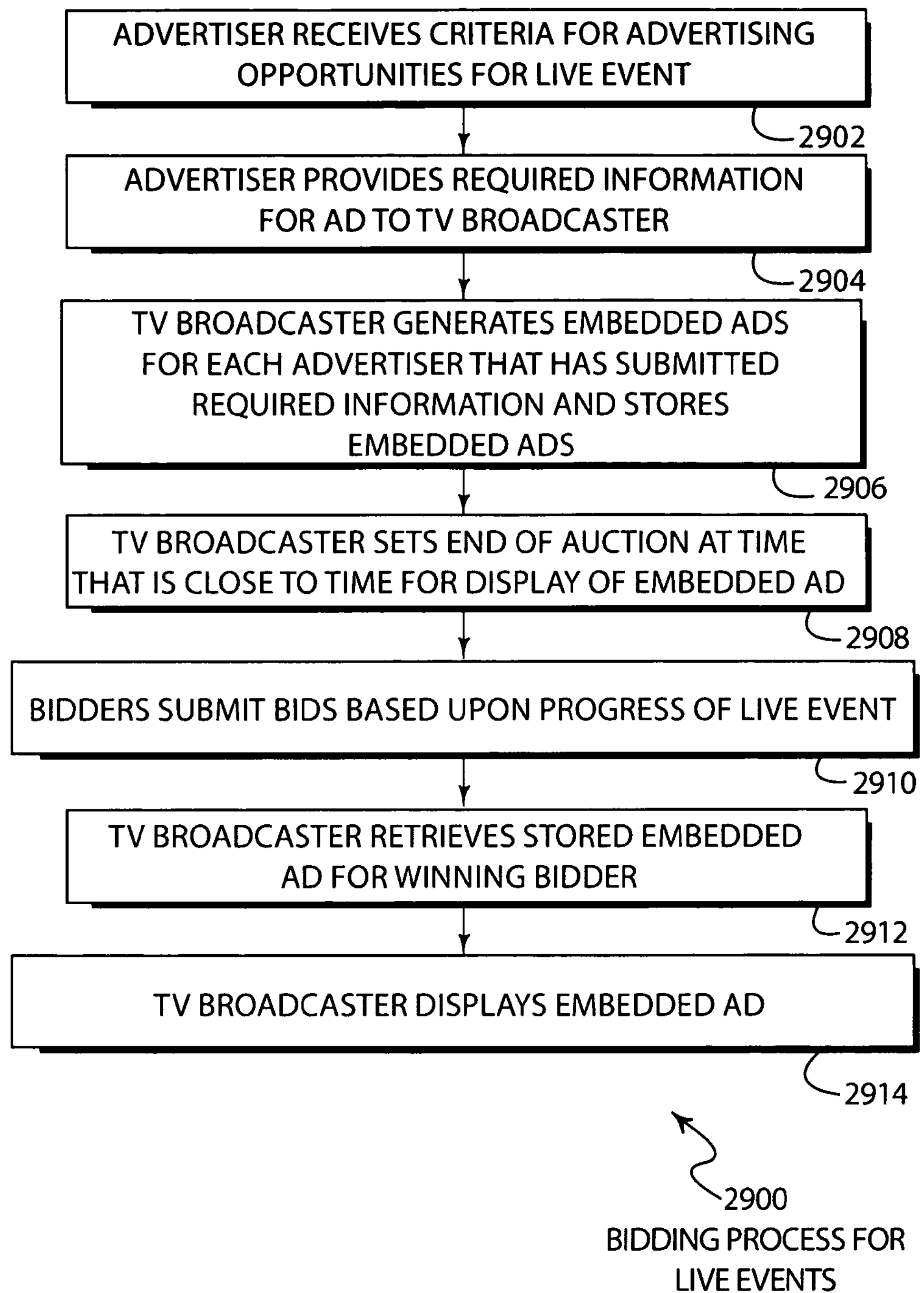
FIG. 29 is a flow diagram illustrating a process of bidding on live events

FIG. 29 discloses a bidding process 2900 that may be used for live events when the broadcaster is willing to extend the auction until a time that is very close to the time in which the embedded ad will be displayed. At step 2902, an advertiser receives the criteria for advertising opportunities for the live event in the various ways as disclosed above. At step 2904, the advertiser provides the required information for the embedded ads to the broadcaster. At step 2906, the broadcaster generates the embedded ads for each advertiser that has submitted the required information and stores these embedded ads. Optionally, the broadcaster can provide a sample copy of the embedded ad to advertisers. At step 2908, the broadcaster sets the end of auction time such that the end of auction time is close to the time for display of the embedded ad. In this manner, bidding can occur during the process of the live event. For example, bidding may occur during actual play of a game, such as the Stanley Cup finals, or the Super Bowl. The course of events in the game can cause the bids to increase or decrease during the game as explained above. At step 2910, the bidders submit bids based upon the progress of the live event. At step 2912, a broadcaster retrieves the embedded ad for the winning bidder. At step 2914, the broadcaster displays the embedded ad.

Figure 30:
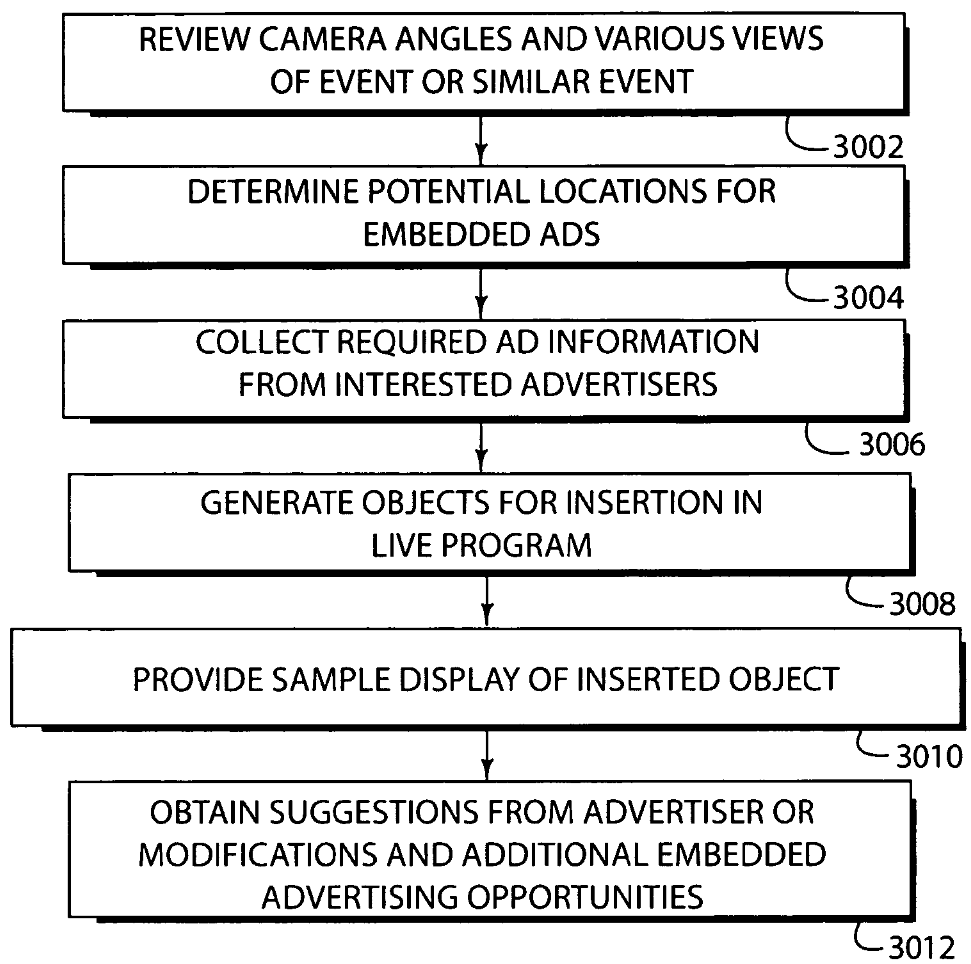
FIG. 30 is a flow diagram illustrating a process of analyzing advertising opportunities for live events.

FIG. 30 is a flow diagram illustrating the process 3000 of analyzing advertising opportunities for live events. At step 3002, the broadcaster can review various camera angles and various views of a live event or a similar event to attempt to determine embedded advertising opportunities. For example, a broadcaster can view the camera angles or previous video from a hockey game and determine what embedded advertising opportunities exist on the ice and on the boards of the ice rink. As indicated above, even though markings may appear on the ice or on the boards, those markings can be removed using either markup language overlay pages or video combination techniques, as disclosed above. Hence, at step 3004, the potential locations for embedding ads are determined by the broadcaster. Advertisers may also assist the broadcaster in that evaluation. At step 3006, the broadcaster collects all of the required ad information from interested advertisers. At step 3008, the various embedded ads (e.g., objects) are generated for insertion in the live program. At step 3010, the broadcaster can then provide a sample display of the embedded ads such as an inserted object. For example, during a broadcast of a live football game, an inserted object may comprise an airplane carrying a banner or a banner that is inserted into the crowd in the stands. Other embedded objects, as disclosed above, can comprise ads that are placed on the players themselves, such as tattoos or labels. At step 3012, the broadcaster obtains suggestions from the advertiser on modifications and additional embedded advertising opportunities.

Figure 31:
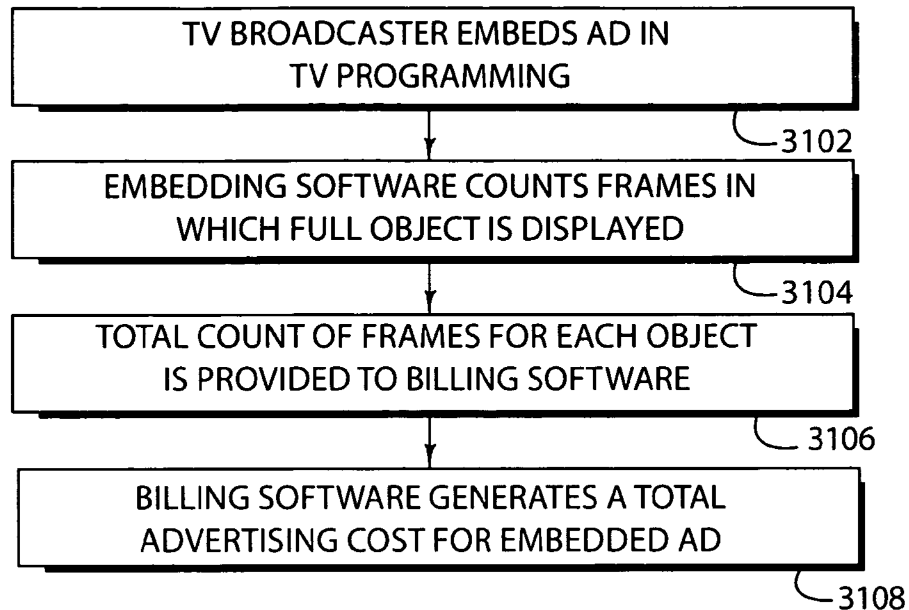
FIG. 31 is a flow diagram illustrating a process for billing advertisers based upon display time of embedded ads.

FIG. 31 discloses the process 3100 for billing advertisers based upon display time of embedded ads. At step 3102, the broadcaster embeds the ad in the programming in the manner described above. At step 3104, the embedding software counts the frames in which the full object (e.g., the embedded ad) is displayed on the screen. At step 3106, the total count of frames for each embedded object is provided to the billing software. At step 3108, the billing software generates a total advertising cost for the embedded ad based upon the total count of frames in which the embedded ad appears. Of course, a cap may exist that limits the advertiser's exposure.

The present invention therefore provides various ways of allowing broadcasters to auction both embedded ads and normal time slot ads. Auctioning of ads in this fashion allows broadcasters to potentially increase advertising revenue for both prerecorded and live events. Advertisers, on the other hand, also benefit from the bidding process. For example, smaller companies may be able to advertise during large events such as the Super Bowl if the event has a smaller interest because of a lopsided score. Advertising can constitute targeted advertising based upon preference and demographic data. In addition, affinity data, that evaluates the effect of the ad, can be used by advertisers to maximize revenues and determine a bidding strategy. Embedded ads can be generated through markup language overlay pages or through combined video techniques. Various strategies for setting up embedded ads by broadcasters can be used including red zone advertising for football games, changing all of the embedded ads to a single advertiser when the home team scores and providing time slots that are content related to a particular advertisement. Attributes of an embedded advertising opportunity can be used to select potential advertisers, which also allows potential advertisers to only review embedded ads that are of interest to the advertiser. Video combination techniques and markup language overlay pages can be used to erase existing ads in a scene and insert other ads or insert other objects into the scene. For example, if a table exists in a scene, a Coke can or beer can be actually inserted into the scene and an existing item such as an ashtray can be removed. Similarly, an object such as a car can be erased and a different car can-be inserted in a scene to provide the embedded advertising opportunity. Various advertising opportunities may be provided based upon the occurrence of an event in the program, such as the scoring of a goal or a touchdown. In that case, a trigger may be inserted in the program that triggers the insertion of one or more embedded ads in the program. In this example, a trigger may be embedded in the video program which causes the highest bidder who has bid upon the go-ahead goal on the hockey game or the go-ahead score in a football game, etc. to have all the embedded ads changed to that particular advertiser's embedded ad. Various criteria can be set up such as scores during the fourth quarter of a football game, scores during the last few minutes of a hockey or basketball game, etc. If advertisers wish to drop out of the bidding process, a backup fee for backing out of the process can be charged to the advertiser. Advertisers can also bid upon putting embedded ad in certain camera angles. Hence, various methods are proposed for auctioning both embedded advertising and time slot advertising which provide many advantages to both broadcasters and to advertisers.

As discussed above, example embodiments allow the determination of advertisement opportunities, matching of prospective advertisers with certain advertisement opportunities, and billing of the advertisement opportunity. In further embodiments, an assigned value of the advertisement opportunity may be based on location, length of display, or a combination of both. This assigned value may indicate a starting bid price for the advertisement opportunity in an auction type environment or a fixed offer price in fixed price environment (e.g., $1 M per minute during the Superbowl).

Figure 32:
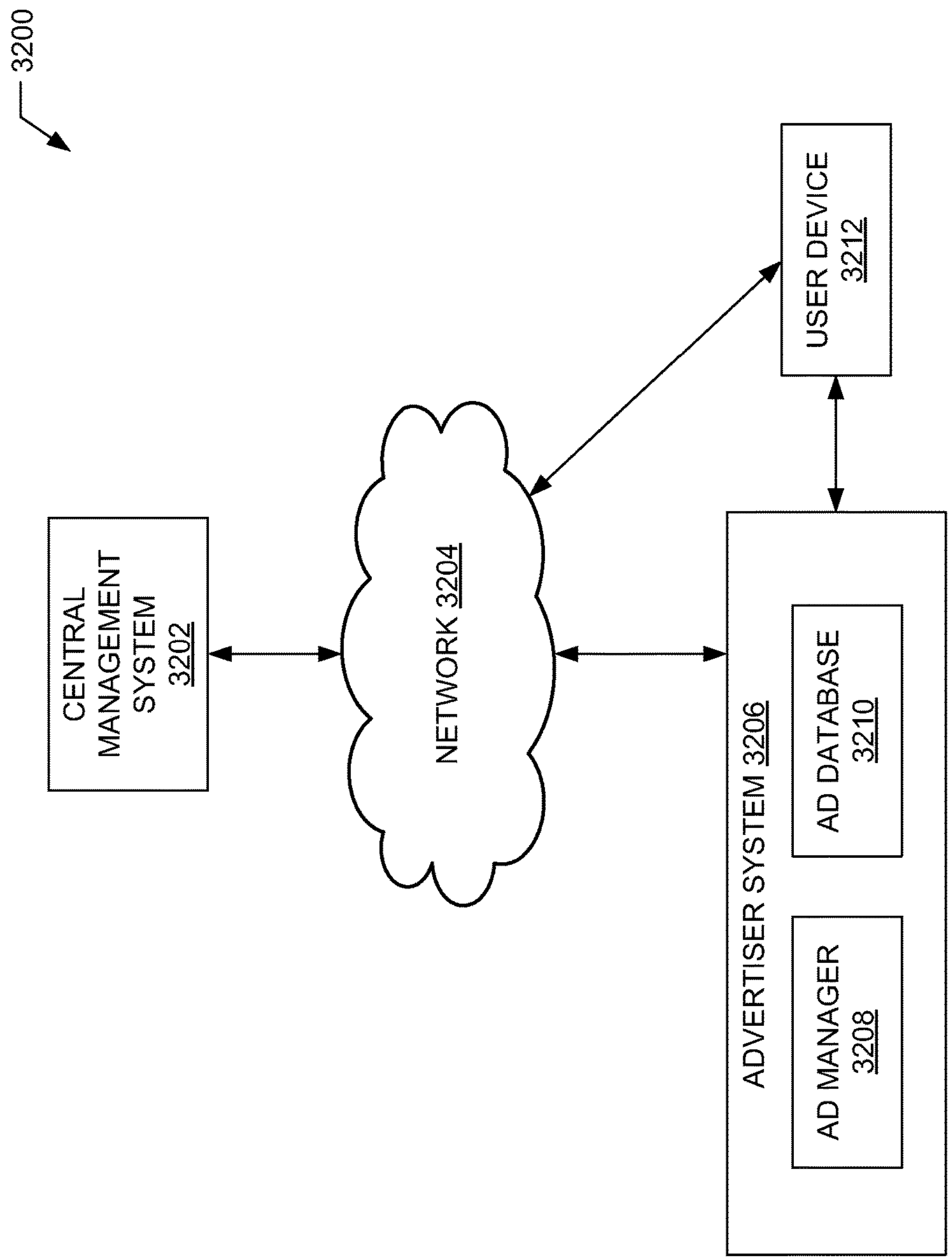
FIG. 32 is a block diagram illustrating an example embodiment of a network architecture of a system used to manage offers and billing of advertisement opportunities.

With reference to FIG. 32, a further example embodiment of a network architecture of an environment 3200 for providing offering and billing advertisement opportunities is shown. In example embodiments, a central management system 3202 is communicatively coupled via a network 3204 to an advertiser system 3206 of an advertiser or potential advertiser. The central management system 3202 manages the offering and billing of advertisement opportunities within media. The central management system 3202 may also offer services such as managing sales of local advertisement to be inserted into or overlaid on a national advertisement. The central management system 3202 will be discussed in more detail in connection with FIG. 33 below. While only one advertiser system 3206 is shown in FIG. 32, any number of advertiser systems 3206 of different advertisers may be coupled via the network 3204 to the central management system.

The media may comprise one or more of video (e.g., television programs, visual advertisements), audio (e.g., radio programs, audio advertisements), digital media (e.g., audio, video, data over the Internet) or any combination of these. As such, the network 3204 may comprise any one or more of a broadcast network, satellite, wide area network (WAN), Internet, cellular network, or any other type of communication network.

In one embodiment, the advertiser system 3206 may comprise an advertisement manager 3208 and an advertisement database 3210. The advertisement manager 3208 allows the advertiser to manage their advertisements. For example, the advertisement manager 3208 may track the advertisement opportunities the advertiser purchases, the advertisements to be presented, and accounting (e.g., payment) for the advertiser. The advertisement database 3210 may store advertisements of the advertiser. These advertisements may be sent to the central management system 3202, a national broadcaster, a local station, or directly provided to a user device 3212 of a viewer for embedding into the media (e.g., by a head-end device). In some embodiments, the advertisement may be generated by the advertiser system 3206. In other embodiments, the advertisement may be generated by a third party such as an advertisement agency and stored to the ad database 3210.

The user device 3212 of the viewer is also coupled to the network 3204. The user device 3212 may comprise a set-top box, television, radio, mobile device, desktop computer, or any other communication device that the viewer may utilize to receive media transmissions from a broadcaster such as a national broadcaster, a local station, or the central management system 3202. In some embodiments, the user device 3212 may comprise a display module to display information and an audio module to output audio to the user. In further embodiments, the user device 3212 may comprise an input module to receive user inputs to control or respond to various media presented on the user device 3212. While only one user device 3212 is shown in FIG. 32, any number of user devices 3212 may be coupled via the network 3204 to the central management system 3202.

Figure 33:
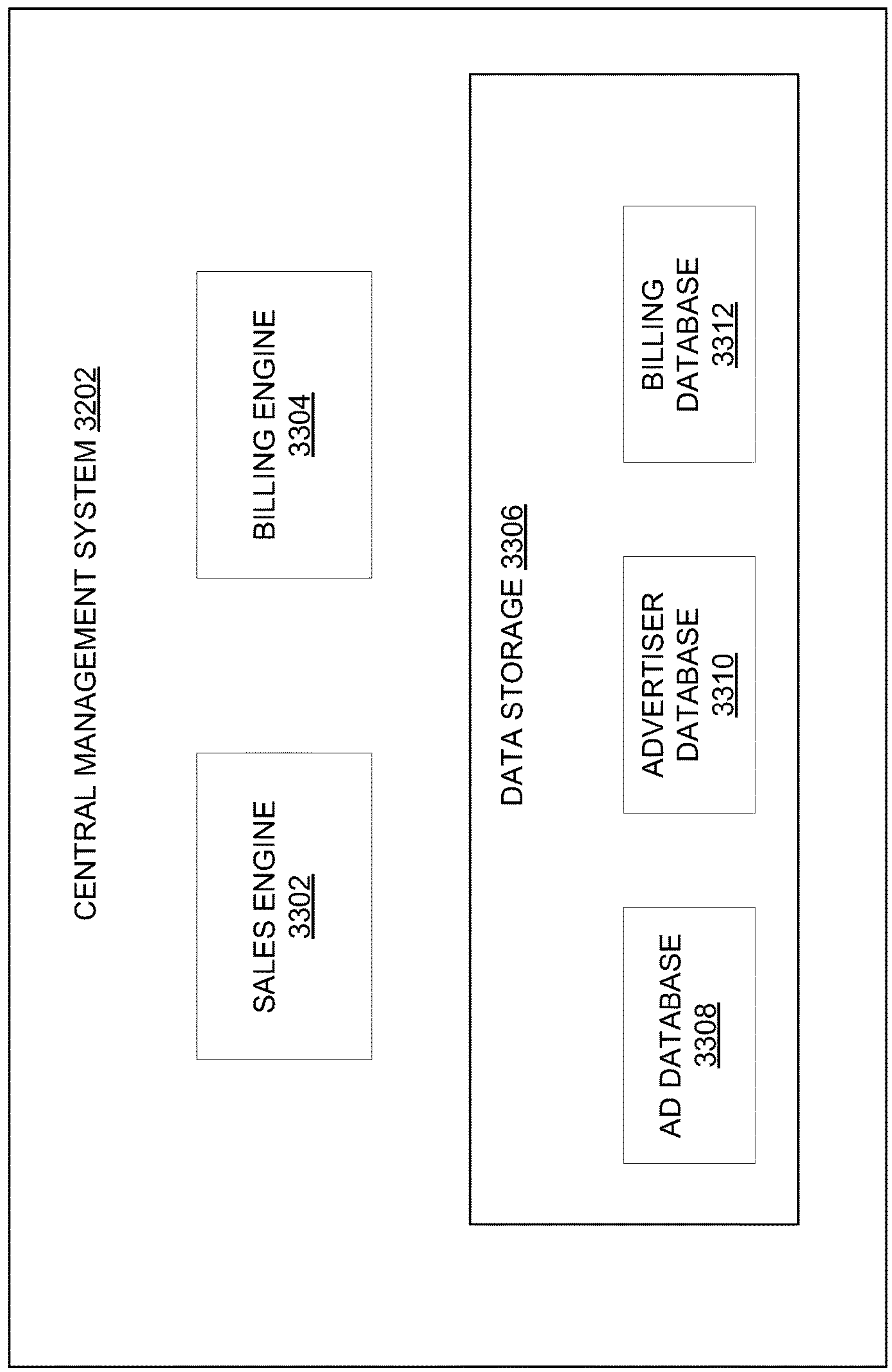
FIG. 33 is a block diagram illustrating an example embodiment of a central management system.

Referring now to FIG. 33, an example block diagram illustrating components of the central management system 3202 are shown. In example embodiments, the central management system 3202 comprises a sales engine 3302, a billing engine 3304, and a data storage 3306. The sales engine 3302 is configured to manage the determination of advertisement opportunities and the offering of these advertisement opportunities for sale or auction. The sales engine 3302 will be discussed in more detail in connection with FIG. 34 below. The billing engine 3304 is configured to manage valuation of advertisement opportunities and invoicing of purchased advertisement opportunities. The billing engine 3304 will be discussed in more detail in connection with FIG. 35 below. It is noted that FIG. 33 provides one example of the central management system 3202, and alternative embodiments may comprise more, fewer, or other components to enable the operations described herein.

The data storage 3306 comprises a plurality of databases that are used by the engines and modules of the central management system 3202. These databases may include an advertisement database 3308, advertiser database 3310, and a billing database 3312. The advertisement database 3308 stores data regarding advertisement opportunities. The data may include attributes, assigned values, identification of winning advertiser, and a copy of an advertisement of the winning advertiser for each of the advertisement opportunities.

The advertiser database 3310 stores data associated with the advertiser. As discussed above, the advertiser may register with the central management system 3202 and provide attributes for their advertisement or attributes for advertisement opportunities for which the advertiser desires to purchase. These registration and attribute information may be stored in an account associated with the advertiser in the advertiser database 3310. In example of the advertiser database 3310 is shown and described with respect to FIG. 9 above.

The billing database 3312 stores billing and valuation information for the advertisement opportunities. The billing information may include an accounting of a number of frames or an amount of time that an advertisement is displayed in an advertisement opportunity. The valuation information may include information used by the billing engine 3304 in determining a value to assign to the advertisement opportunity. The valuation information may include algorithms and weights to apply to various attributes and factors in determining the value for an advertisement opportunity as will be discussed in further detail below.

Figure 34:
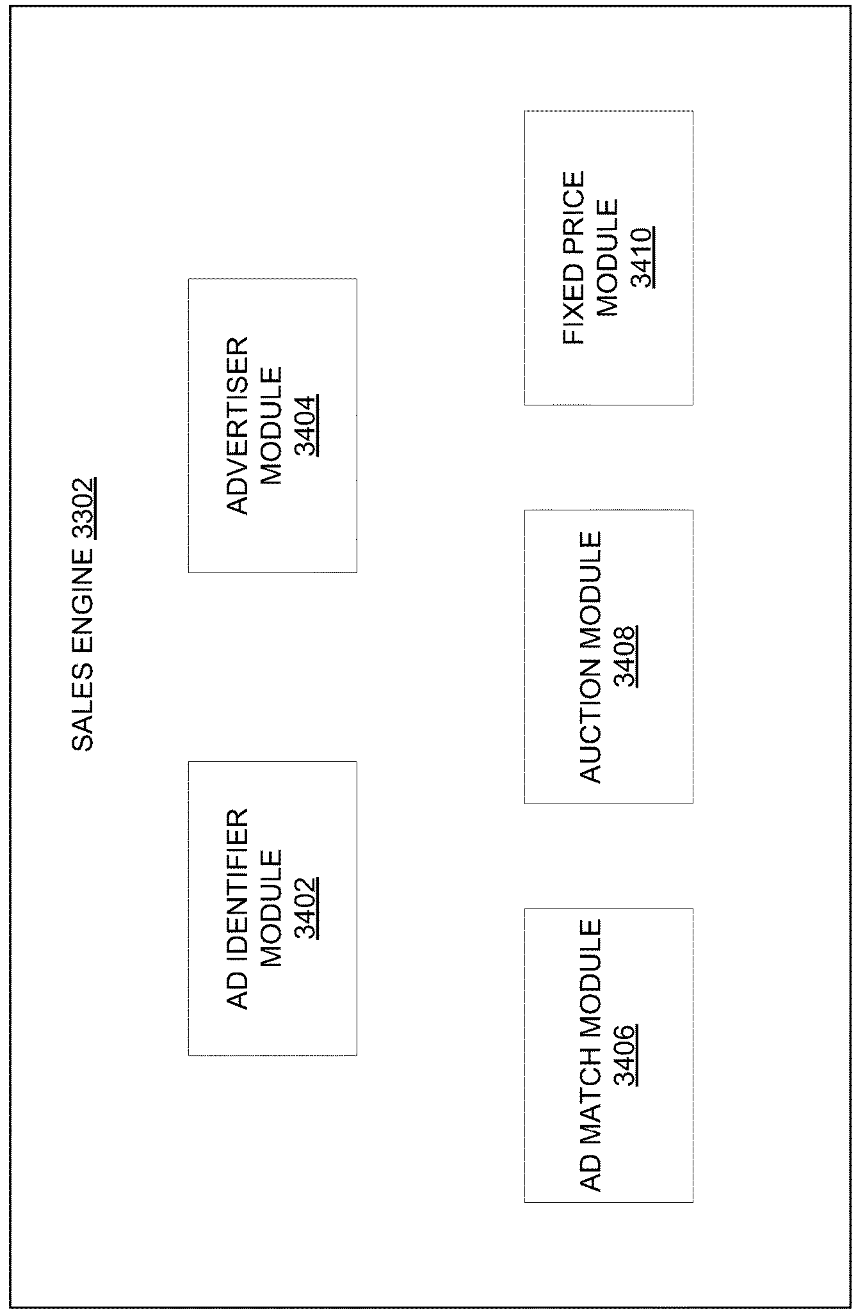
FIG. 34 is a block diagram illustrating an example embodiment of a sales engine.

FIG. 34 is a block diagram illustrating an example embodiment of the sales engine 3302. The sales engine 3302 is configured to manage the determination of advertisement opportunities and the offering of these advertisement opportunities for sale or auction. In example embodiments, the sales engine 3302 comprises an ad identifier module 3402, an advertiser module 3404, an ad match module 3406, an auction module 3408, and a fixed price module 3410.

The ad identifier module 3402 identifies advertisement opportunities in media (e.g., a television show, movie, sporting event). In some embodiments, the ad identifier module 3402 incorporates pattern recognition software and techniques to identify available advertising space as discussed above. The pattern recognition software may communicate with the attribute database 1818 or the ad database 3308 to determine attributes to search for in the media. As previously discussed, the attributes may be actual object attributes or "blank space" attributes. The pattern recognition software may search the media (e.g. a video stream) for these actual objects or blank spaces. For example, a pizza box may be identified in the middle of a scene. The attributes associated with this object (e.g., pizza box) may include object type (e.g., box or pizza box), dimensions of the object, location of the object, scene type, program type (e.g., comedy movie, sporting event, sitcom), and so forth. In some embodiments, a producer or distributor of the program or media may manually provide some of these attributes.

Additionally, the ad identifier module 3402 may generate placement and contour data that may include coordinates of the recognized object. As previously disclosed, placement and contour data may be generated by use of computer recognition techniques, physical manipulation, or other techniques. While the pattern recognition process is discussed as being performed by the sales engine 3302 of the central management system 3202, alternative embodiments may perform this process at a similar (ad identifier) module located at the head-end, transmission site, retransmission site, the set top box (e.g., at viewer location), or some other site. The attributes, placement data, and contour data may be stored to the ad database 3308.

The advertiser module 3404 manages data stored for the potential advertisers. Initially, the advertiser may register with the central management system 3202 via the advertiser module 3404. During or subsequent to creating an account with the central management system 3202, the advertiser provides attributes associated with their line of business and their advertisement (e.g., pizza, food, take-out), attributes for the advertiser (e.g., pizza company), or attributes for advertisement opportunities for which the advertiser is interested in purchasing (e.g., sporting event, sitcom, kitchen scene) via the advertiser module 3403. The registration and attribute information may be stored in their account in the advertiser database 3310 by the advertiser module 3404.

Once a pattern is identified for the advertisement opportunity and corresponding advertisement attributes determined, the ad match module 3406 may search the advertiser database 3310 for advertisers that have matching attributes. Advertisers that have one or more matching attributes to those indicated by the advertisement opportunity may be offered the advertisement opportunity. In example embodiments, the advertiser may be contacted by the central management system 3202 offering the advertisement opportunity. In some embodiments, the advertisement opportunity may go to the highest bidder in an auction. In other embodiments, the advertisement opportunity may go to the advertiser that responds the fastest to a fixed price offer.

In the event that more than one advertiser (e.g., company) has listed attributes that match attributes of the identified actual object or blank, an auction may be presented by the auction module 3408. The auction allows the advertisers to be placed in the bidding process for areas of specific interest and allows the broadcasters to target advertisers in placing bids on topics, times, programs, etc. of interest to the advertisers. The advertisers that have matching attributes are contacted to place a bid by the auction module 3408. The information regarding the advertisement opportunity is provided to the advertisers. The information may include a starting bid which represents an assigned value to the advertisement opportunity. The assigned value will be discussed in more detail below. If there are no advertisers with matching attributes or none of the matching advertisers decide to bid in the auction, the advertisement opportunity may be recategorized as a blank space, thus opening up the bidding process to more advertisers (e.g., advertisers that have indicated a blank space attribute). This provides more opportunities to obtain bidders for the advertisement opportunity.

The fixed price module 3410 manages fixed price sales of advertisement opportunities. In some situations, the broadcaster or other entity may decide not to use an auction process to sell the advertisement opportunity. Instead, the advertisement opportunity is offered at a fixed price. Advertisers with matching attributes may still be contacted. However, the information provided to the potential advertiser will include the fixed assigned value (e.g., fixed price) that the advertisement opportunity will be sold for. The advertisement opportunity may then be sold to the first advertiser to respond to the offer.

Figure 35:
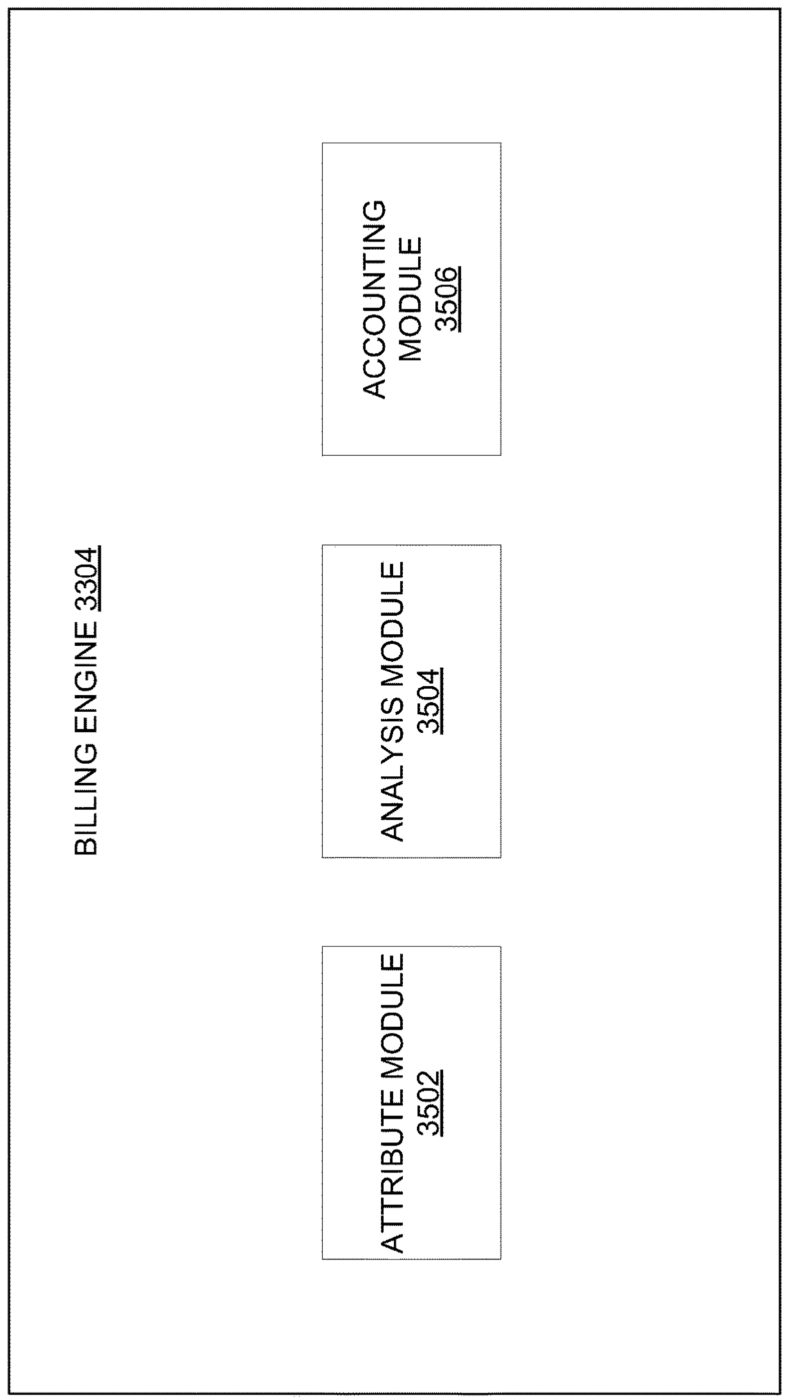
FIG. 35 is a block diagram illustrating an example embodiment of a billing engine.

FIG. 35 is a block diagram illustrating an example embodiment of a billing engine 3304. The billing engine 3304 is configured to manage valuation of each advertisement opportunity and invoicing of purchased advertisement opportunities. The value assigned to the advertisement opportunity may be used by the sales engine 3302 in presenting the offer to potential advertisers. Accordingly, the billing engine 3304 comprises an attribute module 3502, an analysis module 3504, and an accounting module 3506.

The attribute module 3502 manages use of attributes in the billing engine 3304. The attribute module 3502 may retrieve attributes from the ad database 3308. As discussed above, the attributes are used to identify the advertisement opportunity and prospective advertisers. These attributes describe aspects of the advertisement opportunity such as location in a scene to be displayed on the screen, size of an object where the advertisement opportunity will be presented, and type of event/program (e.g., sporting event, sitcom, comedic movie). The attributes may also indicate, or be used by the attribute module 2502 to determine a level of activity with respect to the advertisement opportunity. For example with respect to the pizza box scene discussed above, the pizza box is located in the middle of the scene and is prominent in the scene since the actor is reaching into the box to take out a slice of pizza. In this example, the level of activity assigned to the pizza box would be high as opposed to an object that is found in a corner of the scene away from the actor. For example, a level of activity value of "10" may be assigned to the pizza box, while a level of activity value of "2" may be assigned to a blank space on a side of the scene. It is noted that the value of an ad placement for a given advertiser may also depend on a genre of the visual location. For example, it may not make sense to advertise a breakfast cereal on a pizza box. Also, the attribute module 3502 may consider visibility of the placement in terms of clarity of, for example, an embedded logo. For instance, a straight on shot of the pizza box lid may be more valuable than a shot where the viewer only sees the lid at an angle. Both of these instances would rely on some evaluation of the visual impact of the ad placement. By assigning level of activity values to the advertisement opportunity, the level of activity values may be combined with other assigned values to determine an overall value (e.g., monetary value) for the advertisement opportunity as well being used to rank the advertisement opportunities.

In another example discussed above, different ad locations on a playing field of a sporting event may be valued differently. For example, in a football game where action is centered around the fifty yard zone, that ad location has a higher level of activity than an ad location further away from the action (e.g., near an end zone). The higher level of activity correlates to higher audience focus on the fifty yard zone and away from the end zone. Therefore, the fifty yard zone, in this example, will have a higher level of activity assigned to it.

The attributes may also include attributes directed to a plot line in the media. For example, the advertisement opportunity may be identified as occurring during a slow portion of an event/program (e.g., movie or television show). Alternatively, the advertisement opportunity may occur during a critical scene in the program (e.g., conclusion, cliff hanger, twist in plot line). These attributes will be factors in determining the value assigned to the advertisement opportunity wherein advertisement opportunities in a critical scene is valued higher than advertisement opportunities in a slow portion of the event or program. For example, a plot line value of “10” may be assigned to a murder scene versus a plot line value of “2” for someone walking down a hallway or a plot line value of “7” of ran intense interrogation scene. Besides the type of scene, the value may be based on a relevance of the scene to the plot line. For instance, the interrogation scene may be more valuable than the murder scene. Perhaps only a victim was shown in the murder scene, but in the detective scene we see where an investigator tricks a bad guy into revealing some important fact. Equally, may be a lab scene before the interrogation scene is more important as that is where a criminologist deduces who the murderer is from the evidence. These plot line values may be combined with other assigned values to determine an overall value (e.g., monetary value) for the advertisement opportunity.

The analysis module 3504 assigns the value to the advertisement opportunity. In one embodiment, the analysis module 3504 may calculate the value for the advertisement opportunity. Accordingly, the analysis module 3504 takes as input the various attributes including attribute values such as the level of activity value and the plot line value for the advertisement opportunity and determines a total value or a range of values for the advertisement opportunity. For instance, a premium price (e.g., total value) may be determined for the advertisement opportunity on the pizza box example discussed above due to its high level of activity, prominent location (e.g., near center of the scene), or placement clarity of an ad (e.g., viewing angle). The analysis module 3504 may also factor in plot line attributes (e.g., plot line attributes). For example, if the advertisement opportunity is during a slow portion of the program, the value will be lower than an advertisement opportunity that occurs during a critical portion of the program (e.g., based on a pace of a storyline). Other attributes and attribute values may be based on a mood of a scene (e.g., romantic, comedic, dramatic, action packed) or importance of characters in the scene (e.g., Brad Pitt talking to George Clooney as main characters may be more valuable than a setup set with two lesser known actors talking). The premium value or price may be in the form of a higher starting bid price or a higher fixed price as compared to a price for an ad location located in an area with lower visibility, lower activity, or smaller size.

The analysis module 3504 may need to balance and weigh the various attributes in determining the value for the advertisement opportunity. For example, a larger ad size may command a higher price than a smaller ad size at the same ad location. However, a larger ad size in a less desirable location (e.g., off to a side) may not have as high a value as a smaller ad size in a more prominent location (e.g., center of the display screen or closer to higher levels of activity) or during a more critical point in a plot line. As such, the analysis module 3504 may apply various weights to the attributes. These weights or weighting algorithms may be retrieved from the billing database 3312. For example, one algorithm may weight level of activity higher than plot line attributes, which in turn, may be weighted higher than size of the advertisement opportunity. These weights may be adjusted by a user of the central management system 3202. In another example, the (total) value for the advertisement opportunity may be based on a match between ad attributes (e.g., mood, pace, actors) and the scene or show in which the ad will appear. For instance, an ad with Drew Barrymore appearing within a show with Drew Barrymore may be more valuable than an ad with Glen Close appearing in a show with Drew Barrymore, but does not contain Glen Close.

Potentially, the analysis module 3504 may evaluate an impact of a given ad appearing between other ads. For example, if a first ad is a pizza ad, it makes more sense to put a soft drink or beer ad after the first ad than another pizza (or other fast food) ad. So, the value may be based on matching the ad to some contextual factors in which the ad will appear. This is analogous to the viewer affinity discussed earlier in the application; just that it is a “content affinity” instead.

In an alternative embodiment, the analysis module 2504 may provide a suggestion for a value, a range of values, or a comparison of the various attributes to a user of the central management system 3202. The user may then manually assign a value to the advertisement opportunity based on the information provided by the analysis module 2504. The value assigned to the advertisement opportunity may then be used by the auction module 3408 or the fixed price module 3410 in offering the advertisement opportunity for sale.

The accounting module 3506 manages the invoicing and collection of payments. In some embodiments, the billing will be based on the final auction price or the fixed price agreed upon using the sales engine 3302. In other embodiments, the billing may be based, at least in part, on a length of time. For example, a total count of frames for each embedded ad (e.g., advertisement opportunity with an advertisement embedded therein) is determined by the accounting module 3506. In some cases, the length may not be determinable before the actual display of the embedded ad. For example, a play during a sporting event may be delayed or take longer than usual thus resulting in the embedded ad being displayed for a longer period of time. Furthermore, the billing may be based on a combination of both auctions/fixed price and length of time. For example, the advertiser may agree to pay a fixed price of $20,000 for every 10 seconds their ad is shown, or the advertiser may have won an auction where the advertiser agreed to pay $25,000 for every 10 seconds of display time for their ad. In these examples, the accounting module 3506 generates a total advertising cost for the embedded ad based upon length of time (e.g., frame count) in which the embedded ad appears and apply that length of time to the auction or fixed price. In some cases, a cap may exist that limits the advertiser's exposure.

Figure 36:
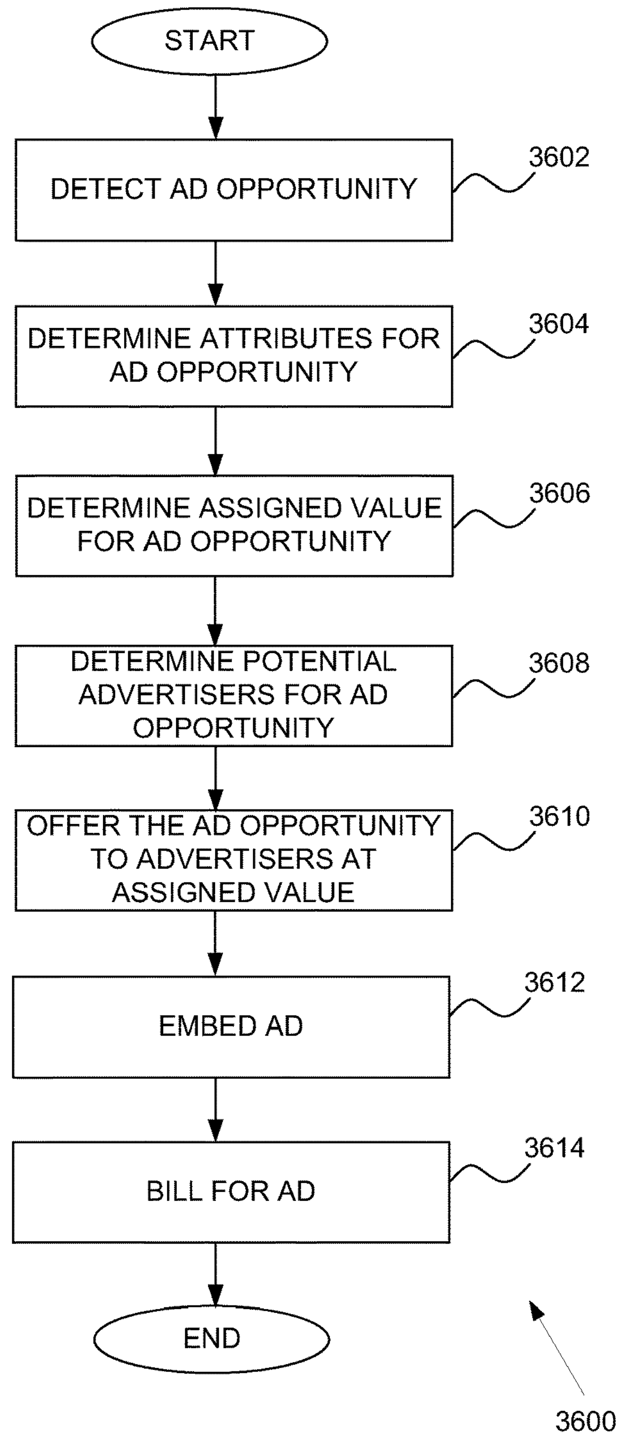
FIG. 36 is a flow diagram of an example high-level method for managing offers and billing of advertisement.

FIG. 36 is a flow diagram of an example high-level method 3600 for managing offers and billing of advertisement. In operation 3602, an advertisement opportunity is detected in a piece of media. Attributes for the advertisement opportunity is determined in operation 3604. In example embodiments, the ad identifier module 3402 identifies advertisement opportunities in the media using, for example, pattern recognition software. Additionally, the pattern recognition software may determine attributes to search for in the media to identify objects where advertisement opportunities may be embedded. These objects may be identified based on actual object attributes or "blank space" attributes. The attributes used to determine the advertisement opportunities may be associated with advertisement opportunities.

In operation 3606, an assigned value (or range of values) is determined for the advertisement opportunity. In one embodiment, the analysis module 3504 calculates the value based on the various attributes determined for the advertisement opportunity. The analysis module 3504 may also factor in plot line attributes, visibility attributes, level of activity attributes, size attributes, or any other attribute desired to be used into the determination of the value. The analysis module 3504 may also balance and weigh the various attributes in determining the value. The weights may be adjusted by a user of the central management system 3202. The resulting value (or range of values) may be the suggested starting bid price in an auction or a fixed price in an offer to sell the advertisement opportunity. Alternatively, the value (or range of values) may be a suggestion to a user of the central management system 3202, and the user may then manually assign a value to the advertisement opportunity.

Potential advertisers are determined in operation 3608. Using the attributes identified for the advertisement opportunity in operation 3604, the ad match module 3406 may search the advertiser database 3310 for the potential advertisers that have matching attributes. The matching attributes may be directed to characteristics of an object or space detected as an advertisement opportunity and may, in one embodiment, include an attribute of "blank space." Since these potential advertisers have indicated interest in advertisement opportunities having one or more of the identified attributes, these potential advertisers are more likely to respond to an offer for sale of the advertisement opportunity.

In operation 3610, an offer of the advertisement opportunity is presented to the potential advertises determined in operation 3610. In example embodiments, the potential advertiser will be contacted by the central management system 3202 offering the advertisement opportunity. In some cases, an auction may be presented by the auction module 3408. The auction allows the potential advertisers to be placed in a bidding process for the advertisement opportunity. The potential advertisers that have matching attributes are contacted to place a bid by the auction module 3408. The information regarding the advertisement opportunity is provided to the potential advertisers. The information may include a starting bid which represents the assigned value determined in operation 3606.

In other cases, the advertisement opportunity may be offered at a fixed price. The fixed price module 3410 contacts the potential advertisers with matching attributes with the offer of the fixed price advertisement opportunity, which may include the fixed assigned value determined in operation 3606. The advertisement opportunity may then be sold to the first advertiser to respond to the offer.

The winner (of an auction) or buyer (of a fixed price offer) will have their advertisement embedded into the advertisement opportunity in operation 3612. Various methods of embedding advertisement have been discussed above and any one of these methods may be used herein.

In operation 3614, the advertiser is billed for the advertisement placement. In some embodiments, the billing will be based on the final auction price or the fixed price agreed upon using the sales engine 3302. In other embodiments, the billing may be based, at least in part, on a length of time the advertisement is displayed to viewers. For example, a total count of frames for each embedded advertisement (e.g., advertisement opportunity with an advertisement embedded therein) is determined by the accounting module 3506. In further cases, the billing may be based on a combination of both auctions/fixed price and length of time. For example, the advertiser may agree to pay a fixed price of $20,000 for every 10 seconds their advertisement is shown, or the advertiser may have won an auction where the advertiser agreed to pay $25,000 for every 10 seconds of display time for their advertisement. In these examples, the accounting module 3506 generates a total advertising cost for the embedded ad based upon length of time (e.g., frame count) in which the embedded advertisement appears and apply that length of time to the auction or fixed price. In some cases, a cap may exist that limits the advertiser's exposure.

It is noted that while a particular order to the operations is shown in FIG. 36, the operations may be performed in a different order. For example, the advertiser may be billed (operation 3614) prior to the embedding of their advertisement (operation 3612). In another example, the assigned value may not be determined (operation 3606) until after the potential advertisers are determined (operation 3608).

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations as described herein. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time. The processor may be temporary configured or permanently configured to perform relevant operations. Whether temporarily configured or permanently configured, such processors may constitute processor-implemented modules that operate to perform one or more operations or functions.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 37:
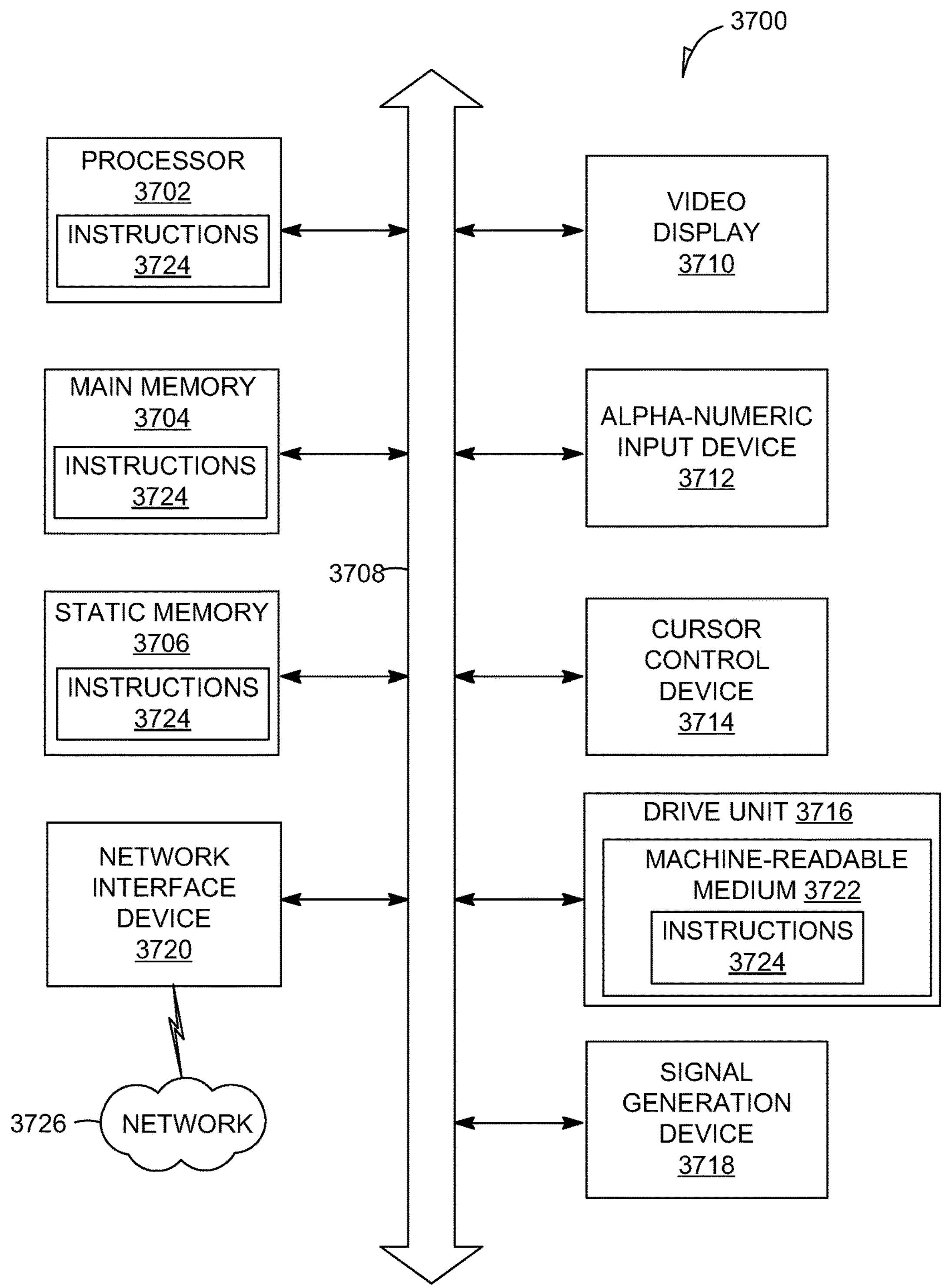
FIG. 37 is a simplified block diagram of a machine in an example form of a computing system within which a set of instructions for causing the machine to perform any one or more of the methodologies discussed herein may be executed.

With reference to FIG. 37, an example embodiment extends to a machine in the example form of a computer system 3700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 3700 may include a processor 3702 (e.g., a central processing unit (CPU), a graphics processing unit (GPU) or both), a main memory 3704 and a static memory 3706, which communicate with each other via a bus 3708. The computer system 3700 may further include a video display unit 3710 (e.g., a liquid crystal display (LCD) or a cathode ray tube (CRT)). In example embodiments, the computer system 3700 also includes one or more of an alpha-numeric input device 3712 (e.g., a keyboard), a user interface (UI) navigation device or cursor control device 3714 (e.g., a mouse), a disk drive unit 3716, a signal generation device 3718 (e.g., a speaker), and a network interface device 3720.

Machine-Readable Storage Medium

The disk drive unit 3716 includes a machine-readable storage medium 3722 on which is stored one or more sets of instructions 3724 and data structures (e.g., software instructions) embodying or used by any one or more of the methodologies or functions described herein. The instructions 3724 may also reside, completely or at least partially, within the main memory 3704 or within the processor 3702 during execution thereof by the computer system 3700, with the main memory 3704 and the processor 3702 also constituting machine-readable media.

While the machine-readable storage medium 3722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 3724 may further be transmitted or received over a communications network 3726 using a transmission medium via the network interface device 3720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Additionally, although various example embodiments discussed below focus on a insertion of localized advertisement data into a national advertisement, the embodiments are given merely for clarity in disclosure. Thus, any insertion of localized advertisement data into any type of media may employ various embodiments of the system and method described herein and may be considered as being within a scope of example embodiments. Each of a variety of example embodiments is discussed in detail below.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:

accessing, using one or more processors of a machine, media to be communicated to a user device of a viewer;

accessing a communicatively coupled database that stores attributes to search for in the media, the attributes to search for in the media comprising attributes of an object of an advertisement opportunity in which an advertisement is to be embedded;

performing pattern recognition, using pattern recognition software, to identify the object in the media that includes the attributes from the database;

retrieving, from a second database, valuation information for the advertisement opportunity, the valuation information indicating a value for the advertisement opportunity based on one or more of the attributes of the advertisement, including at least a plot line attribute and an activity attribute, wherein the plot line attribute is a function of a criticality of an associated scene in a plot line comprising a plurality of scenes, wherein the value is higher for critical scenes compared to non-critical scenes, and wherein the activity attribute is associated with a determined level of activity of the scene;

determining, using one or more processors of the machine, the value for the advertisement opportunity based on the;

offering the advertisement opportunity to a potential advertiser based on the value determined using the attributes of the advertisement opportunity;

in response to the potential advertiser accepting the offering, graphically embedding an advertisement associated with the potential advertiser into a display area of the object based on placement and contour data for the object generated by the pattern recognition software; and transmitting the media through a media distribution network to the user device of the viewer.

2. The method of claim 1, wherein the attributes comprise a physical location of the advertisement opportunity in a scene of the media, the value assigned to the advertisement opportunity being higher based on the location being a prominent location in the scene.

3. The method of claim 2, wherein the prominent location within the scene comprises an area where a level of activity in the scene is higher than other areas of the scene.

4. The method of claim 2, wherein the prominent location comprises an area near a center of the scene, the center being displayable at a center of a display screen of the user device.

5. The method of claim 1, further comprising:

accessing an advertiser database containing attributes associated with potential advertisers; and determining the potential advertiser having attributes that match the attributes of the advertisement opportunity.

6. The method of claim 1, further comprising billing an advertiser that purchases the advertisement opportunity based on the value assigned to the advertisement opportunity.

7. The method of claim 6, wherein the billing comprises:

determining a length of time an advertisement is displayed; and factoring the length of time into a calculation of a final invoice.

8. The method of claim 1, wherein the identifying the object of the advertisement opportunity and determining the attributes occurs at the user device of the viewer.

9. The method of claim 1, wherein the identifying the object of the advertisement opportunity and determining of the attributes occurs at a server of a central management system.

10. The method of claim 1, wherein the determining the value further comprises including a weighted value for a plot line attribute.

11. The method of claim 1, wherein the graphically embedded advertisement comprises an interactive advertisement, the interactive advertisement being selectable by the viewer to provide additional information related to the interactive advertisement.

12. The method of claim 1, wherein the value for the advertisement opportunity is based on both a first level of activity in the scene relative to one or more other scenes, and a second level of activity in a first area of the scene relative to one or more areas of the scene.

13. The method of claim 12, wherein the plot line attribute indicates a relevance of the scene to a plot line.

14. The method of claim 1, wherein the plot line attribute indicates an importance of characters in the scene.

15. The method of claim 14, wherein the plot line attribute indicates a mood of the associated scene as being comedy.

16. A non-transitory machine-readable medium storing instructions which, when executed by the at least one processor of a machine, cause the machine to perform operations comprising:

accessing media to be communicated to a user device of a viewer;

accessing a communicatively coupled database that stores attributes to search for in the media, the attributes to search for in the media comprising attributes of an object of an advertisement opportunity in which an advertisement is to be embedded;

performing pattern recognition, using pattern recognition software, to identify the object in the media that includes the attributes from the database;

retrieving, from a second database, valuation information for the advertisement opportunity, the valuation information indicating a value for the advertisement opportunity based on one or more of the attributes of the advertisement, including at least a plot line attribute and an activity attribute, wherein the plot line attribute is a function of a criticality of an associated scene in a plot line comprising a plurality of scenes, wherein the value is higher for critical scenes compared to non-critical scenes, and wherein the activity attribute is associated with a determined level of activity of the scene;

determining the value for the advertisement opportunity based on the valuation information;

offering the advertisement opportunity to a potential advertiser based on the value determined using the attributes of the advertisement opportunity;

in response to the potential advertiser accepting the offering, graphically embedding an advertisement associated with the potential advertiser into a display area of the object based on placement and contour data for the object generated by the pattern recognition software; and transmitting the media through a media distribution network to the use device of the viewer.

17. The non-transitory machine-readable medium of claim 16, wherein the attributes comprise a physical location of the advertisement opportunity in a scene of the media, the value assigned to the advertisement opportunity being higher based on the location being a prominent location in the scene.

18. The non-transitory machine-readable medium of claim 16, wherein the value comprises a starting bid price in an auction for the advertisement opportunity or a fixed price in a fixed price offer for the advertisement opportunity, determining the potential advertiser having attributes that match the attributes of the advertisement opportunity.

19. The non-transitory machine-readable medium of claim 16, wherein the operations further comprise:

accessing an advertiser database containing attributes associated with potential advertisers; and determining the potential advertiser having attributes that match the attributes of the advertisement opportunity.

20. A system comprising:

one or more processors of a machine; and a hardware storage device storing instructions that when executed by the one or more processors, causes the machine to perform operations comprising:

accessing media to be communicated to a user device of a viewer;

accessing a communicatively coupled database that stores attributes to search for in the media, the attributes to search for in the media comprising attributes of an object of an advertisement opportunity in which an advertisement is to be embedded;

performing pattern recognition, using pattern recognition software, to identify the object in the media that includes the attributes from the database;

retrieving, from a second database, valuation information for the advertisement opportunity, the valuation information indicating a value for the advertisement opportunity based on one or more of the attributes of the advertisement, including at least a plot line attribute and an activity attribute, wherein the plot line attribute is a function of a criticality of an associated scene in a plot line comprising a plurality of scenes, wherein the value is higher for critical scenes compared to non-critical scenes, and wherein the activity attribute is associated with a determined level of activity of the scene;

determining the value for the advertisement opportunity based on the valuation information;

offering the advertisement opportunity to a potential advertiser based on the overall value determined using the attributes of the advertisement opportunity;

in response to the potential advertiser accepting the offering, graphically embedding an advertisement associated with the potential advertiser into a display area of the object based on placement and contour data for the object generated by the pattern recognition software; and transmitting the media through a media distribution network to the use device of the viewer.

* * * * *